United States Patent
Vayda

(10) Patent No.: US 8,279,169 B2
(45) Date of Patent: Oct. 2, 2012

(54) UNIVERSAL INPUT DEVICE AND SYSTEM

(76) Inventor: Mark Vayda, Sterling, VA (US)

( * ) Notice: Subject to any disclaimer, the term of this patent is extended or adjusted under 35 U.S.C. 154(b) by 521 days.

(21) Appl. No.: 11/931,965

(22) Filed: Oct. 31, 2007

(65) Prior Publication Data

US 2008/0143670 A1    Jun. 19, 2008

Related U.S. Application Data

(63) Continuation-in-part of application No. 11/383,025, filed on May 12, 2006, which is a continuation of application No. 10/850,434, filed on May 21, 2004, now Pat. No. 7,113,171, which is a continuation-in-part of application No. 09/202,215, filed as application No. PCT/US97/09845 on Jun. 10, 1997, now abandoned.

(51) Int. Cl.
*G09G 5/00* (2006.01)

(52) U.S. Cl. .................. 345/156; 345/204; 345/212

(58) Field of Classification Search .......... 345/156–169, 345/173–179, 204–215
See application file for complete search history.

(56) References Cited

U.S. PATENT DOCUMENTS

| | | |
|---|---|---|
| 4,005,388 A | 1/1977 | Morley et al. |
| 4,458,238 A | 7/1984 | Learn |
| 4,580,006 A | 4/1986 | Hull |
| 4,724,431 A | 2/1988 | Holtey et al. |
| 4,870,389 A | 9/1989 | Ishiwata et al. |
| 4,911,565 A | 3/1990 | Ryan |
| 4,917,516 A | 4/1990 | Retter |
| 4,971,465 A | 11/1990 | Hashimoto |
| 5,017,030 A | 5/1991 | Crews |
| 5,087,910 A | 2/1992 | Guyot-Sionnest |
| 5,175,534 A | 12/1992 | Thatcher |
| 5,197,811 A | 3/1993 | Levinrad |
| 5,270,709 A | 12/1993 | Niklsbacher |
| 5,302,969 A | 4/1994 | Kuroda et al. |
| 5,396,267 A | 3/1995 | Bouton |
| 5,420,943 A | 5/1995 | Mak |
| 5,432,530 A | 7/1995 | Arita |
| 5,436,640 A | 7/1995 | Reeves |
| 5,473,325 A | 12/1995 | McAlindon |
| 5,543,818 A | 8/1996 | Scott |
| 5,555,894 A | 9/1996 | Doyama et al. |
| 5,576,733 A * | 11/1996 | Lo .................. 345/163 |
| 5,581,484 A | 12/1996 | Prince |
| 5,638,062 A | 6/1997 | McAlindon |

(Continued)

FOREIGN PATENT DOCUMENTS

DE    3707049    11/1988

(Continued)

OTHER PUBLICATIONS

Johnson, et al., "Cyclops a One Button Alpha-numeric Keypad", Motorola, Inc. Technical Developments, Motorola, Inc., vol. 15, May 1992, pp. 49-56.

*Primary Examiner* — Vijay Shankar
(74) *Attorney, Agent, or Firm* — Hunton & Williams LLP

(57) ABSTRACT

The present invention relates to input devices and particularly to input devices for use with computer and telecommunications systems and/or other object systems and/or devices. More particularly, the present invention relates to a universal input device for inputting data.

23 Claims, 40 Drawing Sheets

U.S. PATENT DOCUMENTS

| | | | |
|---|---|---|---|
| 5,648,798 A * | 7/1997 | Hamling | 345/163 |
| 5,661,505 A | 8/1997 | Livits | |
| 5,699,082 A | 12/1997 | Marks et al. | |
| 5,790,103 A | 8/1998 | Willner | |
| 5,825,353 A * | 10/1998 | Will | 345/184 |
| 5,841,425 A * | 11/1998 | Zenz, Sr. | 345/163 |
| 5,894,302 A * | 4/1999 | Scenna et al. | 345/163 |
| 5,923,318 A | 7/1999 | Zhai et al. | |
| 5,943,041 A | 8/1999 | Allison et al. | |
| 5,945,979 A | 8/1999 | Rutledge et al. | |
| 5,982,356 A | 11/1999 | Akiyama | |
| 5,995,084 A | 11/1999 | Chan et al. | |
| 6,031,518 A | 2/2000 | Adams et al. | |
| 6,075,516 A | 6/2000 | Rice | |
| 6,097,371 A | 8/2000 | Siddiqui et al. | |
| 6,130,664 A | 10/2000 | Suzuki | |
| 6,141,643 A | 10/2000 | Harmon | |
| 6,199,044 B1 | 3/2001 | Ackley et al. | |
| 6,392,640 B1 * | 5/2002 | Will | 345/184 |
| 2004/0085286 A1 | 5/2004 | Wang et al. | |
| 2004/0140965 A1 | 7/2004 | Wang et al. | |

FOREIGN PATENT DOCUMENTS

| | | |
|---|---|---|
| DE | 4038012 | 2/1992 |
| EP | 0 427 036 | 5/1991 |
| EP | 0 538 020 | 4/1993 |
| EP | 0 689 122 | 12/1995 |
| GB | 2 131 746 | 6/1984 |
| JP | 60-25040 | 2/1985 |
| JP | 1-42182 | 12/1989 |
| JP | 4-324516 | 11/1992 |
| WO | WO 94/28479 | 12/1994 |

* cited by examiner

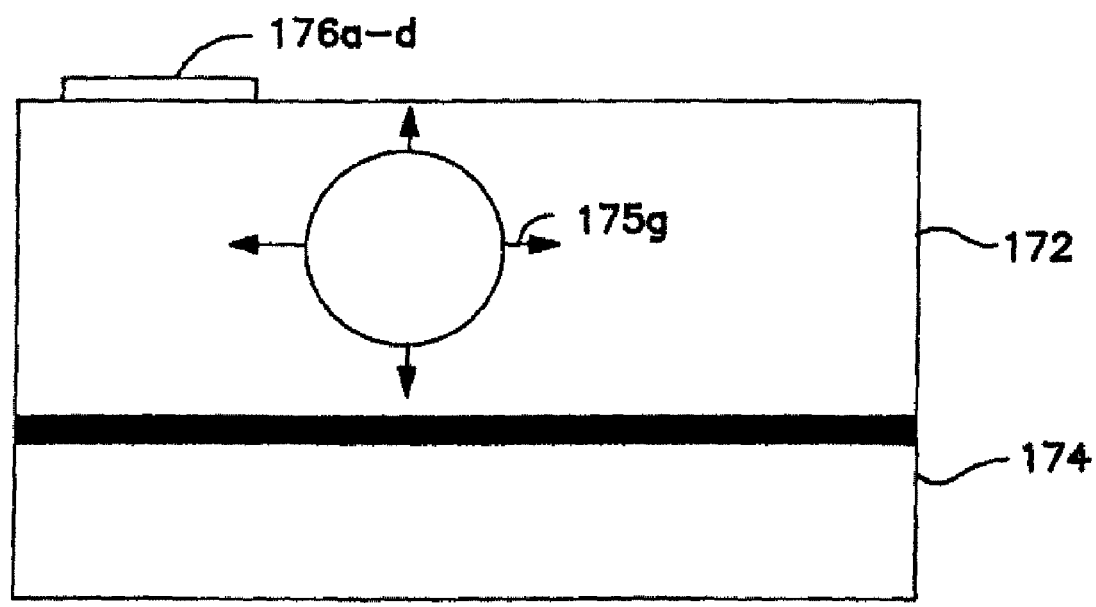
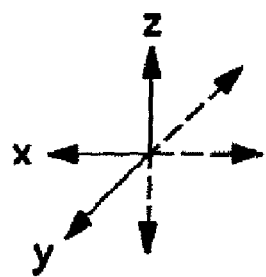
FIG. 20

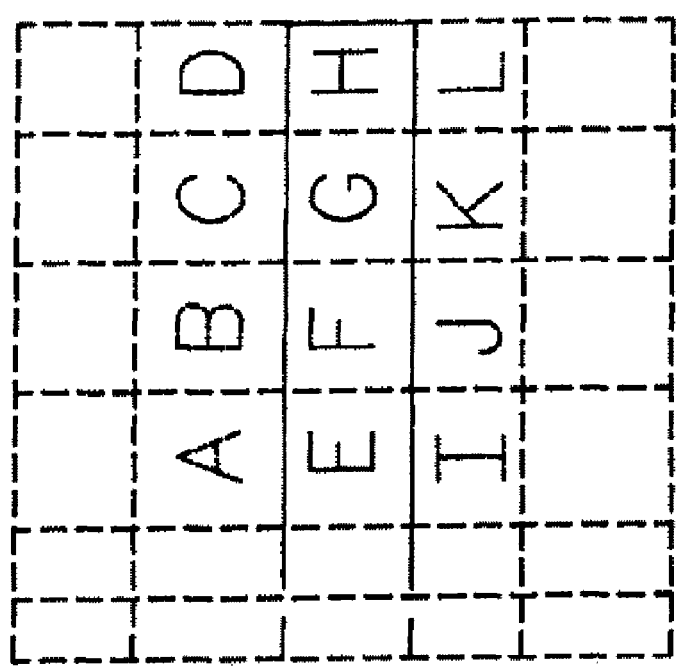
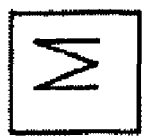
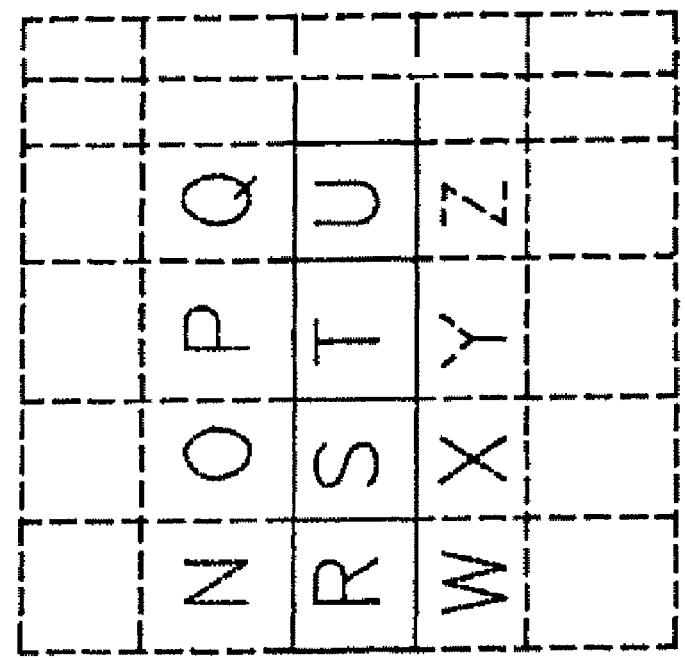
FIG. 21

UNIVERSAL INPUT DEVICE AND SYSTEM

CROSS-REFERENCE TO RELATED APPLICATIONS

This application is a CIP of U.S. patent application Ser. No. 11/383,025 filed May 12, 2006, which is a continuation of U.S. patent application Ser. No. 10/850,434 filed May 21, 2004, now U.S. Pat. No. 7,113,171 which is a CIP of U.S. application Ser. No. 09/202,215, filed Oct. 5, 1999 now abandoned and International Application number PCT/US97/09845, filed Jun. 10, 1997, which claims benefit of priority from U.S. application Ser. No. 08/660,944 filed Jun. 10, 1996, now abandoned. The disclosure of these references are expressly incorporated by reference herein in their entireties.

FIELD OF THE INVENTION

The present invention relates to input devices and particularly to input devices for use with computer and telecommunications systems and/or other object systems and/or devices. More particularly, the present invention relates to a universal input device for inputting data.

BACKGROUND OF THE INVENTION

From the development of the typewriter to the present day personal computer, one single type of input format has been used. The typewriter QWERTY arrangement of keys has been augmented for the computer with various other keys such as the ESCAPE key, function keys, directional keys, number pad keys, etc. In all, most keyboards for use with modem personal computers comprise over 50 different keys. Although many other keys may be desirable for the expert user, additional keys require additional space which would require larger and larger keyboards, a prospect which is not aesthetically or functionally practical.

Additionally, use of the keyboard as the sole input device limits the effectiveness of the computer for performing word processing and graphics functions, particularly as software for performing these functions becomes increasingly sophisticated. As such, secondary input devices, such as a mouse, were developed to assist the user in placing and relocating a cursor or other locational device in these software packages. The combination of the keyboard and mouse enables a wider variety of inputs and control by a user. The increasing number of options, however, also results in greater complexity for the user in being able to operate and utilize these options.

This problem is additionally compounded by the increasing necessity to be able to use computers for accessing information, operating a business, ordering products, etc. Many people have never learned the QWERTY keyboard system, what the function keys do or how a mouse works. For these people, the prospect of learning to use 50-plus keys on a keyboard in addition to a mouse is daunting, particularly because of the increasing complexity of those devices.

Learning the use of the keyboard requires familiarity with the QWERTY ordering system. Moreover, the keyboard arrangement requires a user to develop dexterity with his or her fingers to be able to effectively and efficiently reach and depress each key on the keyboard. With ten fingers and over 50 keys, movement of the hands and fingers across a keyboard requires skill and practice. Often, a user must look at the keyboard to remember the location of less often used keys such as the } key or the − key on a keyboard, for example.

Moreover, because a user must move fingers from the "home" positions to depress other keys, mistakes in replacing the fingers on the proper keys are common.

Also, the addition of the mouse requires the user to often look down to locate the mouse or to replace his or her hand on the keyboard after use of the mouse. This requires the user to divert his or her eyes from the screen to place his or her hand or to locate a particular key and then to refocus his or her eyes on the proper location on the screen. In complicated software packages, relocating the proper place on the screen may be difficult and needlessly consume time which could more effectively be spent operating the software.

SUMMARY OF THE INVENTION

From the foregoing it has been recognized that a need has arisen for a computer input device which enables a user to input data seemlessly without requiring the user to divert his attention from the computer screen. Additionally, a need has arisen for a computer input device for enabling a user to input a large number of characters and other data comfortably without moving his or her fingers from predesignated positions.

Accordingly, one object of the present invention is to meet the foregoing needs.

An object of the present invention is to provide an input device which enables a user to input a plurality of characters or data without requiring the user to divert his or her eyes from a computer monitor.

Another object of the present invention is to provide an input device which enables a user to input a plurality of characters without requiring the user to move his or her fingers from predesignated locations.

Yet another object of the present invention is to provide a computer system which enables a user to visually understand inputs through presentation on the computer screen.

Another object of the present invention is to provide a computer system comprising one input device for each of the user's two hands.

Yet another object of the present invention is to provide an input device which may operate to input data and relocate a cursor or reposition a placement indicator.

A further object of the present invention is to provide a combination of input devices which may accurately locate a cursor or other pointer in a software environment.

Accordingly, one embodiment of the present invention comprises a computer system comprising a plurality of input devices and a processor. Each input device comprises a base portion, a control portion, a plurality of input keys disposed on the control portion for permitting a user to request a data input to the processor, a universal connector for connecting the control portion to the base portion and permitting the user to move the control portion universally with respect to the base portion through a plurality of first and second discrete positions in first and second directions, and a signal generator for generating signals indicating the first and second discrete position of the control portion and user data input requests. The processor receives and processes the data input requests and positional signals. A display displays an image generated by the processor. A character selector unit presents a character presentation graphic on the display. The character presentation graphic comprises a plurality of rows and a plurality of vertical clusters, each row and each vertical cluster comprising no more than five character selection icons, wherein each first discrete position corresponds to a row and each second discrete position corresponds to a vertical cluster and wherein the character selector unit selects and performs a function associated with the character selection icon corresponding to the first and second discrete positions of the control portion and the input key causing the user input data request. A rotational mechanism permits a user to rotate the control portion with respect to the base portion.

Accordingly another embodiment of the present invention comprises an input device for generating signals indicating input requests by a user. The input device comprises a base portion, a control portion, a plurality of input keys disposed on the control portion for permitting a user to input a request, a universal connector for connecting the control portion to the base portion and for permitting a user to move the control portion universally with respect to the base portion; and a signal generator for generating positional signals indicating a position of the control portion and for generating a signal indicating user data input requests generated by a user selecting one of the plurality of input means.

Accordingly another embodiment of the present invention comprises a method for use in a computer system comprising a plurality of input devices and a processor, each input device comprising a base portion, a control portion, a plurality of input keys disposed on the control portion, a universal connector for connecting the control portion to the base portion, and a signal generator. The method comprises the steps of requesting a data input to the processor device by simultaneously selecting one of the input device and positioning the control portion universally with respect to the base portion, generating a signal indicating the selected input device and a current position of the control portion, and receiving and processing the data input requests and positional signals.

These and other advantages and objects may be appreciated from the present specification and drawings.

BRIEF DESCRIPTION OF THE DRAWINGS

FIG. 20 depicts a side view of a universal input device according to another embodiment of the present invention.

FIG. 21 depicts a two-dimensional command matrix according to one embodiment of the present invention.

DETAILED DESCRIPTION OF THE PREFERRED EMBODIMENTS

Figure 1:
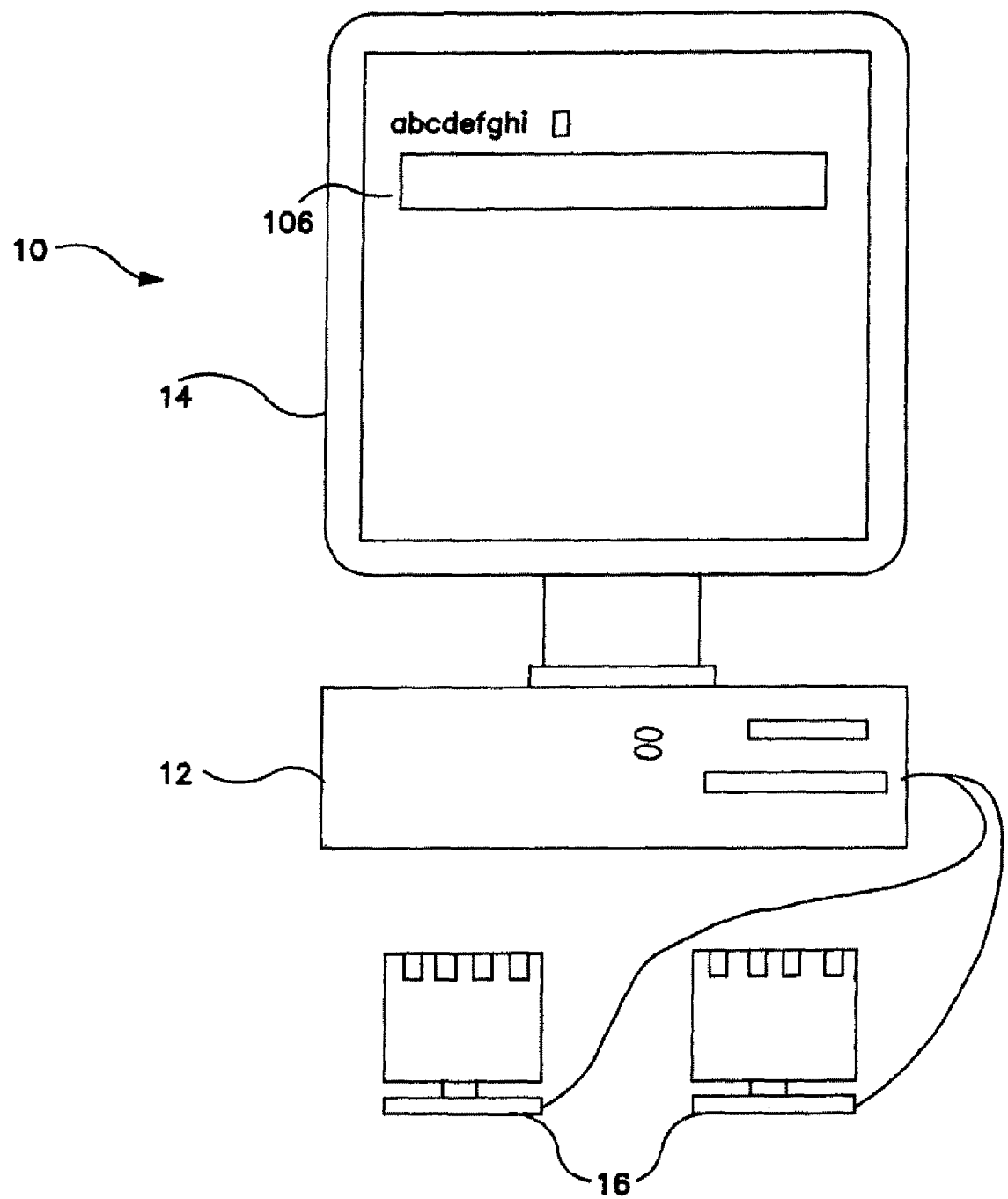
FIG. 1 depicts one embodiment of a computer system according to the present invention.

According to the present invention, a universal input device is provided for use with a computer system. FIG. 1 depicts one embodiment of a computer system according to the present invention. Computer system 10 comprises a computer 12, a monitor 14 and one or more universal input devices (UIDs) 16. Computer 12 may comprise any type of computer including personal computers, supercomputers, mainframe computers, etc. which require data to be input from a user. For example, computer 12 may comprise a personal computer utilizing a microprocessor sold under the trademark (PENTIUM) by Intel, Inc.

Monitor 14 may comprise any display device for use with computer 12 including an LED display, an LCD display, or the like. Monitor 14 is connected to computer 12, for example, by a standard cable.

Figure 2:
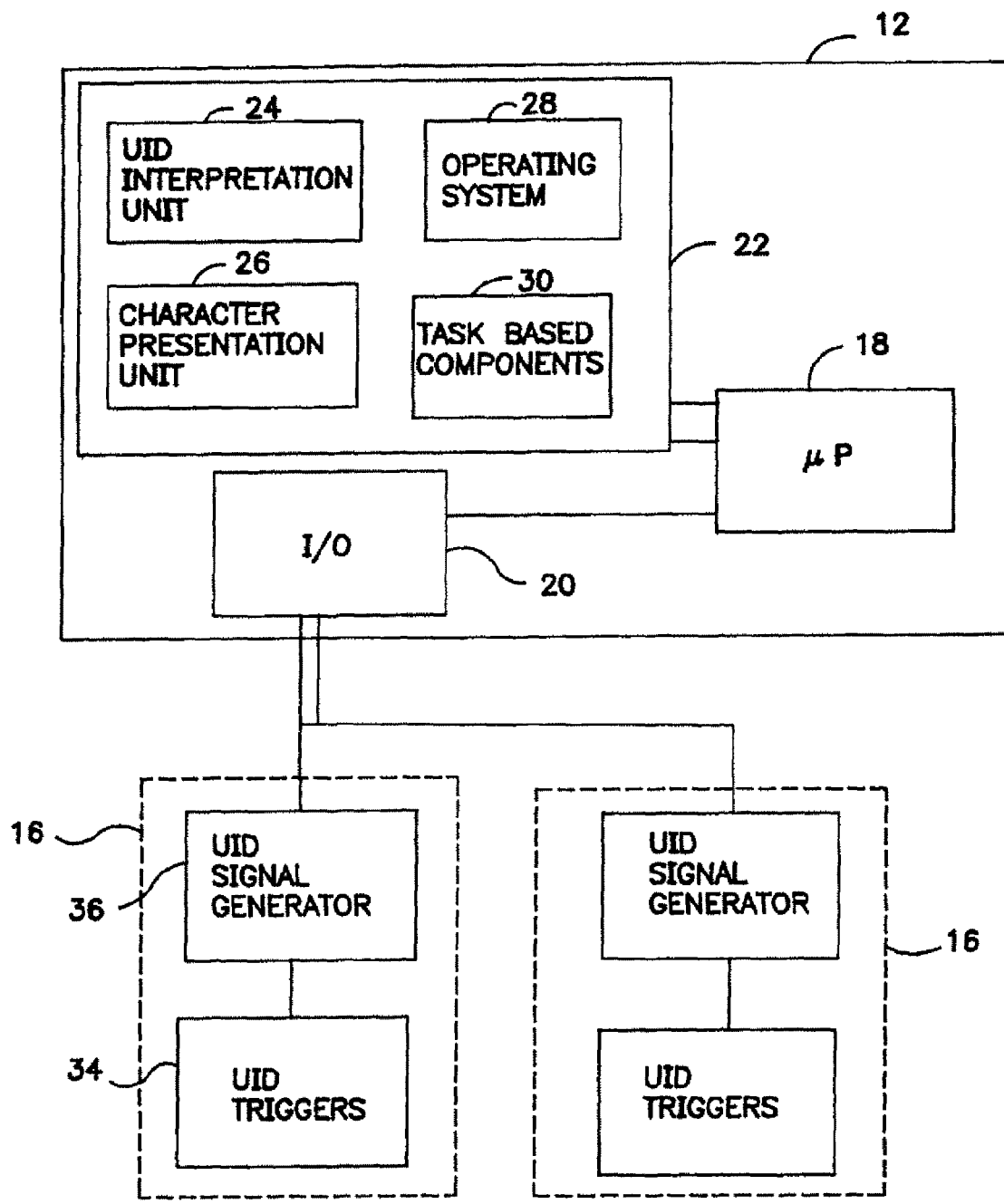
FIG. 2 depicts a block diagram of an embodiment of a computer system according to the present invention.

As depicted in the block diagram of FIG. 2, computer 12 comprises a microprocessor 18, an input/output device 20, and a memory device 22. Memory device 22 stores a UID interpretation unit 24, a character presentation unit 26, an operating system 28, and task based software components 30. UID interpretation unit 24 provides instructions which interpret signals received from UIDs 16 for operating system 28. UID interpretation unit 24 functions similarly to software for interpreting mouse movements, or movements of a joystick, for example. Character presentation unit 26 operates to present on monitor 14 a character selection graphic 106 as depicted in FIG. 1.

Character selection graphic 106 comprises a visual representation of a set of characters or functions which may be selected by the user. Character selection graphic 106 is preferably overset onto a document or window presented by one of the task based components 30. For example, a task based component 30 may comprise a word processing component which displays a document which is being edited. Character selection graphic 106 may be presented slightly below or slightly above the line containing the current cursor location as depicted in FIG. 1, for example. The functioning of character selection graphic 106 and UID 16 is discussed in more detail below.

UID 16 comprises UID triggers 34 and UID signal generator 36. UID triggers 34 comprise electromechanical devices which translate mechanical actions into electrical signals for relay to UID signal generator 36. UID signal generator 36 receives the electrical signals from UID triggers 34 and generators signals indicative of the signals received from UID triggers 34. These signals are transmitted to VO device 20 in computer 12 for relay to microprocessor 22. Having described the functional connection of several components of computer system 10, a more detailed description of UID 16 and character selection graphic 106 illustrates the operation of the present invention.

Figure 3:
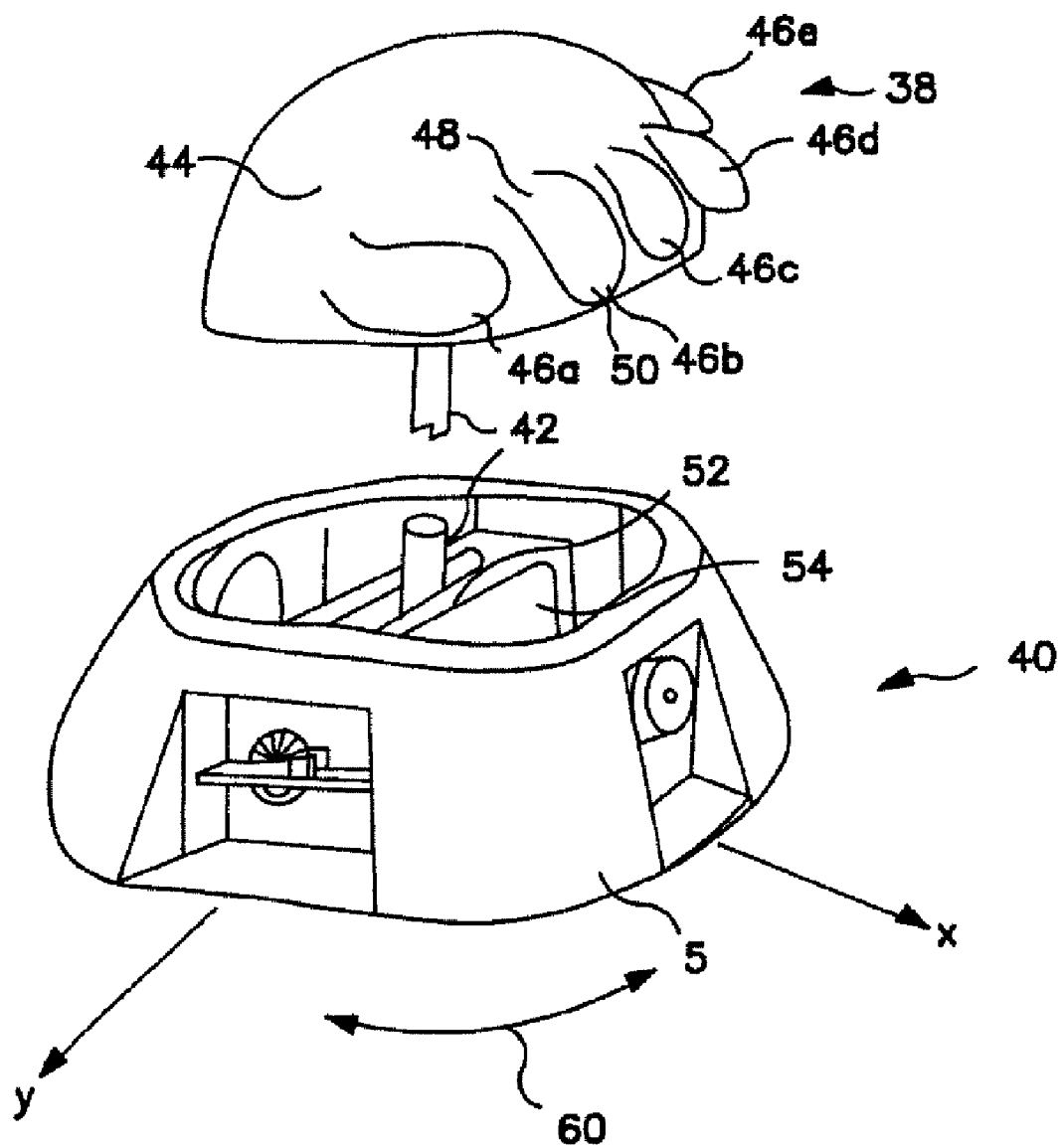
FIG. 3 depicts a perspective view of a universal input device according to an embodiment of the present invention.

UIDs 16 provide an easy to learn and operate input device which may be used to input an almost infinite amount of data without requiring the user to move his fingers from predesignated positions. As represented in FIG. 3, UIDs 16 comprise a control portion 38 and a base portion 40. Control portion 38 may be connected to base portion 40 by a shaft mechanism 42, for example. Although each UID 16 is depicted as being connected to a single base portion 40, a plurality of control portions 38 may be connected to a single base portion. Other variations are also possible.

Control portion 38 comprises a palm portion 44 and a plurality of finger positions 46. In a preferred embodiment, control portion 38 comprises five finger portions 46a-e, one finger portion for each finger of a users hand. As depicted in FIG. 3 (for a left hand), finger portion 46a may be slightly spaced from finger portions 46b-e for a user's thumb. Preferably, finger portions 46a-e and palm portion 44 are arranged to provide an ergonomically pleasing arrangement. For example, preferably finger portions 46a-e are spaced such that a user's hand rests comfortably on palm portion 44 while his fingers (thumb, index, middle, ring, and little) rest comfortable over finger portions 46a-e, respectively. For a right hand, finger portions 46a-e may be arranged oppositely.

Each of finger portions 46 may be connected to palm portion 44 to operate as a switching device. For example, finger portion 46 may comprise a connecting end 48 and a depressing end 50. Connecting end 48 may be disposed toward palm portion 44, whereas depressing end 50 may be slightly displaced from palm portion 44. For example, connecting end 48 may be hingedly connected to palm portion 44.

Depressing end 50 is preferably connected to an electromechanical switch (not shown). The electromechanical switch may be any type of contact switch which generates an electrical impulse. In one preferred embodiment, a two lead contact switch may be used in which one lead may be connected to palm portion 44 and the other lead may be connected to an underside of depressing end 50 such that upon depression of depressing end 50 by a user, the two leads are brought into contact and thus the electromechanical switch may generate an impulse. Each finger portions 46a-e comprises an electromechanical switch (see FIG. 6) and these switches comprise five of the electromechanical triggers of UID triggers 34.

Finger portions 46 may also be keyboard keys. In another preferred embodiment, finger portions 46 are long keyboard keys, such as a typical "SHIFT" key on the right-hand side of a typical keyboard, that are arranged such that the keys extend in the same direction as fingers on a hand. Other keys may also be used.

Base portion 40 comprises a universal connection component 54 and a housing 56. Housing 56 serves to support universal connection 25 component 54. In one embodiment, universal connection component 54 comprises a shaft receiving component 52 which receives shaft 42. Therefore, control portion 38 is connected to universal connection component 54. Universal connection component 54 allows a user to move control portion 38 in the x-direction and y-direction relative to housing 56 as depicted in FIG. 3. Additionally, universal connection component 54 may comprise a rotational component 58 which enables a user to move control portion 38 rotationally along a path 60 with respect to housing 56.

In a preferred embodiment, universal connection component 54 permits movement of control portion 38 with respect to housing 56 through distinct positions. In a preferred embodiment, for example, control portion 38 may be moved in a positive x-direction five positions and in a negative x-direction five positions, thus providing eleven distinct positions along the x-directional axis. Similarly, in a preferred embodiment, for example, control portion 38 may be moved in a positive y-direction five positions and in a negative y-direction five positions, thus providing eleven distinct positions along the y-directional axis. Also, in a preferred embodiment, for example, control portion 38 may be rotated five positions in either direction along pathway 60 for a total of eleven rotational positions along pathway 60.

The distinct positions may be provided in a preferred embodiment, for example, by using a spring steel holding a ball bearing which may be rotated into specified indent portions along a pathway. Other methods of providing distinct positions may also be used. The positions are preferably distinct enough such that a user may sense the various positions. This better enables a user to operate UID 16.

At each of the distinct positions in each of the directions (x, y and along pathway 60), universal connection component 54 comprises a sensing device which provides an electrical impulse indicating movement & to the distinct position. These sensing devices comprise UID triggers 34.

In the preferred embodiment described above, there are eleven sensing devices for each of the directions, thus in total 33 sensing devices may be provided as UID triggers 34.

In another embodiment, potentiometers may be employed with universal connection component 54 for indicating relative movement of control portion 38 with respect to housing 56.

Figure 4:
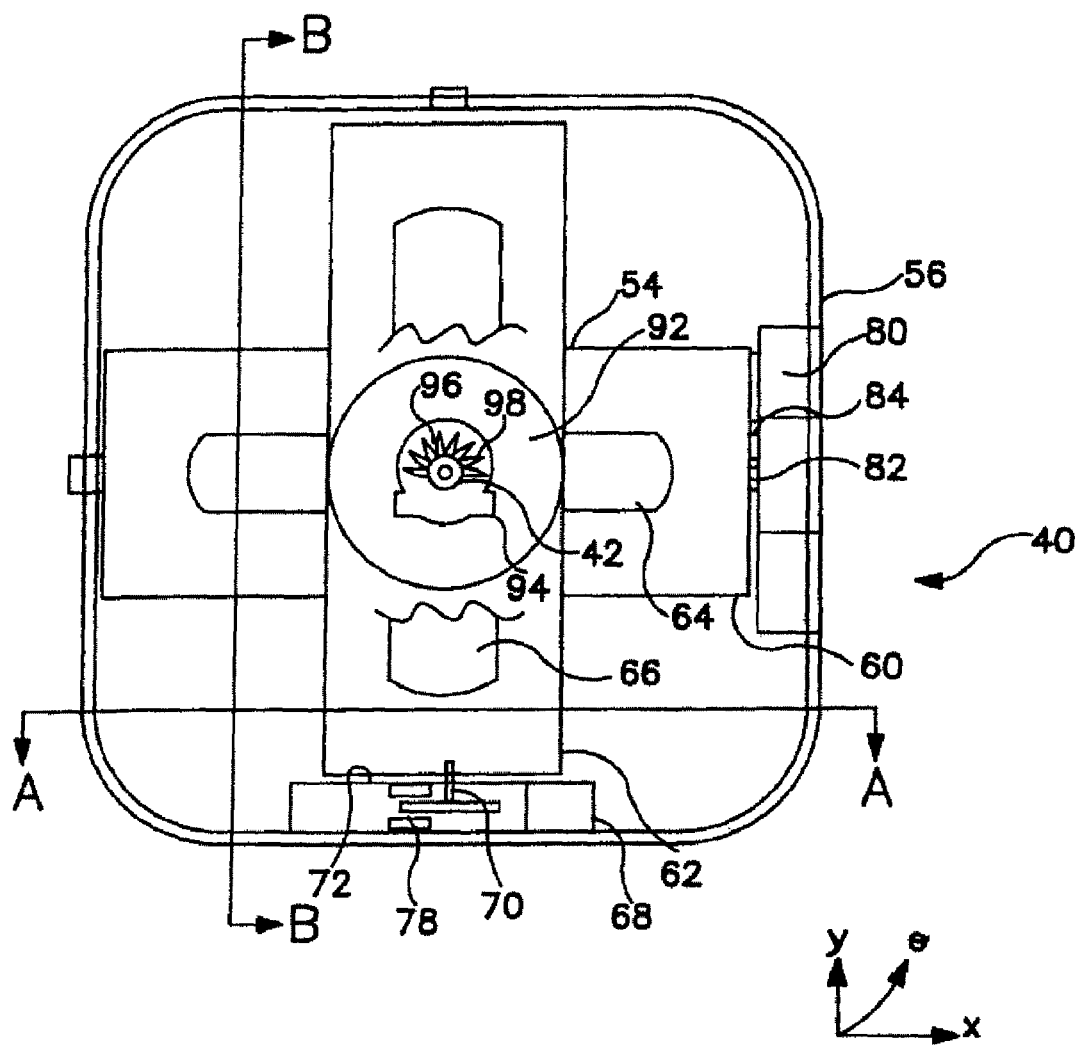
FIG. 4 depicts an overhead view of a portion of a universal input device according to an embodiment of the present invention.

FIG. 4 depicts an overhead view of base portion 40. Universal connection component 54 may comprise a gimbal mechanism, for example. In this embodiment, the gimbal mechanism may comprise a first cross portion 60 and a second cross portion 62. Each of the cross portions comprise a slot 64 and 66 respectively for permitting shaft 42 to pass through a portion of the cross portion and to be moved along the major axis of the cross portion. For example, first cross portion 60 may be disposed along the x-axis and comprises slot 64. When a user moves control portion 38 (and thus shaft 42 which is attached thereto) in the x-direction, shaft 42 passes along slot 64 without restraint by any portion of first cross portion 60. At the same time, however, shaft 42, when moved in the y-direction, abuts a side wall of slot 66 of second cross portion 62. Therefore, as shaft 42 moves in the y-direction, second cross portion 62 also rotates about its axis in the y-direction.

Figure 5:
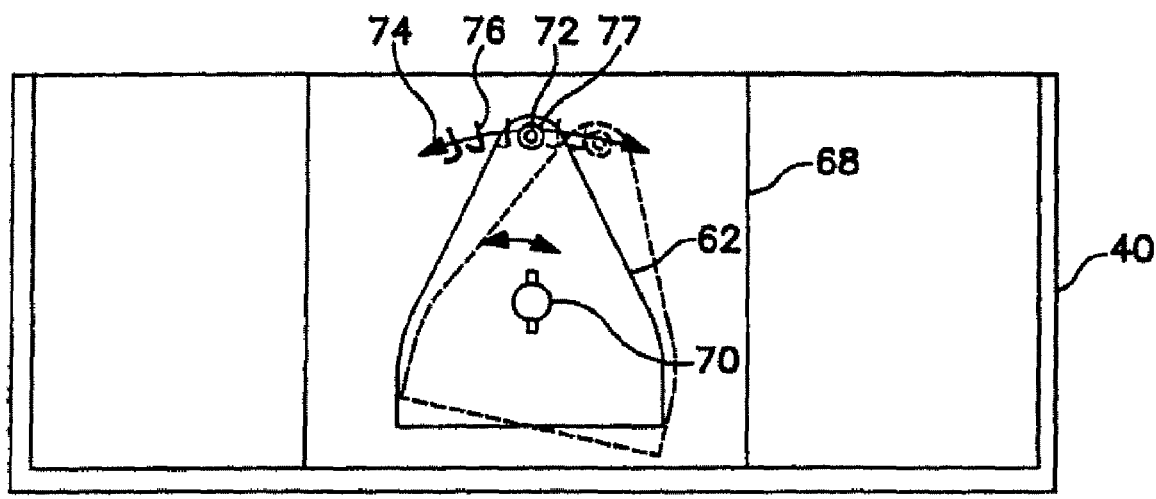
FIG. 5 depicts a cross-sectional view of the portion depicted in FIG. 4 taken along line A-A.

The rotation of second cross portion 62 may be described in greater detail with respect to FIG. 5. FIG. 5 depicts a view taken along A-A of FIG. 4. Second cross portion 62 connects to a spring housing 68 via an axis 70. Second cross portion 64 and spring housing 70 are separated by a ball bearing 72 which rotates with second cross portion 62 along a bearing pathway 74. Bearing pathway 74 comprises a plurality of indents 76 on either second cross portion 62 or spring housing 70. Spring housing 70 houses a spring mechanism 78 which operates to resist movement of second cross portion 62 from its vertical position. Upon release of control portion 38 by the user, spring mechanism 78 operates to return second cross portion 62 to a vertical position as depicted in FIG. 5. Any type of spring mechanism 78 may be used to perform t i u s function such as a steel spring, for example.

First cross portion 60 operates similarly to movement of shaft 42 along the y-axis. First cross portion 60 connects to a spring housing 80 via an axis 82 separated by a ball bearing 84 along a bearing pathway 86. Bearing pathway 86 comprises a plurality of indents 88 on either first cross portion 90 or spring housing 80.

In a preferred embodiment, indents 76 and 88 are placed along bearing pathway 74 and 86 respectively about 10 degrees apart such that all eleven indents (in a preferred embodiment), representing a position for control portion 38, may be within f h t y degrees of the predesignated starting position 77. Alternatively, other degrees of separation of indents 76 and 88 may be provided according to comfort of users' hands, wrists and arms when moving control portion 38 through these positions. For example, it may be determined that 2 degrees of separation may be desired or t h t y degrees of separation. Moreover, the degree of separation may depend upon the skill level of the user or the number of positions that are being provided. If many positions are provided, it may be desirable to space indents 76 more closely SO the total degree of separation from predesignated starting position 77 may not exceed a predetermined amount, such as about 90 degrees or 60 degrees, for example.

Universal connection mechanism 54 may also comprise a track ball mechanism, for example, as described with reference to FIG. 11. Other universal connection devices may also be used which permit movement through at least two directions and through a plurality of positions (preferably discrete positions).

In another embodiment, base portion 40 may also comprise a rotational mechanism 92 (depicted in a cut-out portion of FIG. 4). Rotational mechanism 92 operates to permit rotational movement of control mechanism 38 with respect to base portion 40 (ie., along an arc θ). Rotational mechanism 92 comprises a support portion 94 and a spring portion 96 which operate to provide resistance to movement of shaft 42 in a rotational direction. A plurality of indents 98 are provided as shaft 42 is rotated along arc θ. In a preferred embodiment, eleven total indents are provided.

Figure 6:
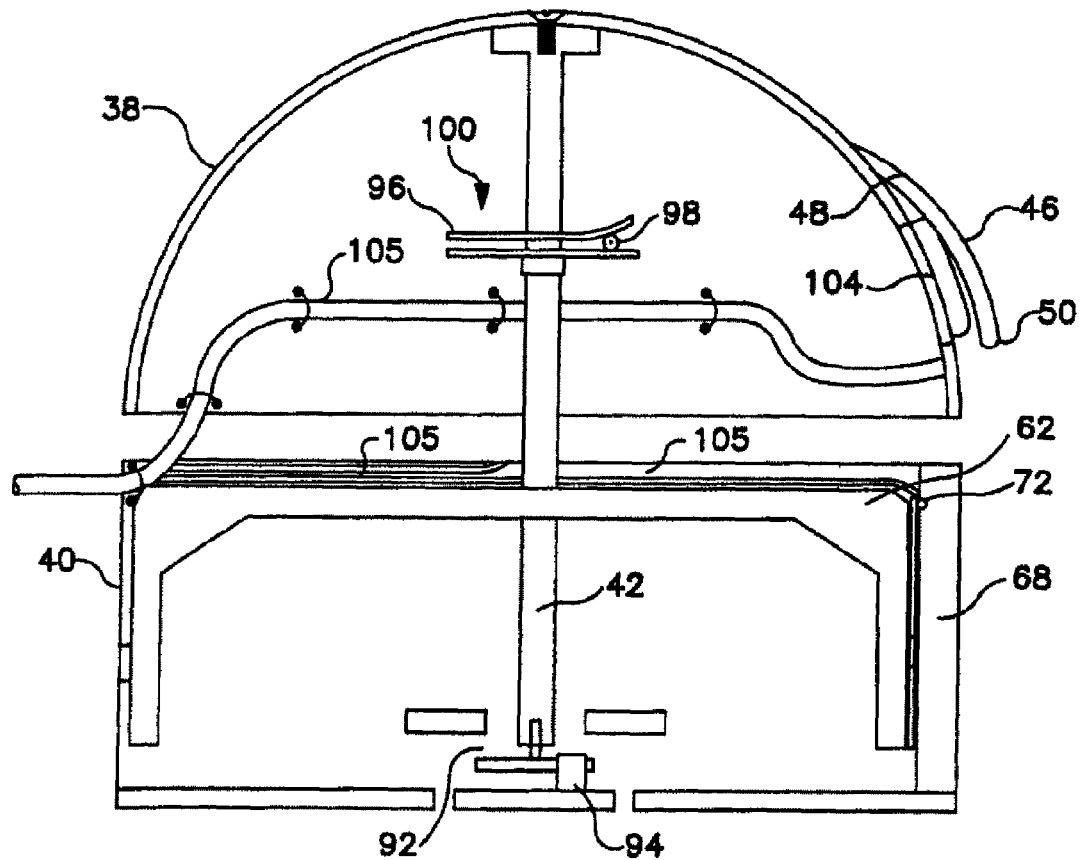
FIG. 6 depicts a cross-sectional view of the universal input device of FIG. 3 taken along line B-B of FIG. 4.

FIG. 6 depicts UID 16 (including control portion 38) taken along line B-B. As depicted in FIG. 6, in connection with rotational mechanism 92, a ball bearing-spring device 100 may be provided. Ball bearing-spring device 100 may provide a plurality of indents 98. At each of the indents of UID 16, an electrical indicator 102 may be provided. These electrical indicators 102 connect to UID signal generator 16 via wires 105, for example. Electrical indicators 102 provided at each of the positions along the x-direction, y-direction and arc 0 comprise UID triggers 34 which sense movement of control portion 38 into the positions and signal that movement to UDD signal generator 36. UID signal generator 36 then signals computer 12 of this movement for further processing. In that regard, UID 16 may operate like a joystick, for example, by signaling movement of the control portion 38.

As further depicted in FIG. 6, each finger portion 46 comprises an electromechanical switch mechanism 104 (comprising UID triggers 34) which may be connected by wires 105 to UID signal generator 36. Therefore, UIDs 16 provide for movement in three dimensions through a plurality of distinct positions with UID triggers 34 to detect movement through these positions as well as depression of the finger portions 46. In a preferred embodiment, eleven positions are provided in the x-direction, the y-direction, and along arc θ, each of which may be sensed by the UID triggers 34 and indicated to computer 12. Additional or fewer positions may be provided as desired to meet the conditions for which the UIDs are used. UIDs 16 operate as an input device through depression of finger portions 46*a-e* and/or movement of control portion 38 through one of the distinct positions. Wires 105 may also be provided to connect to electrical indicators 102 which comprise the other UID triggers 34.

In a preferred embodiment, five pairs of wires are provided for each of the five finger portions. Also, three sets of four wires are provided for the electrical indicators 102 (one set for each electrical indicator). These wires may be then packaged in a single sheath extending from housing 56 to UID signal generator 34. Alternatively, UID signal generator 34 may be disposed within housing 56. UID signal generator 34 may then be connected to computer 12 through a standard wire and input device connector arrangement. Electrical indicators 102 may communicate with UID signal generator 34 using wireless technology such as RF, microwave, and the like.

Figure 15:
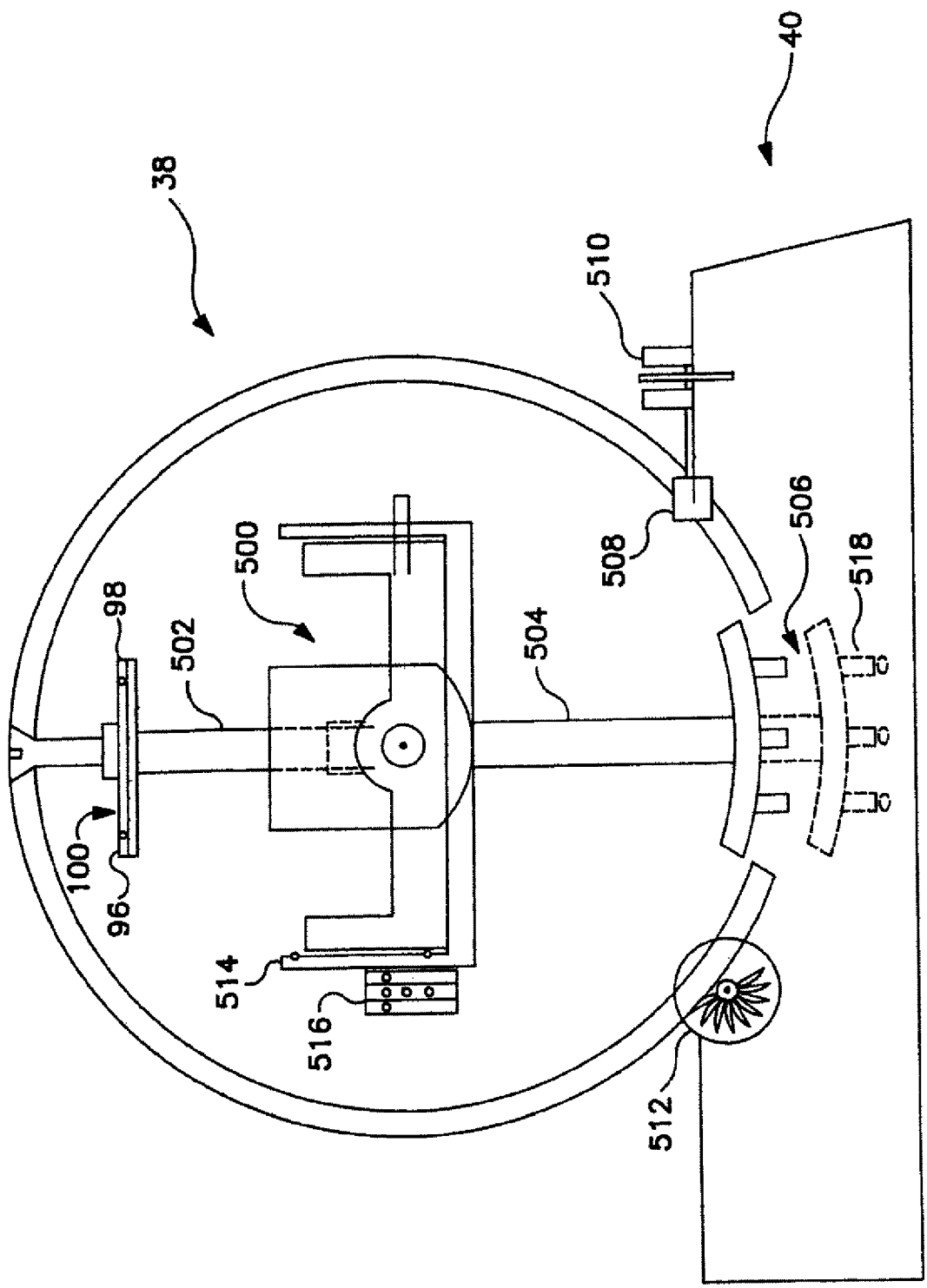
FIG. 15 depicts a cross-sectional view of a universal input device according to yet another embodiment of the present invention.

In another embodiment, UID 16 may comprise a track ball mechanism for Universal connection mechanism 54. FIG. 15 depicts an UID 16 having such a mechanism according to one embodiment of the present invention. In h s embodiment, control portion 38 comprises a sphere, e.g., track ball. For example, a four inch in diameter plastic sphere may be used as the outer shell for control portion 38. A two piece rod 502/504 connected control portion 38 to base portion 54. Disposed between upper rod 502 and lower rod 504 is a gimbal mechanism 500. Gimbal mechanism 500 may operate similarly to the gimbal mechanism depicted and described with respect to FIG. 4. Lower rod 504 supports gimbal mechanism 500 and is mounted on removable plate 506 disposed in the bottom of control portion 38. A plurality of detect devices 514 may be provided in gimbal mechanism 500 for indicating relative movement of control portion 38 with respect to base 40. Electronic readers 516 may be provided in connection with detect devices 514. Other electronic readers 510 and 512 may also be disposed on base portion 40. These readers may detect the universal movement of the spheric control portion through base portion 40. Plate 506 may be depressed into and Med out of a recess portion 518 to activate or deactivate rotational mechanism 100. As such, a track ball mechanism is provided which "hides" the inner workings of the UID and provides an alternative control portion 38 format.

UID 16 may be used to operate a multitude of devices for receiving input. For example, UID 16 may be used to operate computer software, mechanical devices such as vehicles, communications equipment, interactive television equipment, audio equipment, or the like. UID 16 may be operated for use for any system in which a keyboard, mouse, or joystick previously were utilized. For purposes of illustration, however, UID 16 may be used in a system according to another embodiment of the present invention.

As depicted in FIGS. 1 and 2, for example, two UIDs 16 may be in communication with computer 12. As depicted, these UIDs 16 may be connected by wiring. Also, wireless communication between the UIDs and computer 12 may also be used. For example, RF, microwave, and other wireless communication techniques may be used.

Moreover, computer 12 may comprise a memory 22 which contains an UID interpretation unit 24. According to one embodiment of the present invention, UID interpretation unit 24 may receive signals from UID signal generator 36 via I/O device 20 and microprocessor 18. UID interpretation unit 24 operates to generate instructions from the signals and provides those instructions for operating system 28 and task based components 30.

Memory 24 also stores a character presentation unit 26. Character presentation unit 26 operates to present a character selection graphic 106 on display 14 of system 10. In a preferred embodiment, character presentation unit 26 displays a plurality of characters in an arrangement corresponding to the arrangement of finger portions 46 of UID 16. For example, in a preferred embodiment, character selection graphic 106 may depict at least ten columns of characters, one column corresponding to each of the ten finger portions (from the two UIDs 16). Additionally, multiple rows, additional columns and additional features may be presented.

Figure 7A:
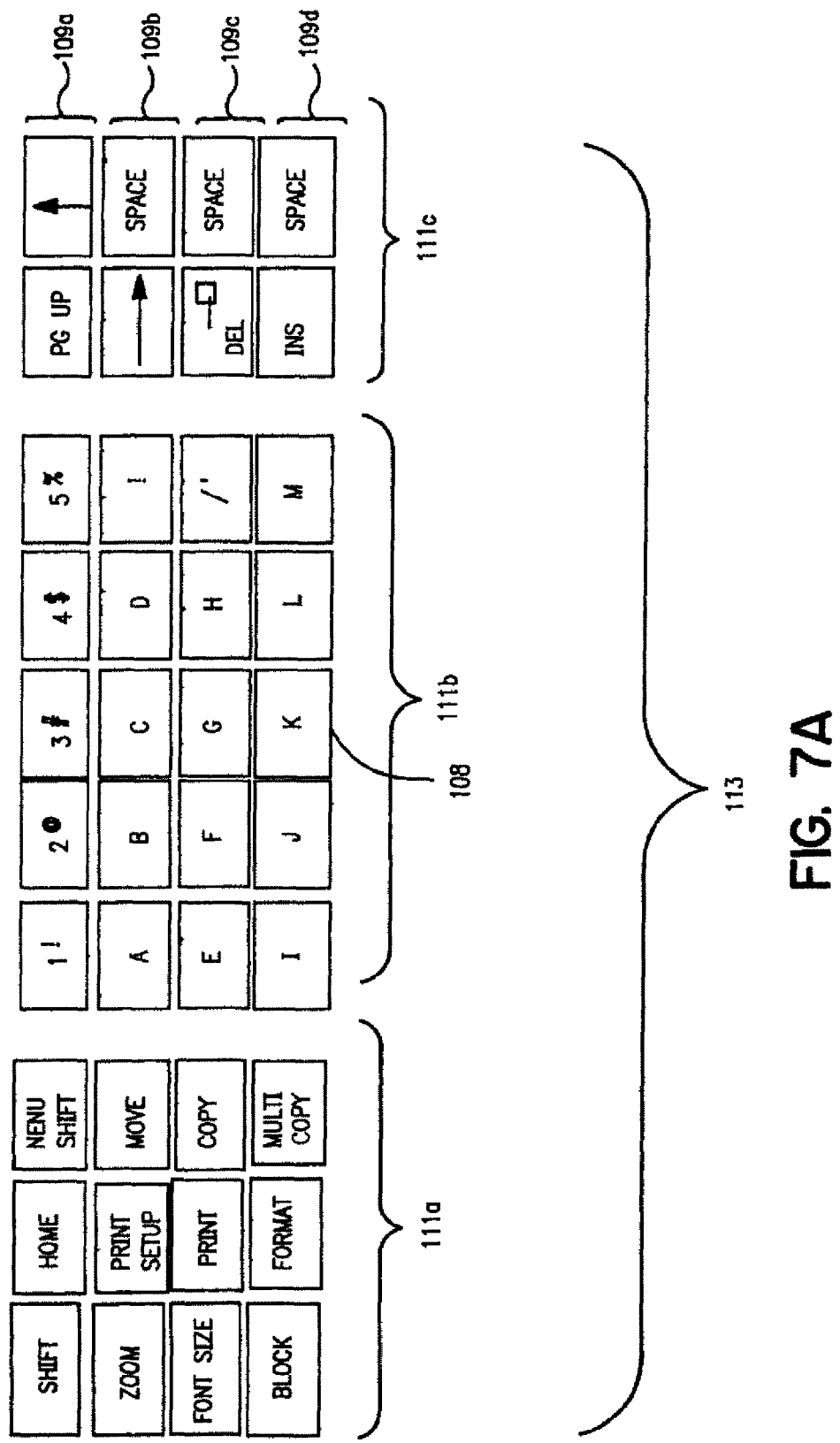
FIGS. 7A-B depict a character selection graphic according to an embodiment of the present invention.
Figure 7B:
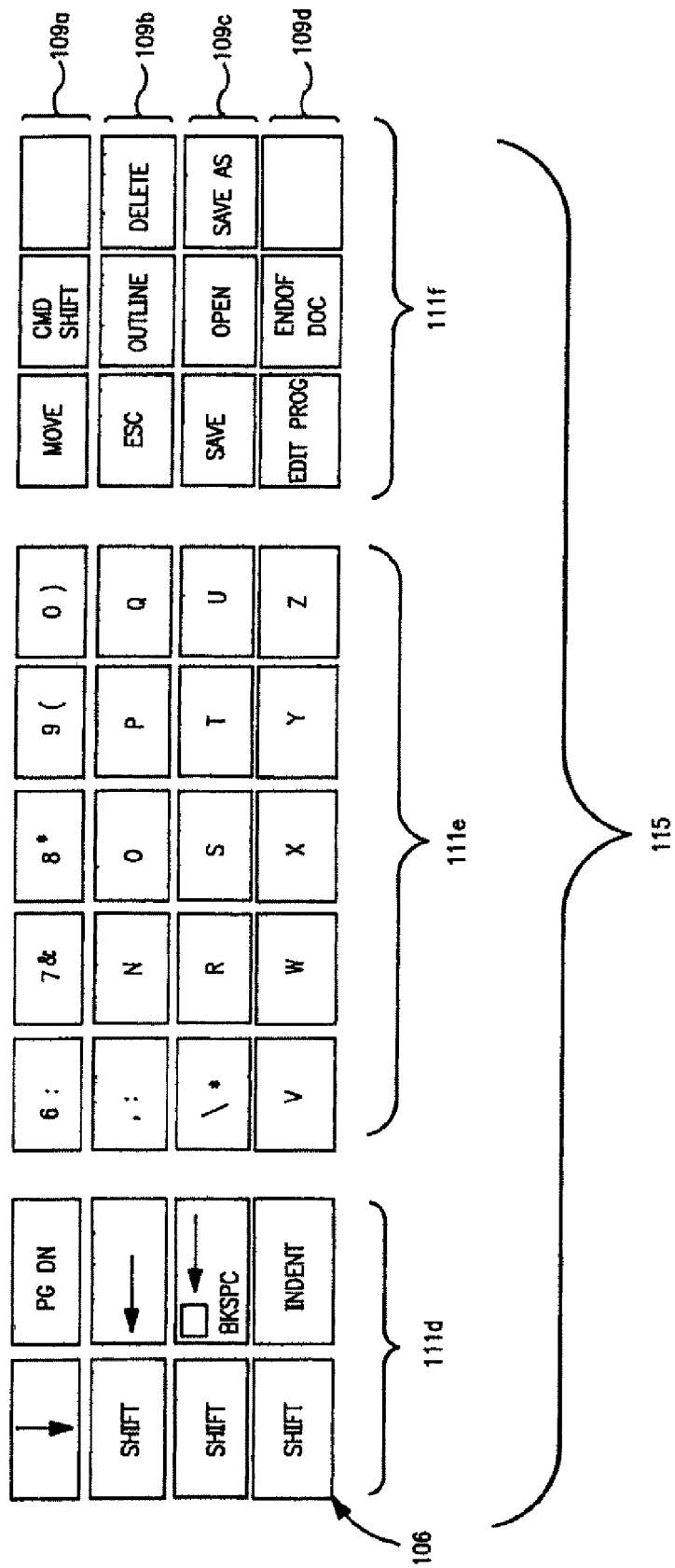

For example, FIG. 7 depicts one embodiment of a character selection graphic 106. Character selection graphic 106 comprises a plurality of character selection icons 108. Character selection icons 108 may be arranged in a plurality of rows 109a-d and a plurality of vertical clusters 111a-f. As depicted in FIG. 7, character selection graphic 106 may be presented below the currently active cursor position. As the user continues to input characters, character selection graphic 106 may scroll down the screen so that it is always depicted above the current cursor position. Alternatively, the currently active cursor position may scroll through character selection graphic 106.

In a preferred embodiment, one of the rows of character selection graphic 106 comprises a home row, for example row 109c. The home row corresponds to a predesignated starting position for control portion 38 of each of the UIDs 16. For example, the predesignated starting position for control portion 38 may be such that control portion 38 is in its natural position as connected to universal connection mechanism 54. Other rows may correspond to other positions of control portion 38 with respect to base portion 40. For example, row 109b may correspond to one position up in the x-direction. Row 109a may correspond to two positions up in the x-direction. Row 109d may correspond to one position back in the negative x-direction. In a preferred embodiment, UIDs 16 may be moved through five positions in the x-direction and five positions in the negative x-direction. Therefore, eleven rows may be provided in character selection graphic 106. Alternatively, as depicted in FIG. 7, only four rows may be provided. Other arrangements of rows may also be used.

Preferably each row may be divided into a left sub-row 113 and a right sub-row 115. The character selections icons 108 for each row may be distributed among left sub-row 113 and right sub-row 115. Character selection icons 108 distributed in left sub-row 113 may be selected by use of one of the UIDs 16 (for example, the left one); whereas character selection icons 108 distributed in right sub-row 115 may be selected by use of the other UID 16 (for example, the right one). Each character selection icon 108 corresponds to a finger portion 46 on UID 16. In a preferred embodiment, each sub-row comprises at least five character selection icons 108, each character selection icon corresponding to one of five finger portions 46 on one of the UIDs 16.

Additionally, each sub-row may be divided into a plurality of vertical clusters 111a-f of character selection icons 108. For example, as depicted in FIG. 7, left sub-row 113 comprises vertical clusters 111a-c and right sub-row 115 comprises vertical clusters 111d-f. Each vertical cluster may contain a plurality of character selection icons 108 with each character selection icon in the vertical cluster corresponding to one finger portion 46. Further, each vertical cluster of character selection icons 108 corresponds to a position of control portion 38 along the y-axis.

For example, vertical cluster 111e may correspond to the home position of the right hand UID, vertical cluster 111d may correspond to a left position along the y-direction, and vertical cluster 111f may correspond to a right position along the y-direction. Likewise, vertical cluster 111b may correspond to the home position of the left hand UID, vertical cluster 111a may correspond to a left position along the y-direction, and vertical cluster 111 may correspond to a right position along the y-direction.

Moreover, each character selection icon 108 may have a plurality of functions and characters associated therewith. For example, a character selection icon 108 for the letter t may be associated with a lower case t, an upper case T, an italicized t a subscript $_t$, a superscript $^t$, etc. The various characters associated with a particular character selection icon 108 may be selected by rotating control portion 38 through the various positions along arc 8. In this manner, in a preferred embodiment in which seven positions are provided along arc θ, each character selection icon 108 may be associated with seven characters.

For example, each sub-row may comprise eleven vertical clusters with each vertical cluster containing five or more character selection icons 108. Therefore, each sub-row may comprise up to 55 character 30 selection icons 108 when using five finger portions 46 with eleven positions along the y-axis. Also, using eleven positions in the x-direction permits eleven rows of 55 character selection icons for a total of 605 character selection icons per UID. Moreover using rotational selection with rotational mechanism 92, eleven characters and functions may be associated with each character selection icon for a total of 6,655 characters and with two UIDs, that permits a user to be able to select 13,310 characters without requiring the user to remove his finger from UID 16 or remove his eyes from screen 14.

At all times, one of the sub-rows for each of the UIDs 16 is "active", one of the vertical clusters for each of the UIDs 16 is "active," and one character for each character selection icon 108 is "active." In other words, when a user depresses one of the finger portions 46, the active character for the character selection icon 108 corresponding to that finger portion 46 for the active sub-row and the active vertical cluster is selected. Correspondingly, a character or function associated with the character selection icon 108 is inputted because depression of one of the finger positions 46 and the movement of control portion 38 into one of the x-direction and one of the y-direction positions provide impulses which cause UID signal generator 36 to signal those three values. Character presentation unit 26 interprets the signals and generates a command to input the character or function associated with the desired character selection icon 108.

To further illustrate an example of the interaction between UID 16, character selection graphic 106, UID signal generator 36, and character presentation unit 26 consider the characters presented in FIG. 7. The following table indicates the positions of the left and right UIDs 16 and which finger portion 46 may be used to select example character selection icons depicted in FIG. 7 according to one embodiment of the present invention.

| | Left | | | Right | | |
|---|---|---|---|---|---|---|
| Character/ Function | x-position | y-position | finger portion | x-position | y-position | finger portion |
| Menu shift | one left | two up | index | | | |
| 1 | home | two up | little | | | |
| ! | home | two up | little | left | home/one up or one down | |
| 5 | home | two up | thumb | | | |
| % | home | two up | thumb | left | home/one up or one down | |
| page up | right | two up | index | | | |
| ↓ | | | | left | two up | index/ middle |
| 6 | | | | home | two up | thumb |
| ^ | left | two up | little | home | two up | thumb |
| 7 | | | | home | two up | index |
| & | left | two up | little | home | two up | index |
| cmd/shift | | | | right | two up | index |
| copy | left | home | index | | | |
| h | home | home | index | | | |
| m | one down | home | humb | | | |
| space | right | home/one up or one down | index | | | |
| ; | left | two up | little | home | one up | thumb |
| bk sp | | | | left | home | ring/ little |

-continued

| | Left | | | Right | | |
|---|---|---|---|---|---|---|
| Character/ Function | x-position | y-position | finger portion | x-position | y-position | finger portion |
| r | | | | home | home | index |
| z | | | | home | one down | little |
| ext/pgm | | | | right | one down | index |

Each character selection icon thus corresponds to an x-direction position, a y-direction position and a finger portion on one of the UIDs. For example, therefore, when the user positions UID 16 of the left hand one position up in the y-direction and depresses the finger portion 46b under his index finger, UID interpretation unit 24 and character presentation unit 26 operate to determine that a letter d has been selected by the user. Character presentation unit 26 may comprise a look-up table corresponding the x-direction position, y-direction position, and finger portion of each of the UIDs to a character/function. Character presentation unit 26 may then receive a signal from UID interpretation unit 24 indicating the x-direction, y-direction, and finger portions and use those values as the index into the look up table. Upon determining the correct value from the look-up table, character presentation unit 26 may then generate a signal to operating system 16 indicating the character to be input or the function to be performed.

To assist a user in understanding the correspondence of certain finger portions with certain character selection icons, the sub-row and vertical cluster for each UID 16 which is "active" may be differentiated from the other sub-rows. For example, the character selection icons in the sub-row which is active may be highlighted with shading, different coloring, different fonts, different point sizes, raised appearance, etc. Further, as the user moves control portion 38 to various positions, the sub-row and vertical cluster corresponding to the new positions may become differentiated. Also, the character selection icon 108 may be differentiated depending on the character which is active. For example, if a bold g is active on the character selection icon 108, the letter g may be bolded in the icon. Other methods of displaying the active character or function may also be provided. Therefore, at all times, the user may be able to determine see what characters may be selected with the use of finger portions 46 by viewing character selection graphic 106 on screen 14.

Figure 8:
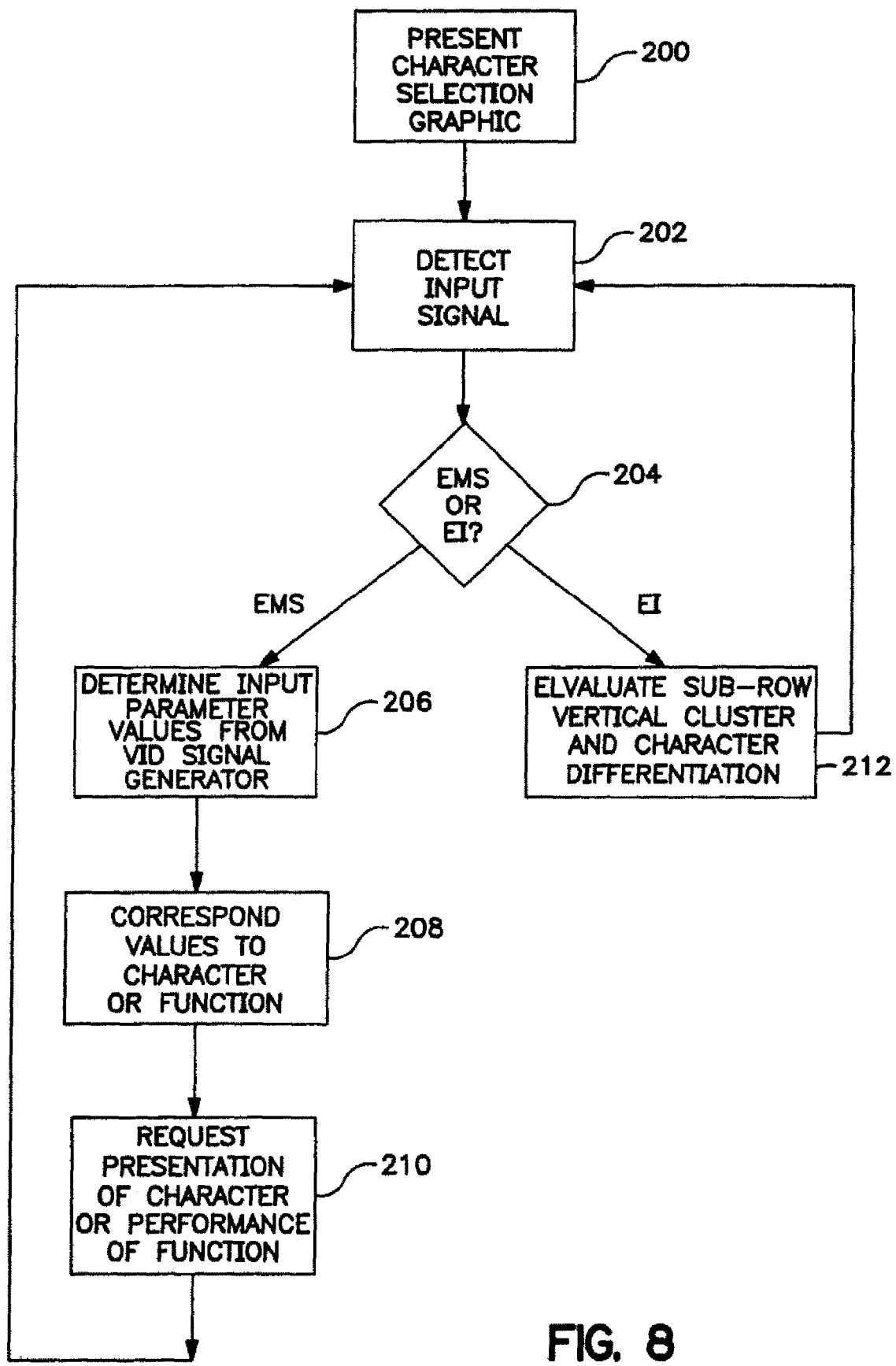
FIG. 8 depicts a flow diagram for operation of a computer system according to an embodiment of the present invention.

Overall flow of operation by character presentation unit 26 according to one embodiment is depicted in FIG. 8. Character presentation unit 26 presents a character selection graphic 106 on display 14 (step 200). Character selection graphic 106 may be modified to meet a user's desired formatting requirements through an interface with character presentation unit 26. For example, rather than presenting eleven different vertical clusters, only one vertical cluster may be displayed at a time. In that example, character presentation unit 26 may present another vertical cluster upon indication that control portion 38 has been moved into a position corresponding to that vertical cluster.

Next, (step 202) character presentation unit 26 waits for detection of an input signal from UID signal generator 36. UID signal generator 36 generates signals indicative of depression of finger portions 46 (as indicated by electromechanical switches 104) and movement into various positions by control portion 38 by electrical indicators 102. When an input signal is detected, character presentation unit 26 determines whether the signal was from an electromechanical switch 104 or from an electrical indicator 102 (step 204). If the input was from an electromechanical switch 104, one of the buttons on one of the UIDs 16 has been depressed indicating a desire by the user to input a character.

As such, character presentation unit 26 determines the input parameter values from UID signal generator 36 to derive a value for which finger portion 46 was depressed and the three coordinate position of control portion 38 (step 206). Character presentation unit 26 then uses these values to determine the character or function which corresponds to those values as depicted in character selection graphic 106 (step 208). Character presentation unit 26 then cooperates with operating system 28 and task based components 30 to request input of the character or performance of the function requested by the user (step 210). Character presentation unit 26 then returns to step 202 to await a new input signal.

If character presentation unit 26 determines in step 204 that the signal is an electrical indicator 102 signal, then the user desires to switch either the sub-row, vertical cluster, or character. Therefore, in step 212, character presentation unit 26 determines the new sub-row, vertical cluster or character to be presented or differentiated in character selection graphic 106 and effects that change. Character presentation unit 26 then returns to step 202 to await a new input signal.

Figure 9:
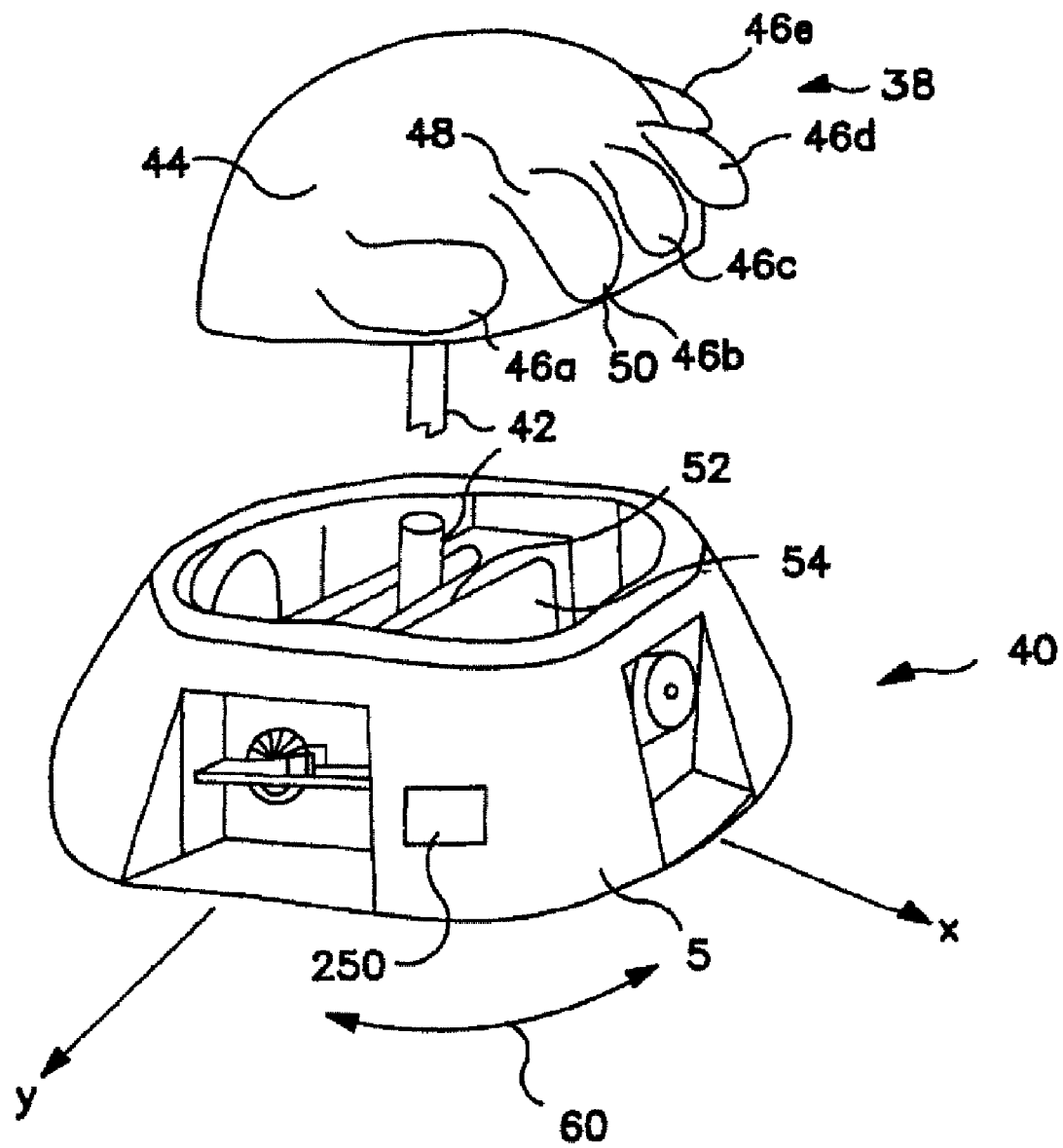
FIG. 9 depicts a perspective view of a universal input device according to another embodiment of the present invention.
Figure 10:
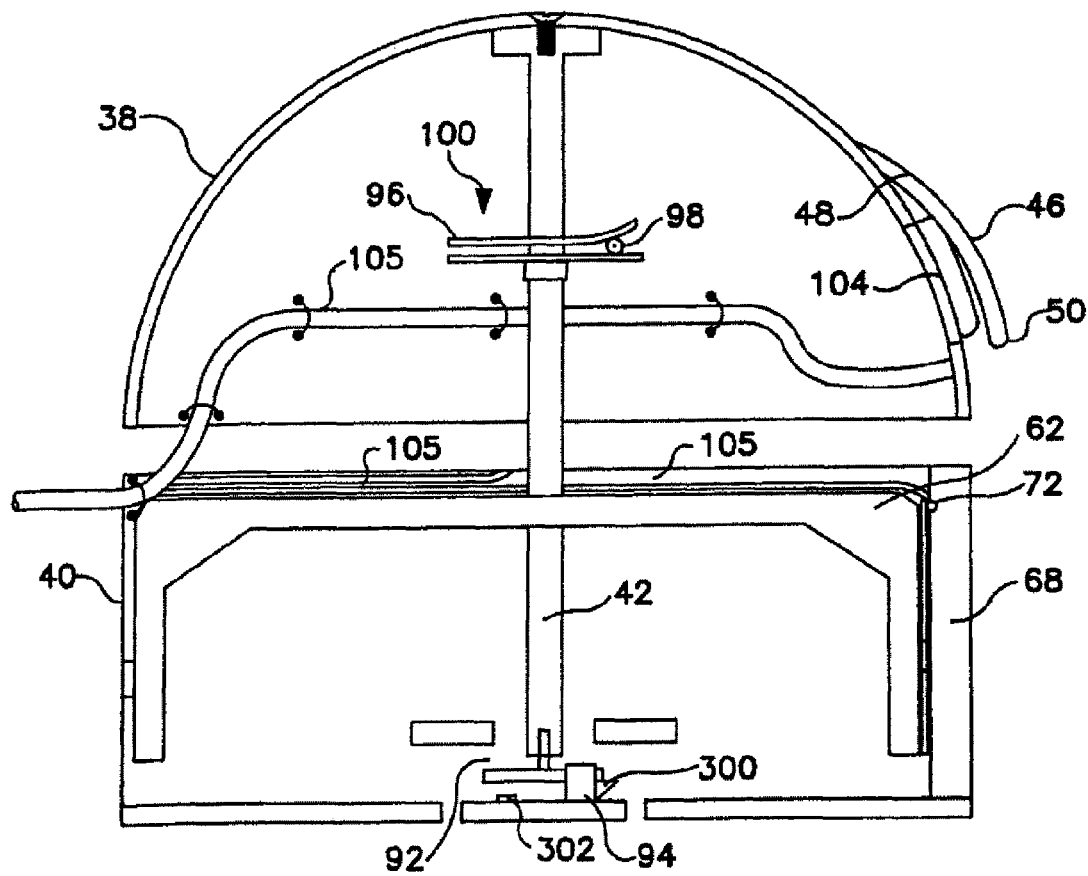
FIG. 10 depicts a cross-sectional view of a universal input device according to yet another embodiment of the present invention.

According to another embodiment of the present invention, each UID 16 may also be operable for movement of a cursor, i.e., in place of a mouse or joystick or other location identification device, Because UID 16 permits movement and signaling of movement in the x-direction, y-direction, and along arc 8, UID 16 functions similarly to a mouse and joystick. To indicate to character presentation unit 26 that the signals represent signals for movement of the cursor, an input selection mechanism 250, for example, as depicted in FIG. 9, may be provided. Input selection mechanism 250 may comprise a switch or other electrical signal generator and may be connected via wires 105 to UID signal generator 34. Character presentation unit 26 may then determine whether UID 16 is operating in character selection mode or cursor movement mode depending on whether the signal from input selection mechanism 250. Based on the signal, character presentation Unit 26 may modify the character presentation graphic 106 according to movement of control portion 38 if the UID is in character selection mode or generate cursor movement signals is UID is in cursor movement mode. In this manner, UID 16 may provide all of the function of a keyboard, mouse, and joystick and thus is a universal input device.

Input selection mechanism 250 may also comprise a snapping mechanism 300 provided in the bottom of housing 56. In this embodiment, a user may select one of the two modes of operation by depressing control portion 38 into housing 56. By depressing control portion 38 again, the other mode of operation may be selected. An electrical connector 302 may be provided for signaling which mode of operation the user has selected. Snapping mechanism 300 may comprise any depression button mechanism as is commonly used in the electronics art. Snapping mechanism 300 may also comprise a toggle switch, detent, or the like.

Figure 11:
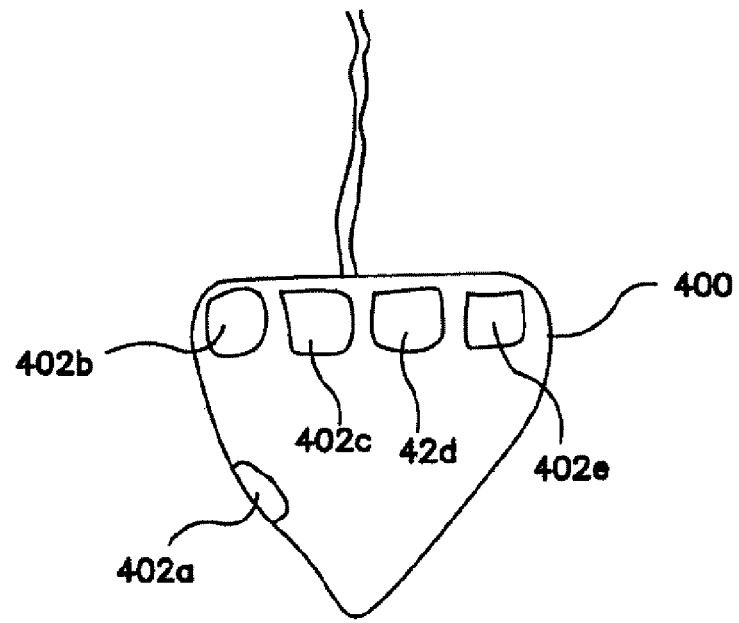
FIG. 11 depicts an overhead view of a universal input device according to another embodiment of the present invention.

According to yet another embodiment, the UIDs of the present invention may be implemented using a UID mouse 400 having five input buttons 402a-e as depicted in FIG. 11 (an overhead view). Also, a four input button UID mouse 400 may be provided. Other numbers of input buttons may also be used within the scope of the present invention.

Figure 12:
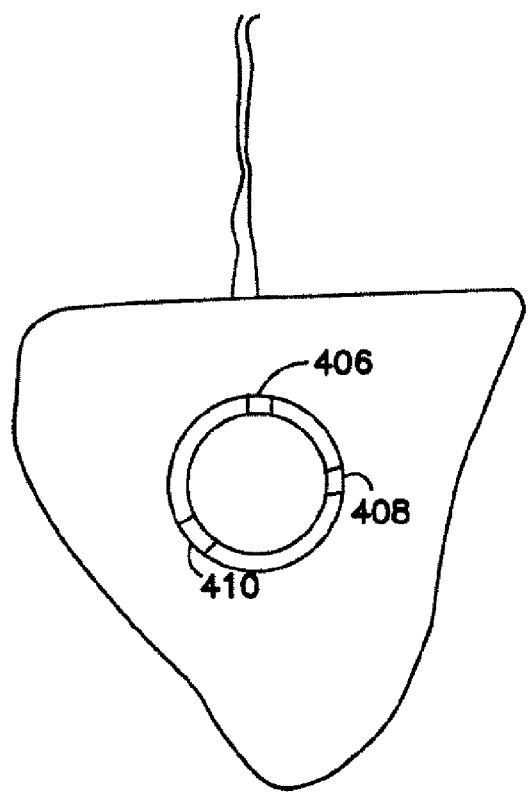
FIG. 12 depicts an under side view of a universal input device according to another embodiment of the present invention.

Movement of UID mouse 400 and selection of input buttons 402a-e effects operation similarly to UIDs 16 with UID mouse 400 movements indicating sub-row and vertical cluster and input buttons 402a-e selecting the character within the sub-row and vertical cluster for each mouse. For more accuracy, as depicted in FIG. 12 (an underside view), for example, three mouse wheels 406,408, and 410 may be provided such that three sensor signals per mouse may be provided.

Figure 13:
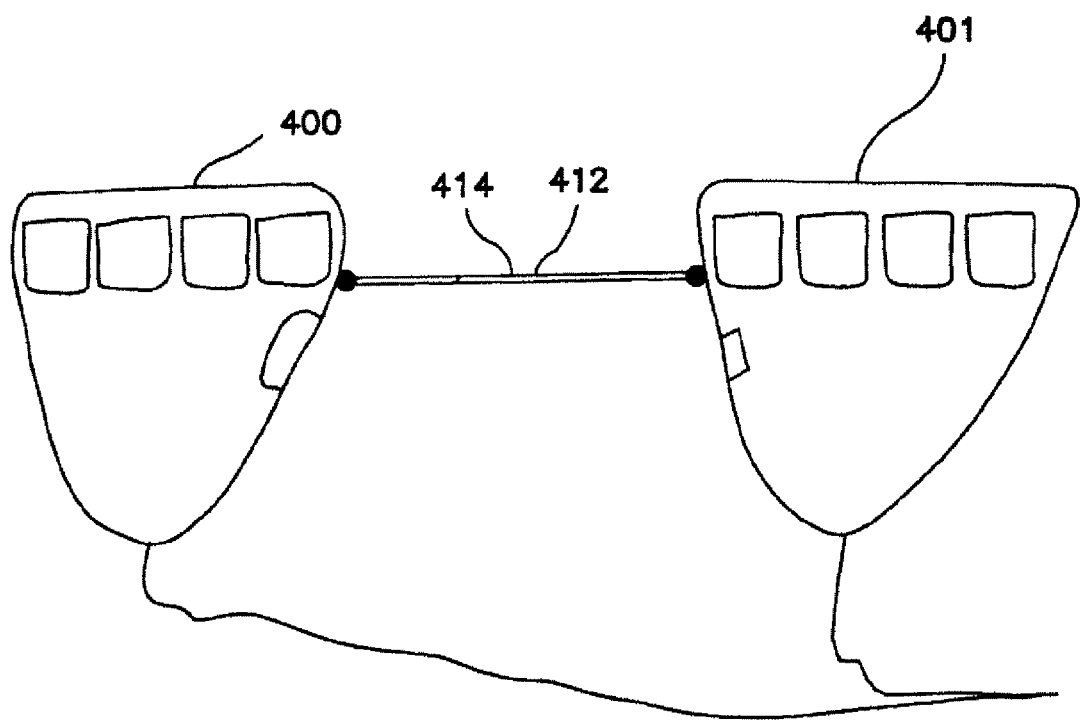
FIG. 13 depicts an overhead view of a universal input device system according to an embodiment of the present invention.

Also, two UID mice 400 and 401 may be used in combination and rather than using mouse wheels to provide signals for positioning purposes, an electrical signal may be generated providing relative location of the two UID mice. By providing a signal indicating relative location of the two UID, accurate positional signals may be provided. FIG. 13 depicts one embodiment of the present invention in which two UID mice 400 and 401 are mechanically connected by a connector mechanism 412. Connector mechanism 412 may comprise a brace, strap, belt, or the like. A leveling sensor 414 may be provided for indicating relative location of the two UID mice 400 and 401. Leveling sensor 414 may be disposed within connector mechanism 412, for example. The relative location may then be used for repositioning a cursor or presenting different sub-rows or vertical clusters on character presentation graphic 106.

Figure 14:
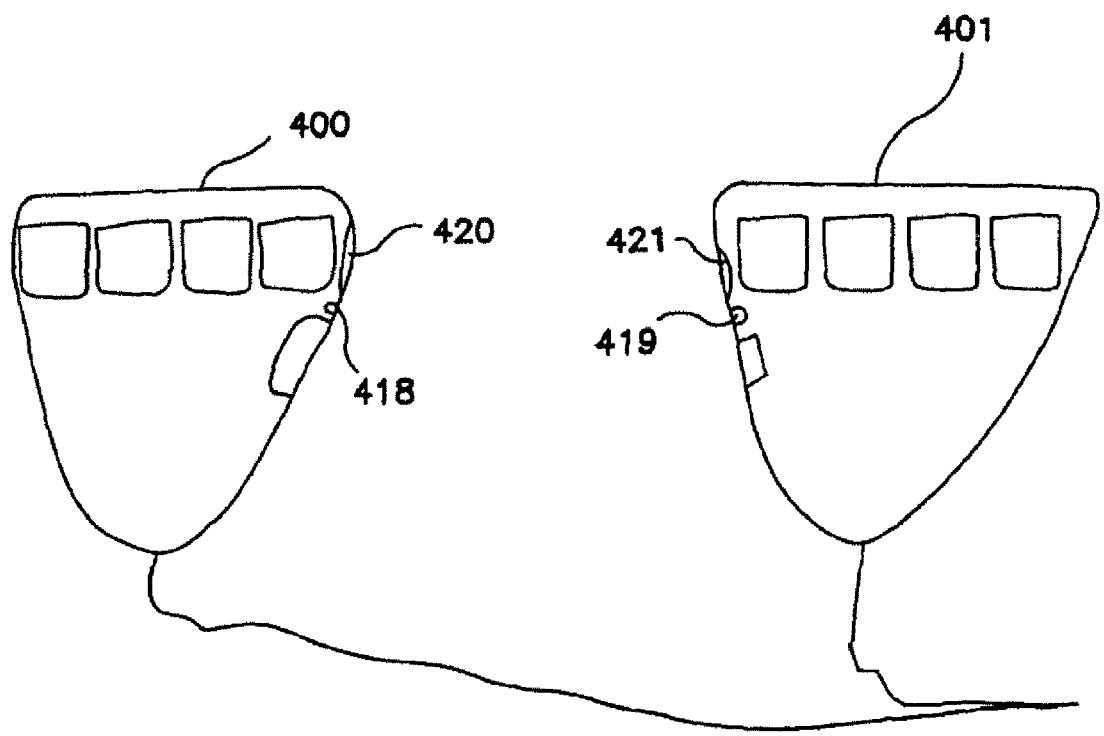
FIG. 14 depicts an overhead view of a universal input device system according to another embodiment of the present invention.

Also, a relative positional signal may be provided from communication devices 416 between UID mice 400 and 401. Communication devices 416 may comprise sound or light based signaling devices. For example, communication devices 416 may comprise a infrared signaling and sensors mechanism as depicted in FIG. 14. In FIG. 14, each UID mouse 400 and 401 is provided with an infrared signaling mechanism 418 and 419 and an infrared receiving mechanism 420 and 421. Infrared signaling mechanism 418 intermittently signals and infrared receiving mechanism 421 receives the signal. Likewise, infrared signaling mechanism 419 intermittently signals and infrared receiving mechanism 420 receives the signal. Infrared receiving mechanisms 420 and 421 then provide directional information indicating from which direction the signal was received. In this manner, relative location of the two UID mice may be derived. Also, a single infrared signaling mechanism and receiving mechanism may be used.

Other mechanisms for providing signals indicating relative location of the two UID mice may also be used. Essentially, by using relative location, a more accurate signal indicating the movement of the mouse may be provided because the mice are then not reliant on often variable conditions such as friction of the surface and weight placed on the mouse by the user and direction of origin, etc.

Figure 16:
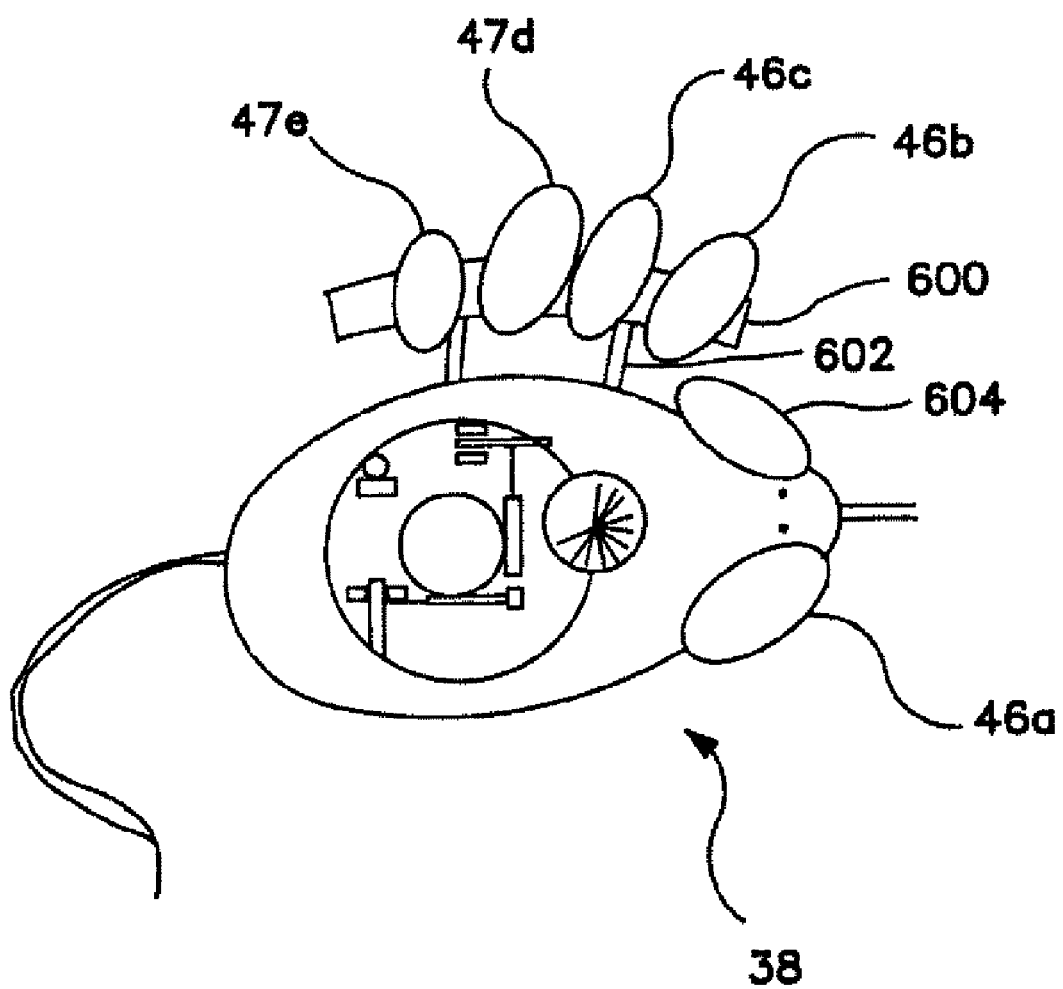
FIG. 16 depicts an overhead view of a universal input device system according to an embodiment of the present invention.

According to another embodiment of the present invention, UID 16 may comprise adjustable finger portions. FIG. 16 depicts another embodiment of a UID mouse 400 having a infrared signaling and sensing mechanism. Finger portions 46 may be disposed an a finger portion bar 600 which is attached to control portion 38 be one or more support portions 602. Finger portion bar 600 may be adjustable in three directions so as to move it closer or farther away from control portion 38, up or down, or left or right to suit a user's particular comfort level. Thumb portion 46a may be disposed on control portion 38 or on a separate bar attached to control portion 38.

Also, another button or portion 604 may also be provided for activating or deactivating a rotation mechanism 100.

Figure 17:
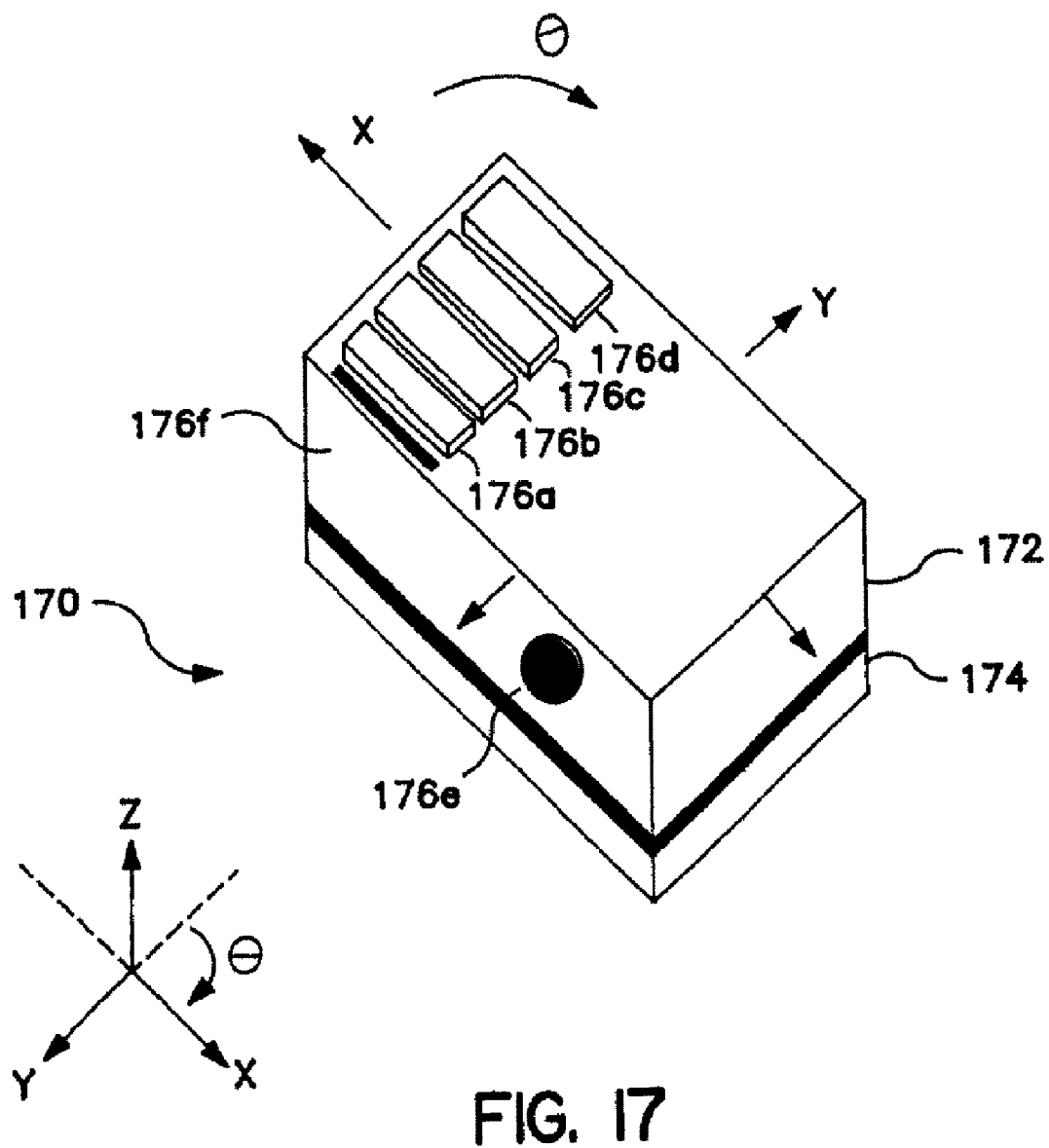
FIG. 17 depicts a perspective view of a universal input device according to another embodiment of the present invention.

Another embodiment of the invention is shown in FIG. 17. Control portion 172 is provided and universally connected to base 174. Base 174 may include suction cups (not shown) to facilitate the mounting of UID 170 to a table or the like. Control portion 172 is universally mounted to base 174. In a preferred embodiment, this is accomplished through two gimbals and a rotational mechanism. Control portion 172 comprises four input keys 176a-d. In a preferred embodiment, input keys 176a-d are the long "SHIFT" keys on the lower right side of a standard keyboard. Each key may be assigned to a finger. For example, key 176a may be assigned the index finger, 176b the middle finger, 176c the ring finger, and 176d the pinky. Key 176e may be provided for the thumb. Key 176e may be a button, a key, or any other suitable input means.

Figure 18:
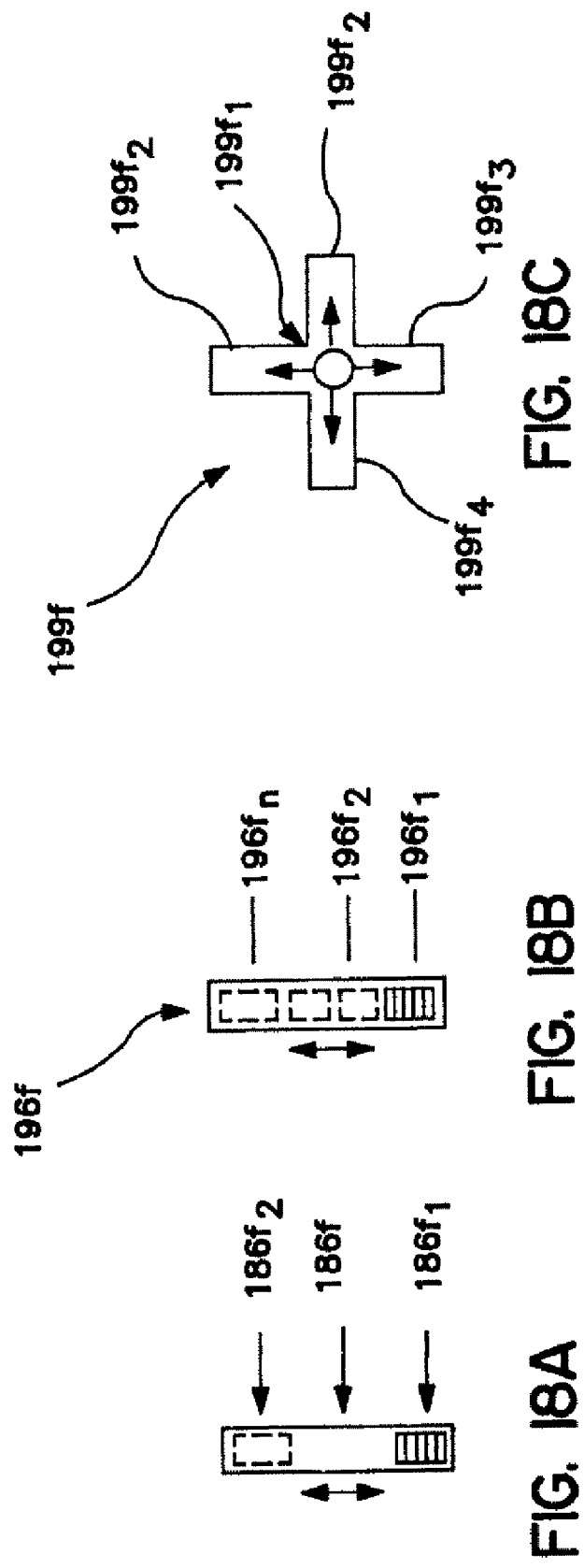
FIG. 18a depicts a top view of a slider according to one embodiment of the present invention.
FIG. 18b depicts a top view of a slider according to another embodiment of the present invention.
FIG. 18c depicts a top view of a slider according to another embodiment of the present invention.

Different types of sliders 176f may be provided. Referring to FIGS. 18a and b, In one embodiment, the slider may be moved in the x-direction. Slider 186f may have two positions, 186f, and 186f2. Slider 186f may be a two-position switch or a similar device. In another embodiment, shown in FIG. 18b, slider 196f may also have a plurality of positions in the x-direction, indicated as $196f_1$, $196f_2$, ... $196f_n$. Slider 196f may be a multi-position switch, a potentiometer, or a similar device. In another embodiment, slider 176f may operate like a joystick, providing a plurality of directions and a plurality of positions along those directions. Referring to FIG. 18c, in a preferred embodiment, slider 199f is provided with four directions of motion ($199f_2$, $199f_3$, and $199f_4$, $199f_5$), and each direction has one position. Thus, including the home position, 199f, the slider of FIG. 18c provides a total of five positions. In still another embodiment, a trackball mechanism may be used for slider 176f.

Slider 176f may be operated by the index finger of each hand. In operation slider 176f may provide the user to access other options, such as macros. Further, slider 176f may be used to run file management and applications operations.

In an alternate embodiment, slider 176f may be provided as part of key 176a. This will allow the user to use slider 176f functions without having to move the index finger from key 176a.

Control portion 172 can move two-dimensionally with respect to base 174. In a preferred embodiment, control portion 172 may move in the positive and negative x-directions. Further, control portion 172 may also move in the positive and negative y-directions. Additionally, control portion 172 may also be twisted relative to base 174 in the θ direction. The total number of positions in each direction (x, y, and θ) may be eleven-five in each direction, and a home position. The actual number of positions may vary based on the specific needs of the user. Other numbers of positions may be provided.

Figure 19:
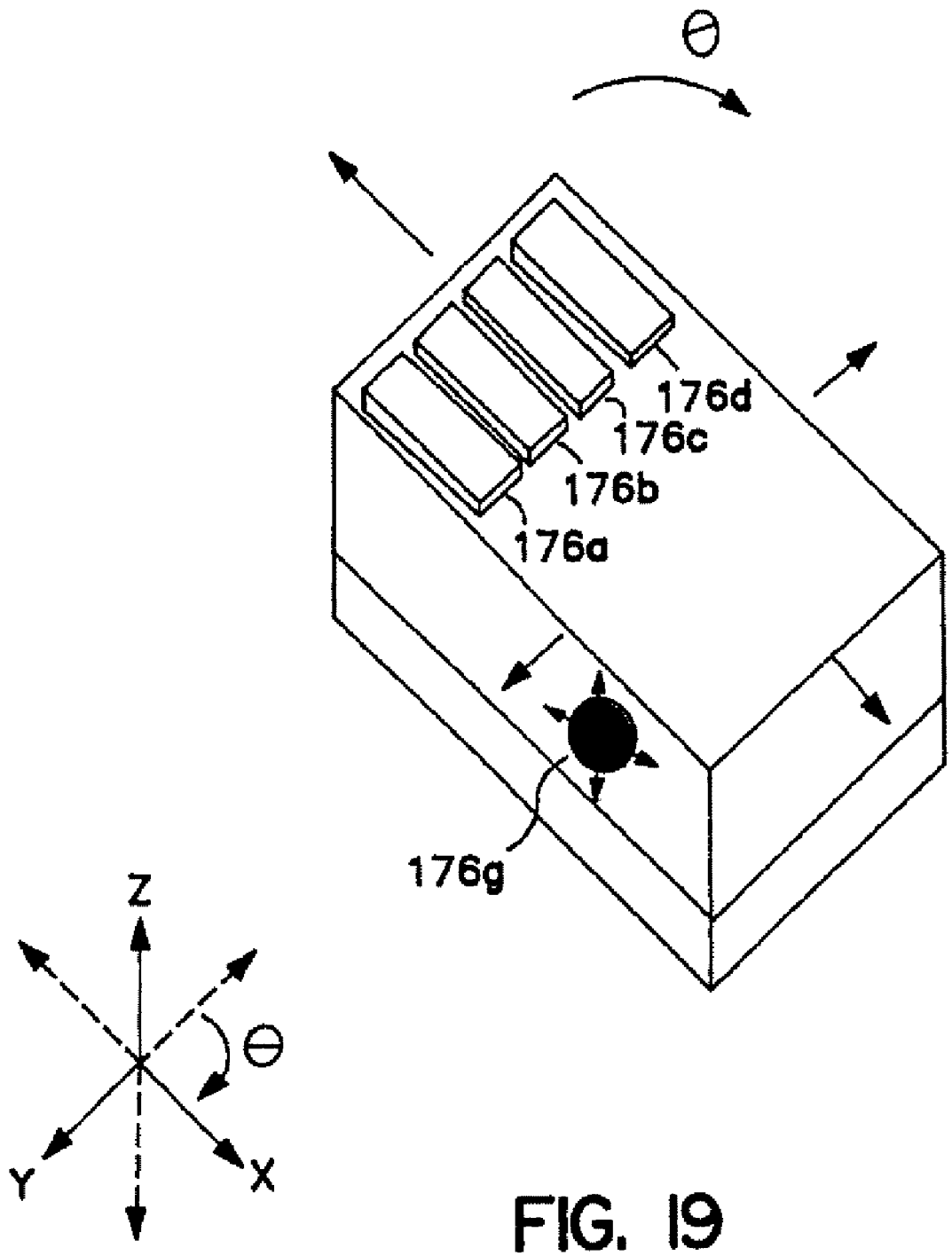
FIG. 19 depicts a perspective view of a universal input device according to another embodiment of the present invention.

Referring to FIGS. 19 and 20, another embodiment of UID 170 is given. Slider 176g is provided and functions as a combination of button 176e and slider 176f shown in FIG. 17. Referring to FIG. 20, slider 176g may be moved in the x and z-directions, and may be depressed in the negative y-direction. Slider 176f may also be provided in other keys 176a-d.

Without using slider 176f or 176g, the user has the two-dimensional matrix shown in FIG. 21 at his or her command. In one embodiment, the keyboard layout may be similar to that of a standard keyboard. In another embodiment, such as that shown in FIG. 21, the standard keyboard layout has been replaced with a ABCD RSTU layout. Without twisting control portion 172 in the θ direction, each finger corresponds to a key in the matrix. For example, letters E, F, G, and H would correspond to the pinky, ring, middle, and index fingers of the left hand, while R, S, T, and U would correspond to the index, middle, ring? And pinky of the right hand. M would correspond to the left thumb and V would correspond to the right thumb. The letters or characters to the left of E and the right of U may be accessed by sliding in the y-direction. Further, other font types may be achieved by twisting control portion 172 in the θ direction. Letters or characters above and below the "home row," or that row that is active and shown as solid, may be accessed by moving control portion 172 in the x-direction.

Figure 22:
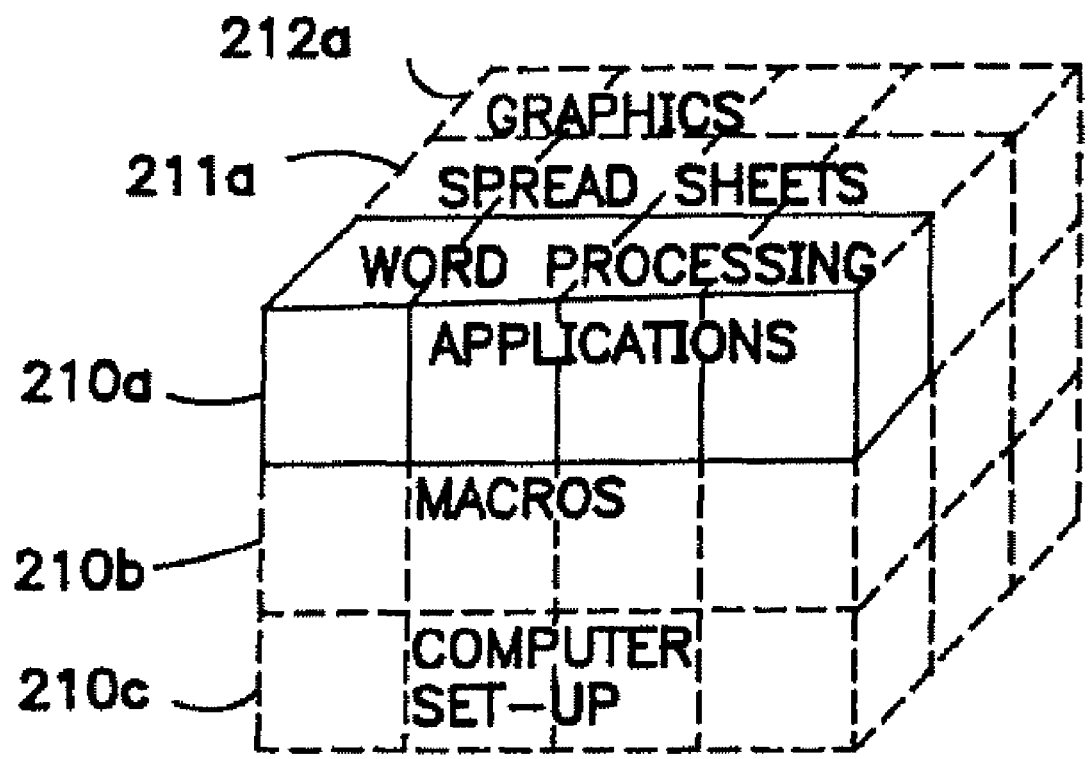
FIG. 22 depicts a three-dimensional command matrix according to another embodiment of the present invention.
Figure 23:
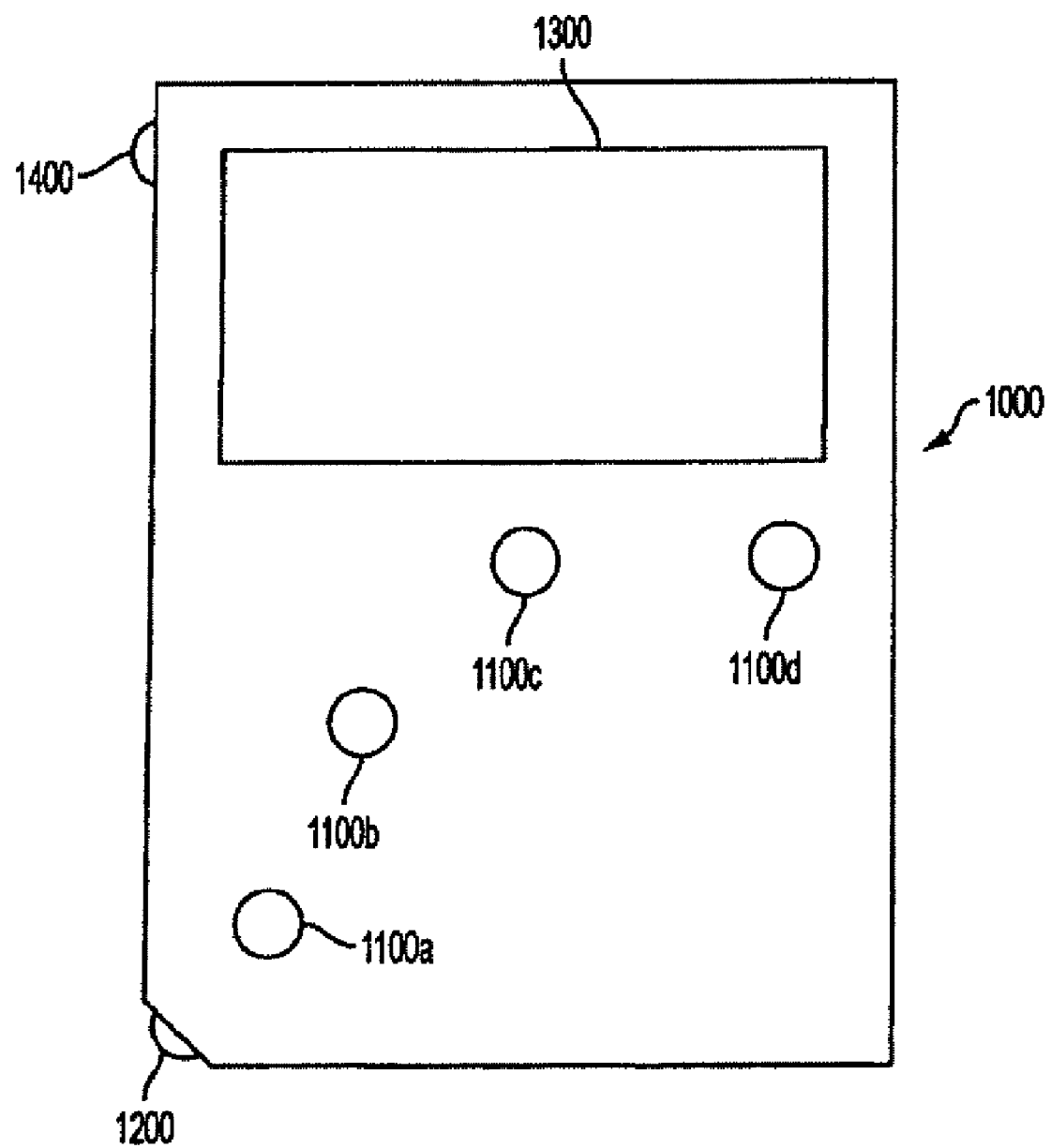
FIG. 23 depicts a top view of a universal input device according to one embodiment of the present invention.

When slider 176e is used, the two-dimensional matrix of FIG. 22 is changed to a three-dimensional matrix, shown in FIG. 23. For the sake of convenience, only three rows of the three-dimensional matrix in FIG. 23 are drawn; the number of rows may be many more. Blocks 210-212 are given, and each is assigned a particular genre of programs. For instance, block 210a includes word processors, while block 211 includes spreadsheets. The blocks are selectable using slider 176f or 176g. Once slider 176f or 176g selects a block, keys 176a-e may be used to enter data.

In a preferred embodiment, the user has the ability to define the function of keys 176a-e and slider 176f or 176g according to his or her preference. Thus, each key and slider may be individually programmed in order to maximize the performance and efficiency of the system.

The position of keys 176a-e and slider 176f or 176g may be adjustable to the particular user. Adjustment of these elements may be required to compensate for the size of the user's hands, the user's experience, the user's fatigue, etc. Thus, keys 176a-d may slide in the x-direction, key 176e may move in the x-direction or the z-direction, and slider 176f may move in the x-direction. If slider 176g is provided, it may move in the x or z-directions, similar to key 176e.

A preferred embodiment of the invention provides over 13,000 totally intuitive single-finger commands. For example, there are ten keys that may be depressed to enter data. There are eleven positions in the x-direction, eleven positions in the y-direction, and eleven positions in the θ direction. Thus, using these combinations of movements, there are 13,310 totally intuitive single-finger commands are available. Further, when slider 176e is moved in the x or z direction, providing four additionally positions, a total of 53,240 totally intuitive commands are available.

In a further embodiment of the present invention, the UID may be utilized to provide control of and access to an operating system of a computer. In addition to allowing a user to input characters, the UID can allow the user to select commands, routines and operations to be performed within, through, or in conjunction with an operating system of a computer. In this embodiment, the UID may be utilized in conjunction with or as an alternative to traditional joystick, trackball or mouse input. Examples of systems for allowing a user to utilize the UID to select commands, routines and operations for an operating system may be found in: U.S. Pat. No. 5,798,760, entitled "Radial graphical menuing system with concentric region menuing," issued to Vayda et al.; U.S. Pat. No. 5,790,820, entitled "Radial graphical menuing system," issued to Vayda et al.; and U.S. Pat. No. 5,745,717, entitled "Graphical menu providing simultaneous multiple command selection," issued to Vayda et al. These patents are incorporated herein by reference in their entirety.

FIG. 23 depicts another embodiment of the present invention. As shown in FIG. 23, four primary input keys (1100a-d), primary thumb input mechanism 1200, and secondary thumb input mechanism 1400 are located on the UID 1000. The primary input keys (1100a-d) and thumb input mechanism 1200 are utilized to provide character and command input. Preferably, the layout illustrated in FIG. 23 is for utilization by a user with a dominant right hand. An index, middle, ring and pinky finger are placed over primary input keys 1100a, 1100b, 1100c, and 1100d, respectively. Alternatively, a mirror image of this layout could be utilized to provide a preferable layout and form factor for a user with a dominant left hand. The input keys or input mechanisms may comprise a rocker switch, roller switch, toggle switch, push button switch, touch sensitive key, multi-position switch, key, or the like, or a combination thereof.

In the embodiment shown in FIG. 23, a user's righthand thumb operates the primary thumb input mechanism 1200. In this manner, the user may rest the UID 1000 in the palm of the left hand and operate the primary thumb input mechanism 1200 with the thumb of the right hand, while placing the fingers of the right hand over primary input keys 1100a-d. The secondary thumb input mechanism 1400 is situated for operation by the thumb of the user's left hand. Alternatively, a right-handed user may rest UID 1000 on a table, support or other suitable platform and operate the primary input keys 1100a-d, primary thumb input mechanism 1200, and secondary thumb input mechanism with the fingers and thumb of the right hand.

The embodiment shown in FIG. 23 may be used to select character and command information presented on graphical display 1300. For character input, the UID 1000 may be used in combination with a two-dimensional layout such as presented in FIGS. 21, 24, and/or 25A-D. This two-dimensional layout, in one embodiment, comprises multiple blocks of selectable values for assignment to the primary input keys and/or mechanisms. For example, graphical display 1300 can display the two-dimensional layout of, or a layout similar to, FIG. 21 or 25A-D. A user can utilize primary input keys 1100a-d to select characters on the layout that correspond to primary input keys 1100a-d. In this embodiment, the user may select different character layouts using thumb input mechanism 1200. For example, a first two-dimensional layout, or block (hereinafter "two-dimensional layout" or "layout"), can comprise alphabetic characters. A second two-dimensional layout can comprise numeric characters. A third two-dimensional layout can comprise punctuation characters. A fourth two-dimensional layout can comprise foreign or accented alphabetic characters. The characters on each of these layouts (i.e., multiple blocks of selectable values for assignment to primary input keys or mechanisms) may be selected with primary input keys 1100a-d.

In a further embodiment, or alternatively, the thumb input mechanism 1200 may be used in conjunction with or in addition to the primary input keys 1100a-d to select characters. For example, the thumb input mechanism 1200 may be used to move from a home row, such as home row 1412 in FIG. 25B, on the two-dimensional layout to rows above or below the home row (see upper row 1410 and lower row 1414, of FIG. 25B, respectively). Moving from a home row to a row above or below the home row would provide different characters that could be selected by the primary input keys 1100a-d. In addition to moving to alternate rows, the thumb input mechanism 1200 can also be used to select a character corresponding to the thumb input mechanism 1200. For example, operating the thumb input mechanism 1200 can select a row or rows above or below a home row. Further, thumb input mechanism 1200 can select a character presented on the layout that corresponds to the thumb input mechanism 1200. This character corresponding to the thumb input mechanism 1200 can be in addition to the characters corresponding to the primary input keys 1100.

In a further embodiment, the primary thumb input mechanism 1200 may be toggled into a mode allowing the thumb input mechanism 1200 to function as a mouse or pointing device for navigating a pointer on the graphic display 1300. The pointer on the graphic display 1300 may be utilized to select and operate functions of the operating system and applications running on the operating system. In a further embodiment, the pointer is manipulated by the thumb input mechanism 1200 to select and operate functions of the operating system and/application wherein the functions are selected from a grid (or block) of the present invention portrayed on the graphic display 1300.

In another embodiment, the secondary thumb input mechanism(s) may be located in any position suitable for ergonomic operation by the user. For example, the secondary thumb input mechanism(s) may be located on the side, top and/or bottom surfaces of the housing of the UID 1000.

Figure 24:
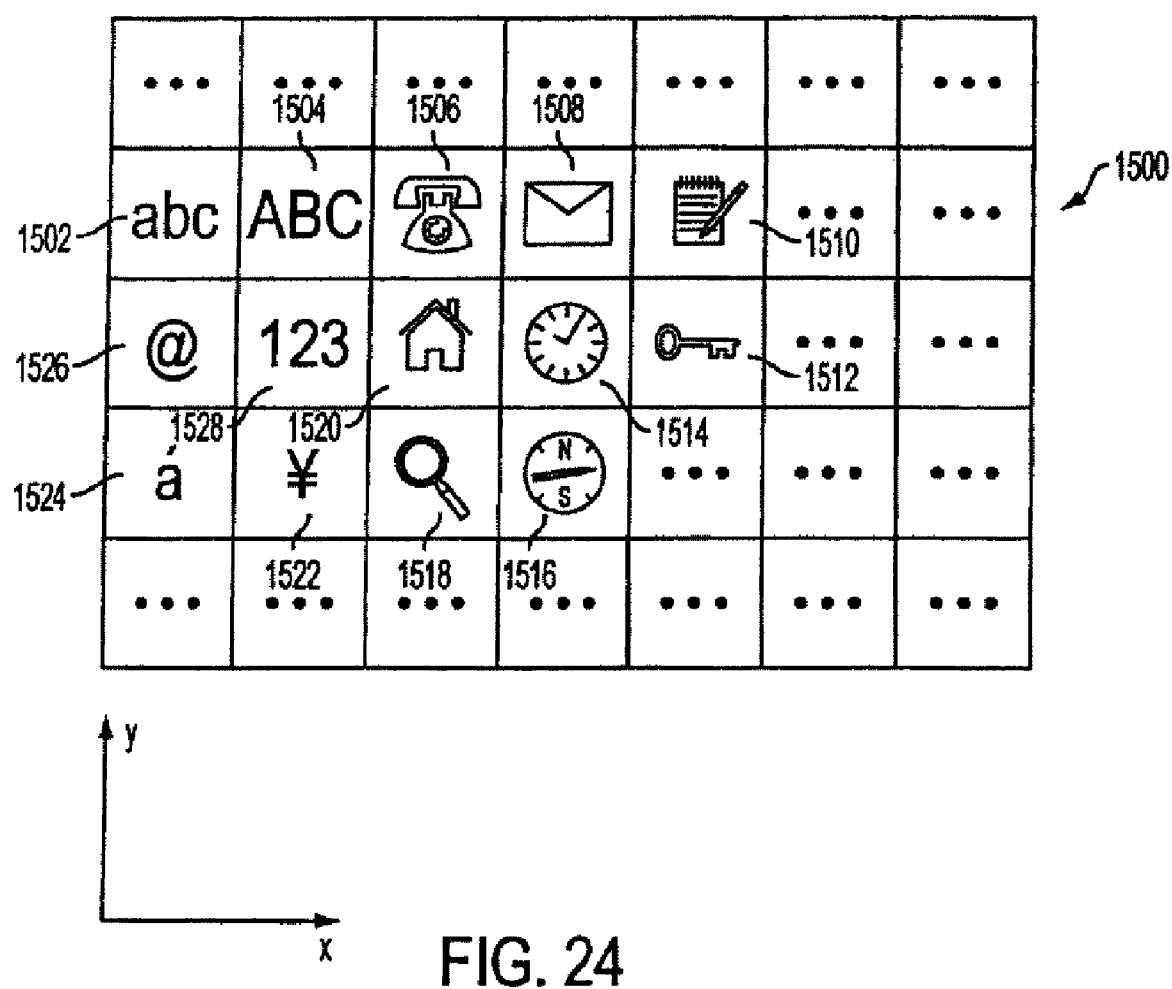
FIG. 24 depicts a two-dimensional command matrix according to another embodiment of the present invention.
Figures 25A, 25B, 25C, 25D:
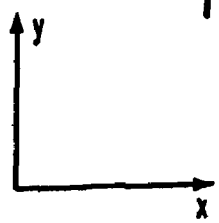
FIG. 25A-D depicts a two-dimensional command matrix according to another embodiment of the present invention.

FIG. 24 depicts a grid 1500 comprising individually selectable cells (or blocks of selectable values for assignment to primary input keys). In an embodiment of the present invention, a user may utilize the UID to navigate in the x- and y-direction on the grid 1500. The cells (or blocks) of the grid 1500 represent different two-dimensional layouts from which characters, operations or commands may be further selected with the UID. For example, in FIG. 24, a two-dimensional layout comprising lower case alphabetic letters is represented by cell 1502. A two-dimensional layout comprising upper case alphabetic letters if represented by cell 1504. A two-dimensional layout comprising operations and functions for telephone operations and/or numeric characters may be obtained by selecting cell 1506. A two-dimensional layout comprising operations and functions for electronic mail and/or alphanumeric characters may be obtained by selecting cell 1508. A two-dimensional layout comprising operation and functions and/or characters corresponding to a memo pad application may be obtained by selecting cell 1510. A two-dimensional layout comprising punctuation characters is represented by cell 1526. A two-dimensional layout comprising numeric characters is represented by cell 1528. A two-dimensional layout comprising applications, commands, functions and characters in a home navigation menu is represented by cell 1520. A two-dimensional layout comprising commands, functions and characters corresponding to a calendar application is represented by cell 1514. A two-dimensional layout comprising commands, functions, applications and characters corresponding to security of the UID is represented by cell 1512. Cell 1524 may be selected by a user to obtain a graphic display of a two-dimensional layout comprising foreign and accented alphabetic characters. Cell 1522 may be selected by a user to obtain a graphic display of a two-dimensional layout comprising symbol characters. A two-dimensional layout comprising search applications, functions, commands and/or characters may be obtained by selecting cell 1518. A two-dimensional layout comprising navigation and movement functions and commands may be obtained by selecting cell 1516.

FIGS. 25A-D depict two-dimensional layouts corresponding to various or potential cells on grid 1500 of FIG. 24. A user may utilize the UID to navigate in the x-direction and y-direction of a two-dimensional layout to select the various cells on the two-dimensional layout. Each of the various cells on the two-dimensional layout correspond to a character, command, function, macro, set of characters, word, sentence, template, and/or operation. When the cell is navigated to and selected by the user, the character, command, function, macro, set of characters, word, sentence, template, and/or operation corresponding to the cell is input into the application and/or operating system associated with the UID.

Figure 26:
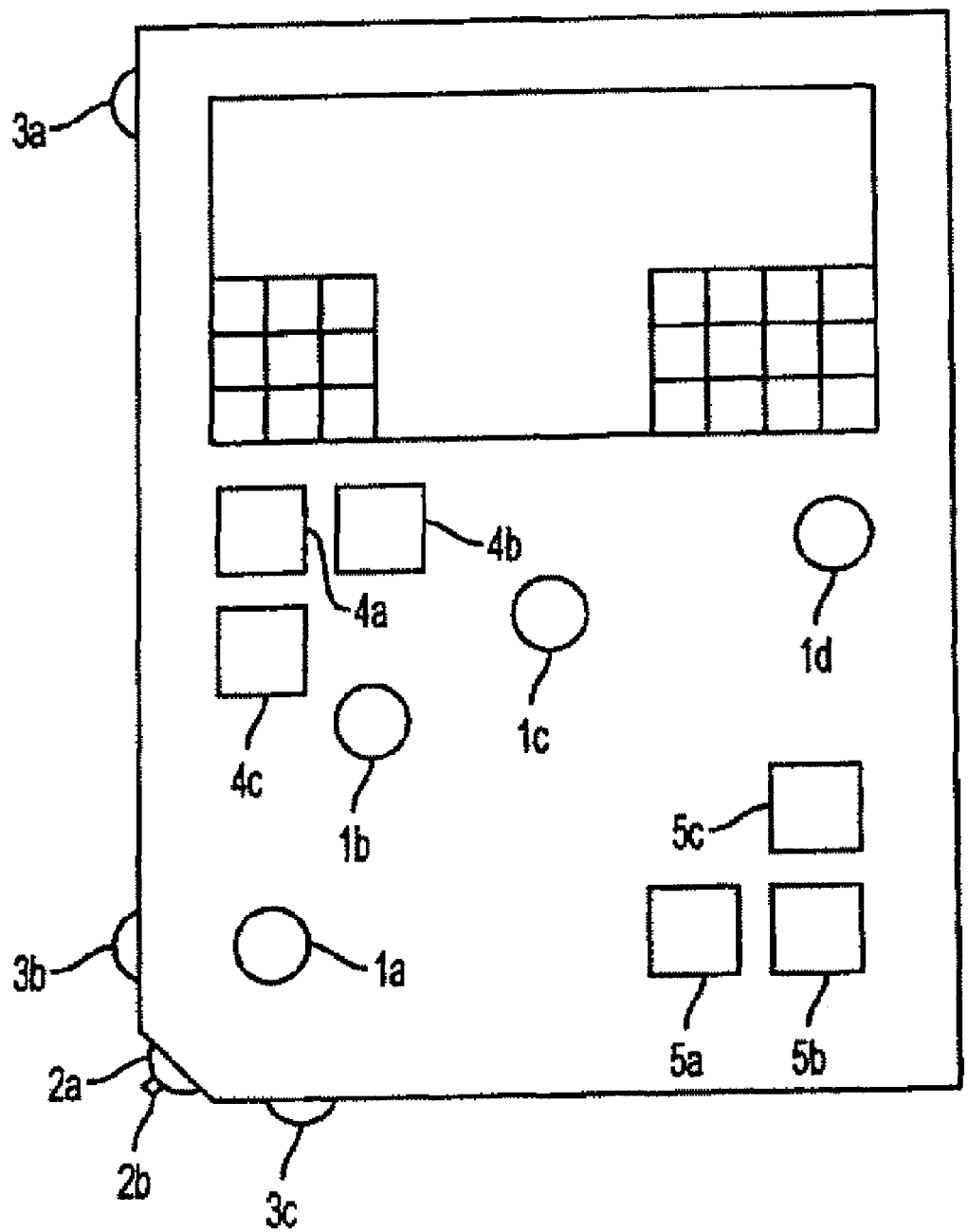
FIG. 26 depicts two-dimensional command matrices according to further embodiments of the present invention.

FIG. 26 depicts a further embodiment of the present invention. In this embodiment, a user may utilize the UID 100 to enter information into a display or device associated with the UID 100. In this embodiment, the UID comprises means for a user selecting characters and information and means for navigating to input these characters and information. The means for a user selecting comprise an upper side-input mechanism 3a, a lower side-input mechanism 3b, a bottom input mechanism 3c, a thumb input mechanism 2a, a thumb key 2b, primary input keys 1a-d, upper secondary input keys 4a-c, and lower secondary input keys 5a-c. The UID 100 further comprises a graphical display 200. The graphical display 200 provides information and feedback to a user. The graphical display 200 also comprises a grid 220 and a layout 210.

In the embodiment depicted in FIG. 26, a user navigates through the grid 220 to select a cell 225$a$-$i$ corresponding to a two-dimensional layout (i.e., multiple blocks of selectable values comprising the characters or operations (cells 226$a$-1) the user wishes to display in layout 210. The user may navigate through the grid 220 using the upper side-input mechanism 3$a$, the lower side-input mechanism 3$b$, the bottom input mechanism 3$c$, the thumb input mechanism 2$a$ and/or the thumb key 2$b$. Further, upper secondary input keys 4$a$-$c$ and/or lower secondary input keys 5$a$-$c$ may correspond to two-dimensional layouts. In addition to selecting a cell 225$a$-$i$ within the grid 220, a user may select one of the upper secondary input keys 4$a$-$c$ and/or lower secondary input keys 5$a$-$c$ corresponding to a two-dimensional layout to directly select a two-dimensional layout without utilizing navigation and selection of a cell 225$a$-$i$ on the grid 220.

Once a two-dimensional layout is selected, the two-dimensional layout is presented on the graphical display 200 at layout 210. The user may then navigate through the layout 210 to select a character or operation to input. The user may navigate through the layout using the upper side-input mechanism 3$a$, the lower side-input mechanism 3$b$, the bottom input mechanism 3$c$, the thumb input mechanism 2$a$ and/or the thumb key 2$b$. The user may select cells on the layout 210 using the primary input keys 1$a$-$d$. In a further embodiment, characters or operations may be selected using the upper secondary input keys 4$a$-$c$ and the lower secondary input keys 5$a$-$c$. Also, the user may input characters utilizing the thumb key 2$b$ to select cells on the layout 210 corresponding to the thumb key 2$b$. Further, the upper side-input mechanism 3$a$, the lower side-input mechanism 3$b$, the bottom input mechanism 3$c$, and/or the thumb input mechanism 2$a$ may be used to input characters and/or operations. These characters and/or operations may be commonly utilized ones, such as 'space', backspace, enter, character shift, comma, and/or apostrophe, for example.

For example, a user can utilize the upper side-input mechanism 3$a$ to navigate in the y-direction on the grid 220 and the bottom input mechanism 3$c$ to navigate in the x-direction on the grid 220. Once the user has navigated to the cell 225$a$-$i$ corresponding to a desired layout, the user may select the individual cell by pressing thumb key 2$b$. The layout corresponding to the selected cell is then displayed on the graphical display 200 as layout 210. The user can then utilize lower side-input mechanism 3$b$ to navigate in the y-direction on the layout 210. As discussed with regard to previously disclosed embodiments, each of the four cells (or blocks) in each row (cells 226$a$-$d$, cells 226$e$-$h$, and cells 226$i$-1) of the layout 210 corresponds to a respective primary input key 1$a$-$d$. For example, in the upper row (cells 226$a$-$d$) shown in the layout 210 of FIG. 27, cell 'a' corresponds to primary input key 1$a$, cell 'b' corresponds to primary input key 1$b$, cell 'c' corresponds to primary input key 1$c$, and cell 'd' corresponds to primary input key 1$d$. Once a row is selected using the thumb input mechanism 2$a$, the user may input a character by pressing the primary input keys 1$a$-$d$ corresponding to the desired character in the layout 210.

In a further embodiment, a user may navigate through the grid 220 in the x-direction moving between rows. In this embodiment, scrolling to the right in the x-direction of the upper row will navigate the user to the middle row after the farthest-most right cell is reached. For example, when a user is in the upper row (cells 225$a$-$c$) of grid 220 and scrolls in the right direction from the 'a' cell to the 'b' cell to the 'c' cell, further scrolling to the right would navigate to the 'd' cell of the middle row (cells 225$d$-$f$). In this manner, the user does not need to use an additional key or mechanism to navigate in the y-direction to select other rows of the grid.

In another embodiment, rather than moving through the grid 220 (i.e., between various cells of the grid 220), the icon changes within the currently selected cell of the grid 220. Further movement in the x- or y-direction continues to cycle through various icons with each icon representing and corresponding to an available layout 210.

In a preferred embodiment of the invention, the UID is capable of communicating with many and various devices and systems. This communicating may be via a wired or wireless connection between the UID and the device and/or system. For example the wireless communication may utilize information transmission using electromagnetic waves (including wavelengths ranging from the radio frequency band up to and above the infrared band). These transmissions may comprise and utilize suitable communications methods and protocols, including but not limited to: Wireless Local Area Networks (WLAN), Wireless Wide Area Networks (WWAN), Wireless Personal Area Networks (WPAN). WWAN may comprise various wide coverage area technologies, such as 2G cellular, Cellular Digital Packet Data (CPDP), Global System for Mobile Communications (GSM), and Mobitex. WLAN may comprise 802.11 and HiperLAN. WPAN may comprise Bluetooth and infrared. The GSM communications may further comprise: General Packet Radio Service (GPRS), Local Multipoint Distribution Services (LMDS), Enhanced Data GSM Environment (EDGE, and Universal Mobile Telecommunications Service (UMTS). In this manner, the UID may be used to communicate characters, operations, commands and information to any device or system capable of receiving the communication from the UID. By way of nonlimiting example, the UID may be used to variously control a television, VCR, digital video recorder (e.g., Tivo), satellite receiver, stereo receiver, household electrical device controller (e.g, home security system or X10 home automation), thermostat, industrial process controller, send keyboard commands to a computer/PDA/handheld device/cellular telephone, or communicate with other similar UIDs.

As previously disclosed, the UID may comprise a means of directly selecting a particular layout, character, operation or command without navigating through the grid 220 or the layout 210. For example, a secondary input key on the UID can correspond to characters and commands useful in operating a cellular telephone. These same characters and commands are available via a single or various layouts reachable via navigation and selection of cells in the grid 220. However, these characters and commands may be directly presented to the user without navigation through the grid 220 by selecting the secondary input key on the UID corresponding to the cellular telephone layout. In a further embodiment, these characters and commands may automatically be presented to the user in response to a signal received or operation state triggered by the UID, or device coupled or mated to the UID. For example, a user may be utilizing a UID, or device coupled or mated to the UID, that is associated with a cellular telephone. Although the user may be utilizing a layout or function of the UID not necessary for operation of the cellular telephone, the user may be presented with the cellular telephone layout automatically by the UID. This automatic presentation of the cellular telephone layout can occur when a call is received by the cellular telephone, when the cellular telephone is notified of a new voicemail message, or the like.

Although the UID of FIG. 26 has been disclosed as primarily comprising primary keys corresponding to fingers of one-hand of the user. It will be understood by those of skill in the art that the two-handed embodiments disclosed elsewhere in this specification also may be incorporated into the UID depicted in FIG. 26 et al. In a two-handed embodiment, the layout 210 would further disclose cells associated with characters that may be selected by primary keys corresponding to the fingers on the user's left and right hands.

Figure 27:
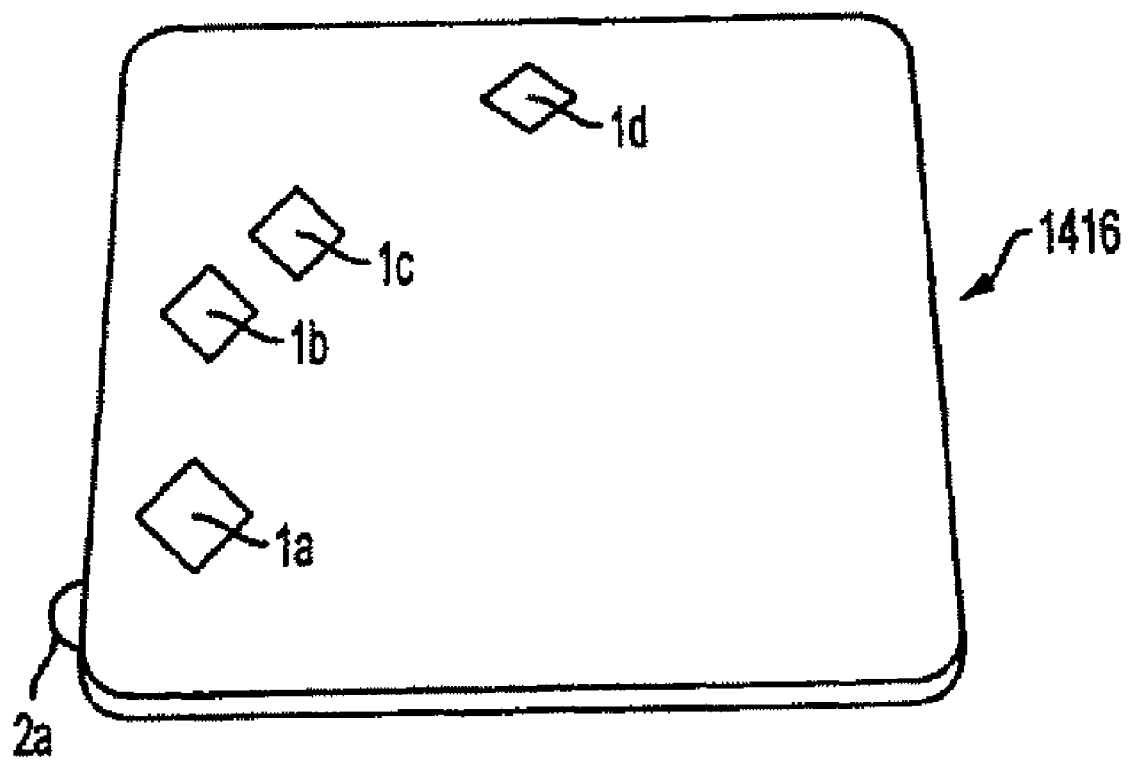
FIG. 27 depicts a top view of a universal input device according to another embodiment of the present invention.

In a further embodiment, the UID may comprise a "virtual" two-handed layout. In this embodiment, the layout 210 corresponds to the primary keys as shown in FIG. 27 corresponding to the fingers of the user's right hand. However, the user may also directly select a two-dimensional layout corresponding to the layout of the left hand portion of a similar two-handed two-dimensional layout embodiment. This direct selection may be made by a upper or lower secondary input keys, thumb input mechanism or similar means of direct selection or "toggling" between the left-hand layout and the right-hand layout.

FIG. 27 depicts another embodiment of the present invention. The object of the embodiment depicted in FIG. 27 is a UID 100 that is lightweight, portable and of a size that is thin and easy to carry on the person of the user. In this embodiment, the UID 100 comprises primary input keys 1a-d and a thumb input mechanism 2a. The thumb input mechanism 2a is utilized to navigate cells of a grid and/or rows of a two-dimensional layout. Characters and/or operations displayed within rows of a layout may be selected using the primary input keys 1a-d corresponding to that character and/or operation. In a further embodiment, the primary input keys 1a-d are arranged on a first side of the housing so as to be ergonomically situated for fingers of a right hand and are situated on a second side of the housing so as to be ergonomically situated for fingers of a left hand.

In a preferred embodiment, the UID 100 depicted in FIG. 27 is capable of communication and/or information input with a broad and varied number of devices, systems and applications. The communication and information input may be via a wired or wireless connection. For example, a user may wirelessly connect the UID 100 to a cellular telephone (e.g., via Bluetooth). Using the primary input keys 1a-d and thumb input mechanism 2a and a grid and layout displayed on the cell phone, the user may enter characters and commands to operate and input information into the cell phone. In another example, a user may wirelessly connect to a personal computer. The grid and two-dimensional layouts, as discussed with regard to other embodiments of the invention, are presented to the user on the graphical display of the computer. Using the primary input keys 1a-d and thumb input mechanism 2a, the user may input information into and select commands to operate the computer.

In a further embodiment of the UID depicted in FIG. 27, the UID 100 may be integrated with and/or coupled to additional input, storage and/or control devices. Devices with which the UID 100 may be integrated and/or coupled to include, but are not limited to, a mouse or other pointing device, cellular telephone, personal computer, notebook computer, handheld computer, personal digital assistant, global positioning system, console gaming system, and/or digital voice recorder and/or recognition device. The UID 100 may be integrated with and/or coupled to a device that is a "standalone" device (i.e., capable of operating separately and independently) or to a device that is not a standalone device (e.g., a computer chip, integrated circuit board, application module). The device may assist or work in conjunction with the UID 100 to control another system or device and/or input information. In another embodiment, the integrated device processes information and/or input from the UID 100 prior to communication or input to another system or device.

Figure 28:
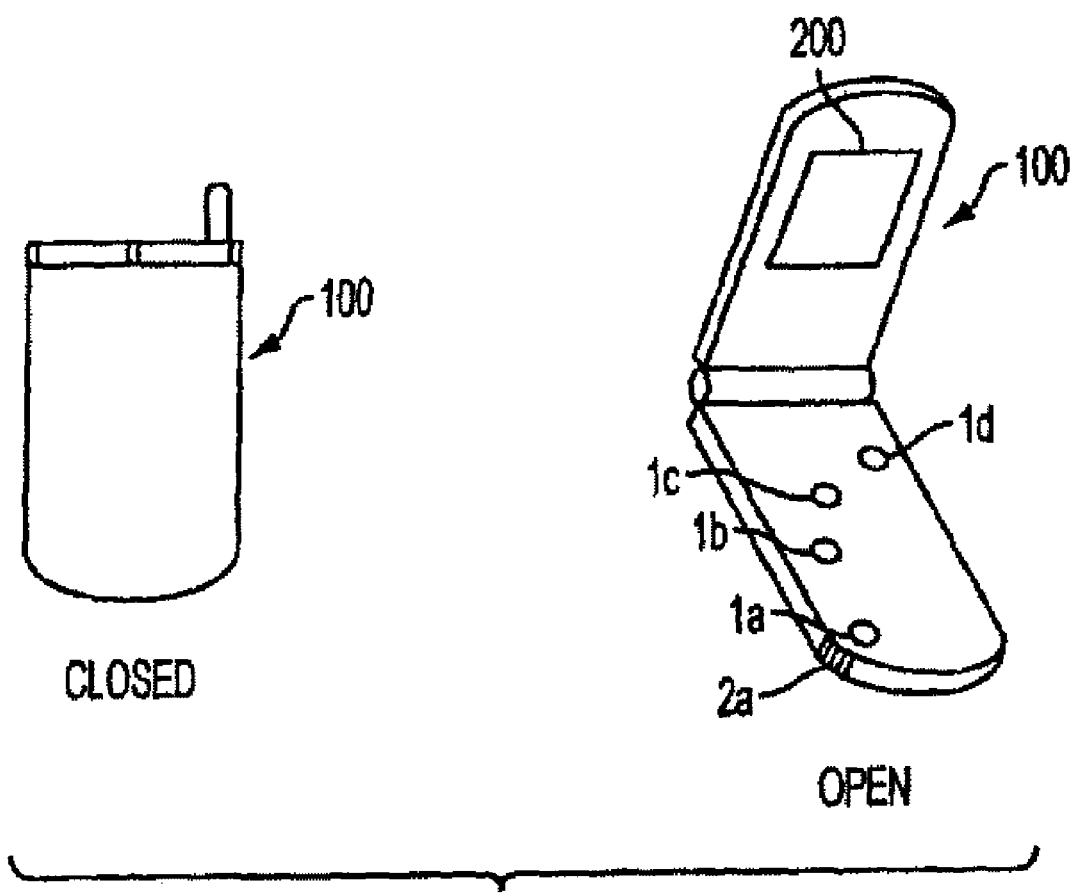
FIG. 28 depicts a universal input device according to another embodiment of the present invention.
Figure 29:
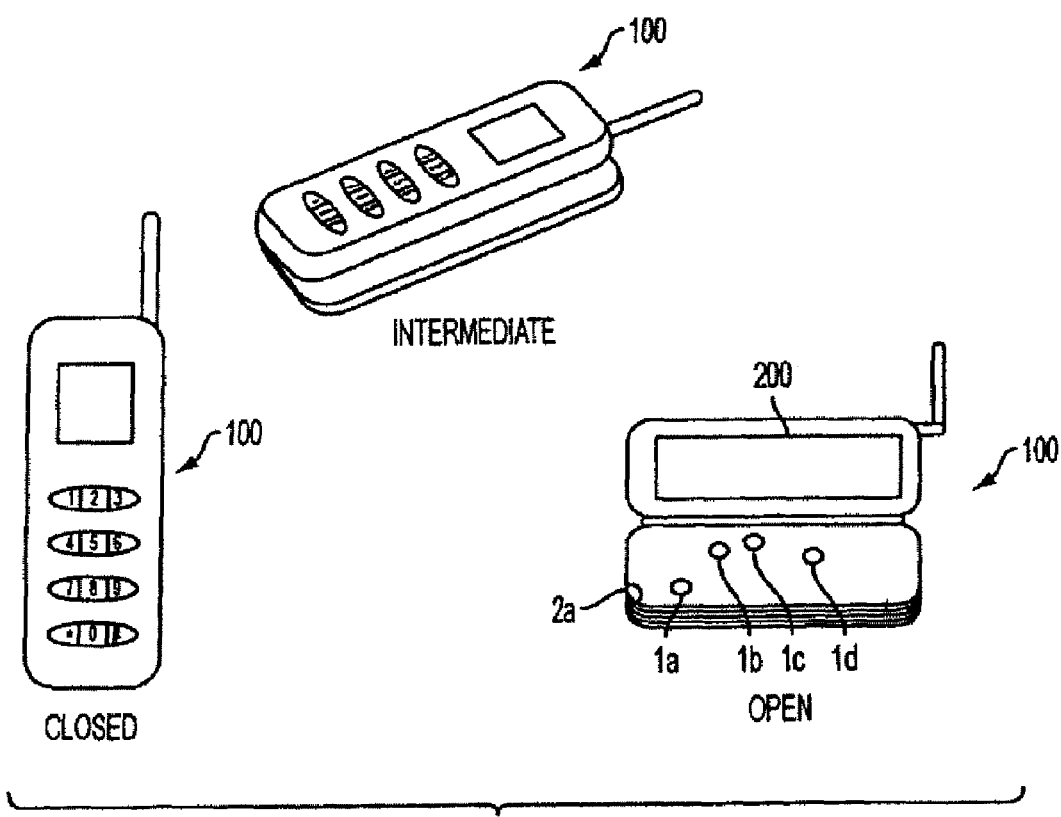
FIG. 29 depicts a universal input device according to another embodiment of the present invention.

FIGS. 28 and 29 depict further embodiments of the present invention. In FIG. 28, the primary input keys 1a-d and thumb input mechanism 2a of the UID 100 are incorporated into a "clamshell"-style form factor device. When opened, the embodiment comprises a graphical display screen 200 on the upper half of the housing above the hinge. The lower half of the housing, below the hinge, comprises the primary input keys 1a-d and thumb input mechanism 2a of the UID 100.

In FIG. 29, the primary input keys 1a-d and thumb input mechanism 2a of the UID 100 are incorporated into an alternative "clamshell" form factor. Similar to the embodiment depicted in FIG. 28, when opened, the embodiment comprises a graphical display screen 200 on the upper half of the housing above the hinge. The lower half of the housing, below the hinge, comprises the primary input keys 1a-d and thumb input mechanism 2a of the UID 100. However, in contrast to the embodiment depicted in FIG. 28 which comprises upper and lower housing surfaces situated in a "portrait" orientation, in FIG. 29 the upper and lower housing surfaces are situated in a "landscape" orientation.

FIGS. 28 and 29 depict an upper surface and a lower surface of the housing that move with respect to each other via a hinge mechanism. In another embodiment, the upper surface and lower surface move with respect to each other via a pivot mechanism. In another embodiment, the upper surface and lower surface move with respect to each other via a slide mechanism.

Figure 30:
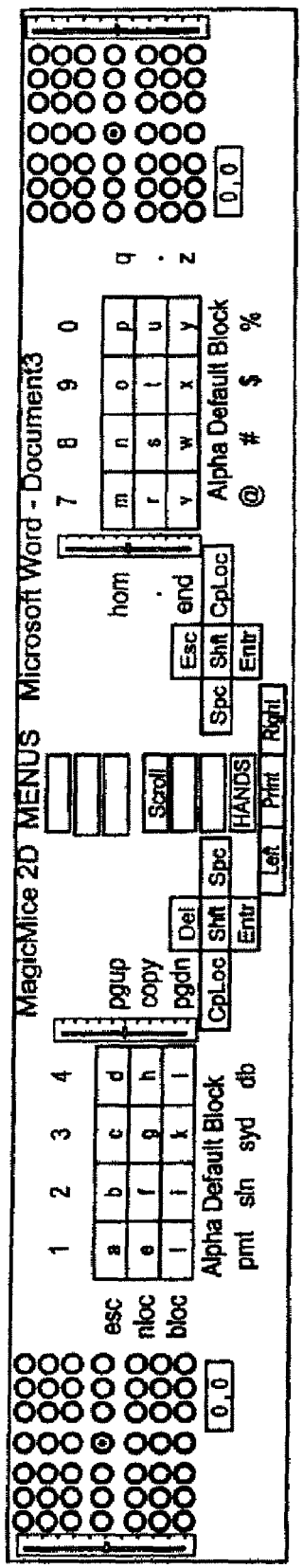
FIG. 30 depicts a two-dimensional command and character layout for use in an embodiment of the present invention.

FIG. 30 depicts a two-dimensional layout for a further embodiment of the present invention. In this embodiment, the two-dimensional layout comprises multiple blocks of selectable values for assignment to primary input keys on the UID. Commands and functions such a 'Esc', 'Spc', 'Shft', 'CpLoc', and 'Entr' may be assigned to a primary thumb input mechanism. Auxiliary commands located on the two-dimensional layout may be assigned to one or more secondary thumb or finger input mechanisms.

Figure 31:
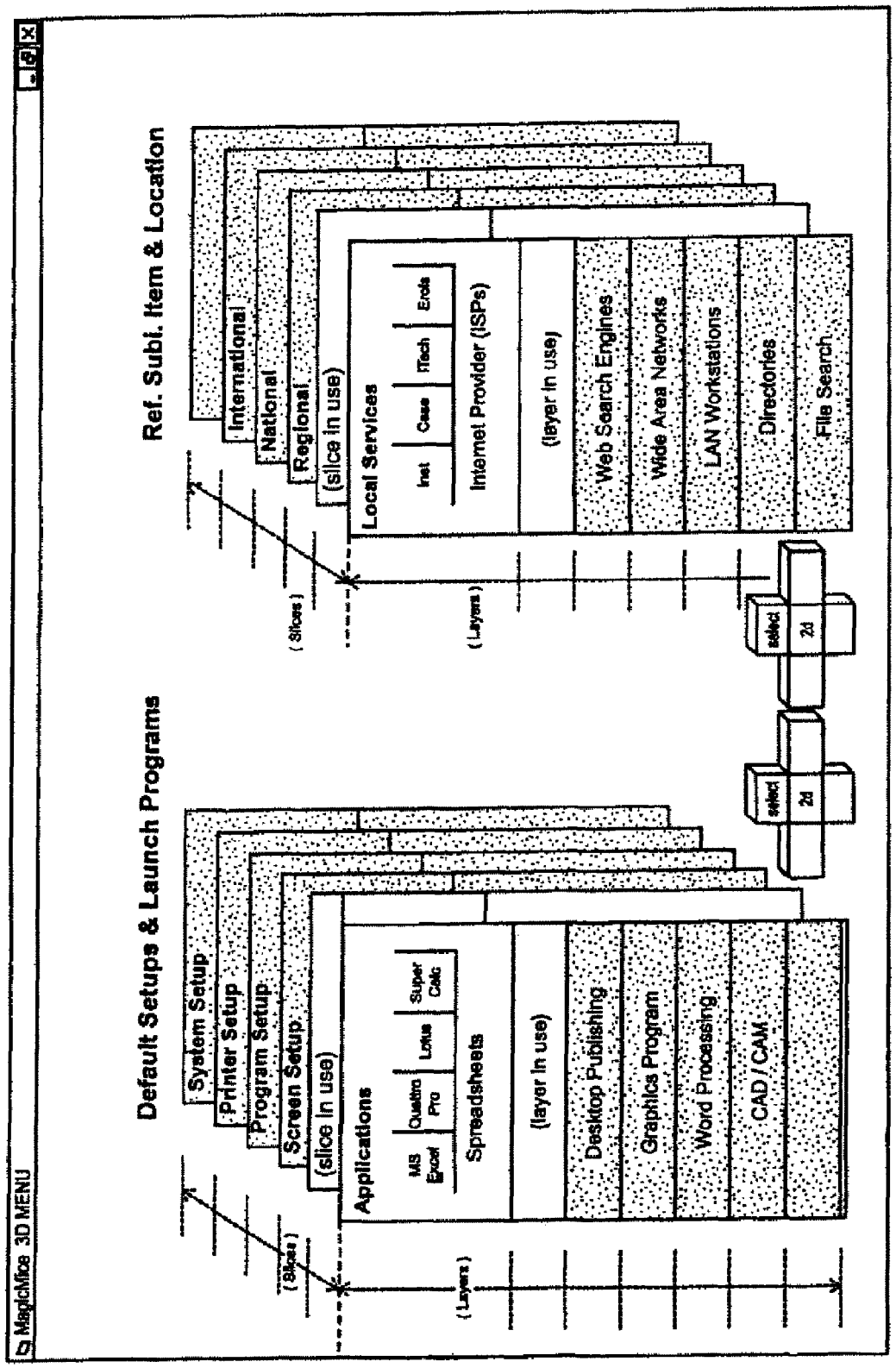
FIG. 31 depicts a three-dimensional menu and command layout for use in an embodiment of the present invention.

FIG. 31 depicts a three-dimensional menu and command layout for a further embodiment of the present invention. In this layout, the primary thumb input mechanism may be used to navigate between the layers as depicted in the figure. Individual layers may be selected with the primary thumb input mechanism to present menus. For example, FIG. 31 depicts a selected individual layer "Applications" and "Local Services". Within an individual layer, individual blocks of selected values may be assigned to primary keys. For example, in layer "Applications", various spreadsheets (as depicted in this example in FIG. 31) may be selected with the primary keys. Secondary input mechanisms may be utilized to navigate through the slices in the three-dimensional layout.

Figure 32:
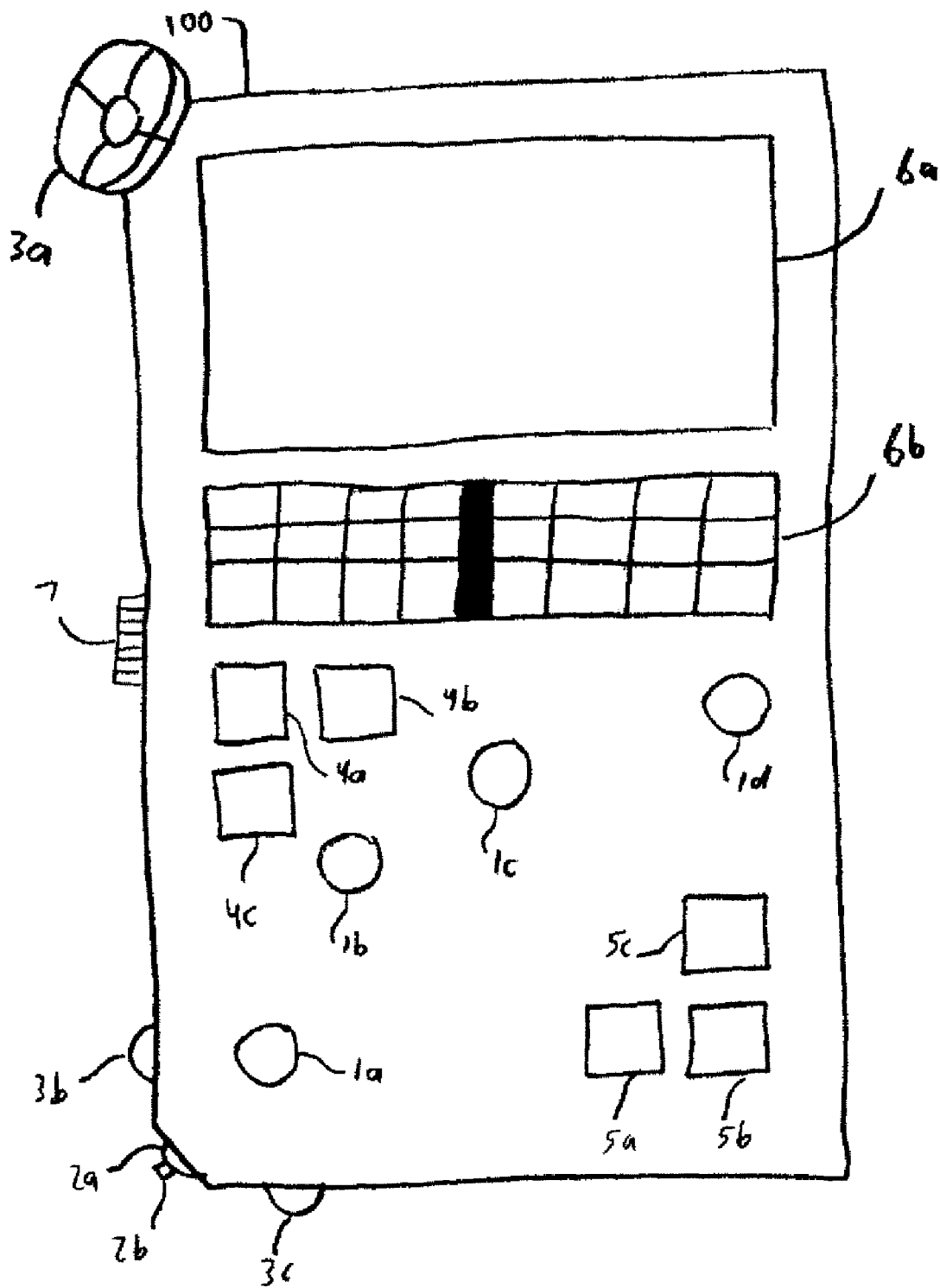
FIG. 32 depicts a universal input device according to another embodiment of the disclosure.

FIG. 32 depicts a further embodiment similar to that described in reference to FIG. 26. In this embodiment, the user may utilize the UID 100 to enter information into a display or device associated with the UID 100. The UID 100 may comprise a primary graphical display 6a and an auxiliary graphical display 6b, which may each be an LED display, an LCD display, or the like. The UID may further comprise means for a user selecting characters and other information and means for navigating to input these characters and information. The means for a user selecting may comprise an upper side-input mechanism 3a, a lower side-input mechanism 3b, a bottom input mechanism 3c, a thumb input mechanism 2a, a thumb key 2b, primary input keys 1a-d, upper secondary input keys 4a-c, lower secondary input keys 5a-c, and a mode selection key 7.

In the embodiment depicted in FIG. 32, the primary graphical display 6a may provide information and feedback to the user and may display characters and other information as they are selected by the user. The auxiliary graphical display 6b may, for example, comprise a layout as described in reference to FIGS. 7, 21, 24, and 25A-25D. For example, the auxiliary graphical display 6b may comprise two portions each for displaying a grid of characters to be inputted by a user's hand. The user may select a layout, navigate through the layout, and select a cell corresponding to the layout using any of the various input mechanisms described herein. In that way, the user may keep his or her fingers in place on the primary input keys 1a-d and only move his or her eyes a short distance between the auxiliary graphical display 6b (to input information) and the primary graphical display 6a (to view the inputted information). Doing so may be more efficient and easier to operate than a traditional QWERTY keyboard on a small device with small input keys. Also, inputting characters by keeping the user's fingers in place and pressing each individual input key 1a-d for a specific input may avoid the need to have multiple characters associated with a particular key, such as using the "shift" key on a traditional QWERTY keyboard, and is faster and more efficient. Although shown in FIG. 32 with the primary graphical display 6a positioned above the auxiliary graphical display 6b, the displays may be located in any position in relation to each other, such as, for example, side-to-side.

In various exemplary embodiments, the auxiliary graphical display 6b may comprise a visual display of a telephone number inputted by a user. For example, the UID 100 may be integrated with and/or coupled with a cellular telephone and the user may select a ten digit telephone number and initiate the phone call using any of the input mechanisms described herein. The auxiliary graphical display 6b may then display information associated with the phone call during the call, such as, for example, the time elapsed, number dialed, and/or geographical location of the receiver. The auxiliary graphical display 6b may also display a notification, such as a flashing message or a color change, while the user is inputting and viewing information on the primary graphical display 6a. For example, the auxiliary graphical display 6b may display a flashing incoming phone number when the user receives a telephone call.

The auxiliary graphical display 6b may also comprise a visual display of a numerical value or mathematical calculation that the user desires to perform. For example, the user may select numbers and various mathematical operations, such as, for example, addition, subtraction, and multiplication, using any of the input mechanisms described herein. The auxiliary graphical display 6b may display each number as it is inputted by the user and the results of a desired calculation. The hardware and/or software for performing calculations may be included on the UID 100 itself or the computer 12 to which the UID 100 may be connected, in which case the UID 100 may communicate information for performing the calculation to and from the computer 12.

The auxiliary graphical display 6b may also comprise a visual display of information associated with an integrated and/or coupled input, storage, and/or control device as described herein. For example, the auxiliary graphical display 6b may display an image taken by a digital camera, the name of a song being played by a portable music device, or the name of a location associated with a global positioning device.

The auxiliary graphical display 6b may also change based on a mode selection of the user. For example, the user may switch to a "character input mode," "telephone mode," or "calculation mode" by, for example, pressing a mode selection key 7 or thumb key 2b. The user may also flip the primary graphical display 6a and auxiliary graphical display 6b such that the displays are reversed, using any of the input mechanisms described herein. The auxiliary graphical display 6b may also display an indication of the current mode in which the UID 100 is operating.

The auxiliary graphical display 6b may also display both a layout for inputting characters and other information, as well as another display, such as a telephone number, at the same time. In that way, the user may input a telephone number using the layout described herein and at the same time view the number as it is inputted on the same screen, while keeping a display visible on the primary graphical display 6a. The UID 100 may also comprise more than one primary graphical display 6a and more than one auxiliary graphical display 6b.

Figure 33:
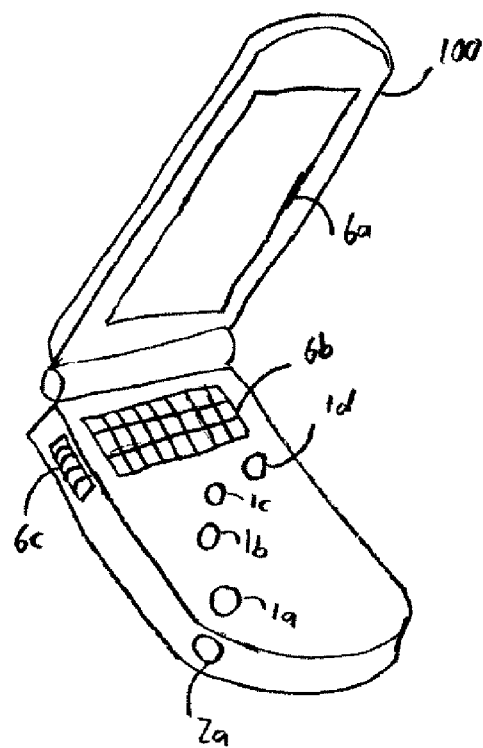
FIG. 33 depicts a universal input device according to another embodiment of the disclosure.
Figure 34:
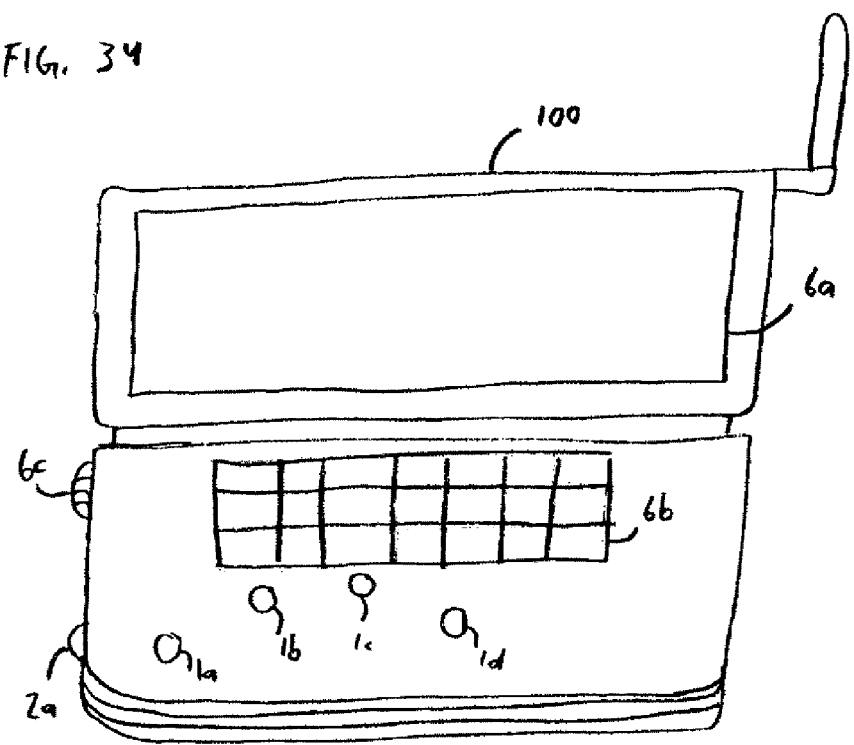
FIG. 34 depicts a universal input device according to another embodiment of the disclosure.

FIGS. 33 and 34 depict further embodiments similar to that described in reference to FIG. 28 and FIG. 29, respectively. In these embodiments, the auxiliary graphical display 6b of UID 100 may be incorporated into a "clamshell"-style form factor device as described herein. When opened, the embodiment comprises a primary graphical display 6a on the upper half of the housing above the hinge, while the lower half of the housing below the hinge comprises the auxiliary graphical display 6b, primary input keys 1a-d, thumb input mechanism 2a, and any other input mechanisms. The auxiliary graphical display 6b may also be incorporated into the upper half of the housing above the hinge. The lower half of the housing below the hinge may also include a slider 6c that may be used to navigate through a layout displayed on the auxiliary graphical display 6b.

Figure 35:
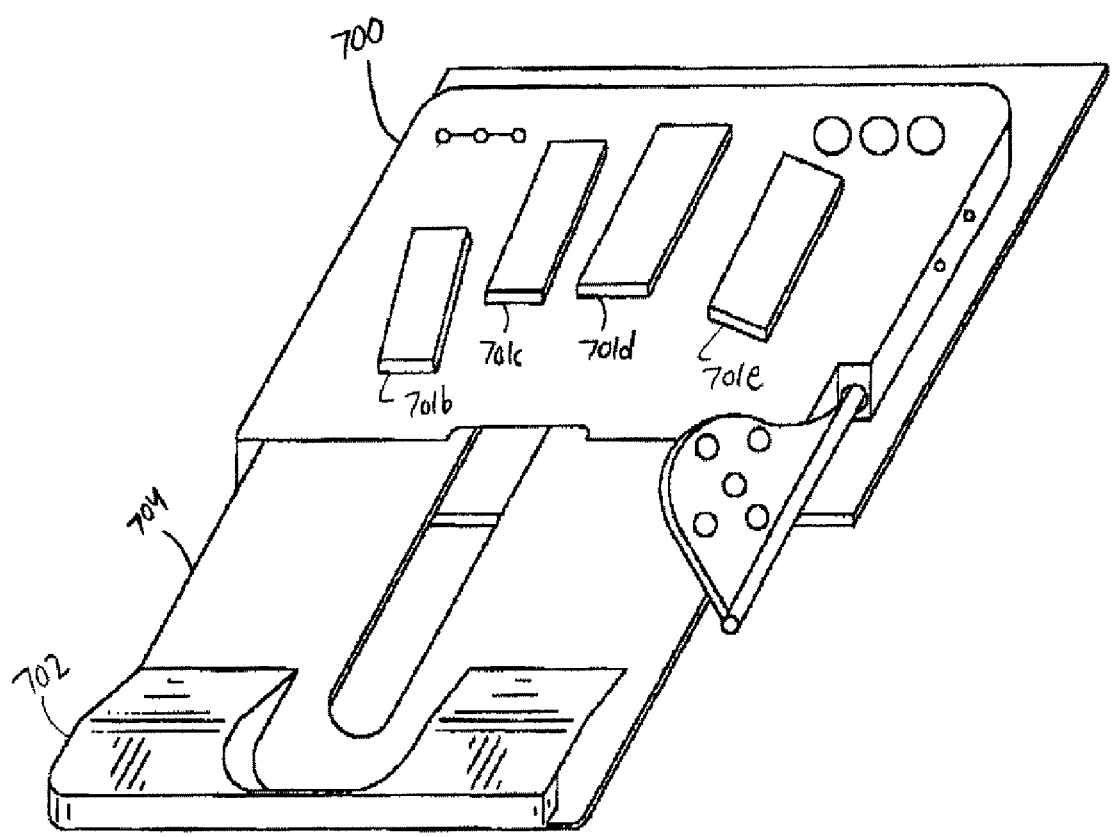
FIG. 35 depicts a universal input device according to another embodiment of the disclosure.

FIG. 35 depicts a further embodiment. FIG. 35 depicts an overhead view of a UID 700 similar to that described in reference to FIG. 26. The UID 700 may have four finger input mechanisms 701a-d spaced on the UID 700 such that the user's fingers may rest comfortably in position. The finger input mechanisms 701a-d may each be, for example, a rocker switch, roller switch, toggle switch, push button switch, touch sensitive key, multi-position switch, key, or the like, or a combination thereof. Other types of input mechanisms and positions on the UID 700 may also be provided as described herein.

The UID 700 may also include a hand input mechanism 702 positioned such that the heel of the user's hand may rest comfortably on top of the hand input mechanism 702 while the user's fingers may be kept in place over the four finger input mechanisms 701a-d. The hand input mechanism 702 may be pressure-sensitive and operable to detect slight movements along the heel of the user's hand. In that way, the user's hand may be kept substantially in place similar to the "Palmer Method" of handwriting. For example, the hand input mechanism 702 may be a raised surface with pressure sensors (not shown) positioned at various locations underneath. For example, as shown in FIG. 35, the hand input mechanism 702 may comprise a left portion with a first sensor to detect movement of the left side of the heel of the user's hand and a right portion with a second sensor to detect movement of the right side of the heel of the user's hand. The hand input mechanism 702 may also comprise a first sensor near the rear area of the hand input mechanism 702 and a second sensor near the front area of the hand input mechanism 702 for sensing when a user slightly pushes forward, backward, or down with the heel of the user's hand. Also, the hand input mechanism 702 may have one overall pressure sensor operable to detect when the user slightly pushes forward, or backward, or left, or right, or down on the surface of the hand input mechanism 702. The surface of the hand input mechanism 702 may be comprised of a felt, fabric, or other comfortable surface for the user. The hand input mechanism 702, like any other input mechanism described herein, may further be capable of giving tactile feedback to the user when the user makes a slight movement in various directions (e.g., forward, backward, left, right) or presses down on the hand input mechanism 702 to various degrees. For example, the hand input mechanism 702 may be bell-shaped and break down when it is moved or depressed by the heel of the user's hand. In that way, the UID 700 may be easily used and ergonomic for the user. The hand input mechanism 702 may also be positioned such that the palm of the user's hand is placed above the hand input mechanism 702 and the hand input mechanism 702 detects slight movement of the palm of the user's hand. The hand input mechanism 702 may also be positioned on a support mechanism 704 that may be adjustable or customizable to fit the size and shape of a user's hand. For example, as shown in FIG. 35, the support mechanism 704 may be extendable from the bottom of the UID 700 and collapsible for storage when not in use.

The one or more pressure sensors disposed underneath the hand input mechanism 702 may comprise UID triggers 34 as described herein and may be connected to UID signal generators 36 within the UID 700 via a wired connection. The pressure sensors may generate signals indicative of the pressure applied by the user to the hand input mechanism 702. The UID signal generators 36 may translate those signals into electrical signals for a computer and send those signals to the computer via a communication mechanism, such as a wired or wireless connection. As described herein, the hand input mechanism 702 may be used for navigation within a layout. For example, pushing forward slightly on the hand input mechanism 702 with the heel of the user's hand may signal to move forward by one row or grid on a graphical layout as described in reference to FIGS. 7, 21, 24, and 25A-25D. Pushing backward slightly on the hand input mechanism 702 with the heel of the user's hand may similarly move down by one row or grid on a graphical layout. In that way, the hand input mechanism 702 may operate as a substitute for any of the other navigational mechanisms described herein, wherein the user may navigate through a graphical layout with only slight, easy movements of the heel of his or her hand, avoid significant hand fatigue associated with repetitive movements, and select a cell within that graphical layout using the finger input mechanisms 701a-d.

In various exemplary embodiments, the support mechanism 704 may extend further to support the rear area of the user's hand, the user's wrist, and/or the user's arm while operating the UID 700 such that the user may keep his or her fingers, hand, wrist, and arm in a comfortable position during operation. For example, the support mechanism 704 may be positioned and shaped such that the user's hand, wrist, and arm are placed in the most ergonomically desirable position and the user may avoid repetitive movements and arm fatigue, while the user's fingers also remain in a fixed position over finger input mechanisms 701a-d during operation of the UID 700. The support mechanism 704 may be adjustable or customizable to fit the size and shape of a user's arm. The support mechanism may also be collapsible for storage while not in use and/or extendable from the bottom of the UID 700. For example, the support mechanism 704 may be attached to the UID 700 with a hinge such that the support mechanism 704 folds into the UID 700 when not in use. The support mechanism 704 may also slide into the bottom of the UID 700 when not in use. Also, the support mechanism 704 and the hand input mechanism 702 may be incorporated into any UID described herein.

Similar to the hand input mechanism 702, the support mechanism 704 may itself include pressure sensors (not shown) positioned at various locations underneath the support mechanism 704 for detecting slight movements of the user's wrist and/or arm and be connected to the UID 700 via a communication mechanism, such as a wired or wireless connection, to indicate to UID signal generators 36 when the user has made a slight movement of his or her wrist and/or arm in any of the directions and ways described herein. UID signal generators 36 may then send electrical signals indicative of the movement to a computer. The support mechanism 704 may also give tactile feedback to the user when the user makes a slight movement in various directions or presses down on the support mechanism 704.

Figure 36:
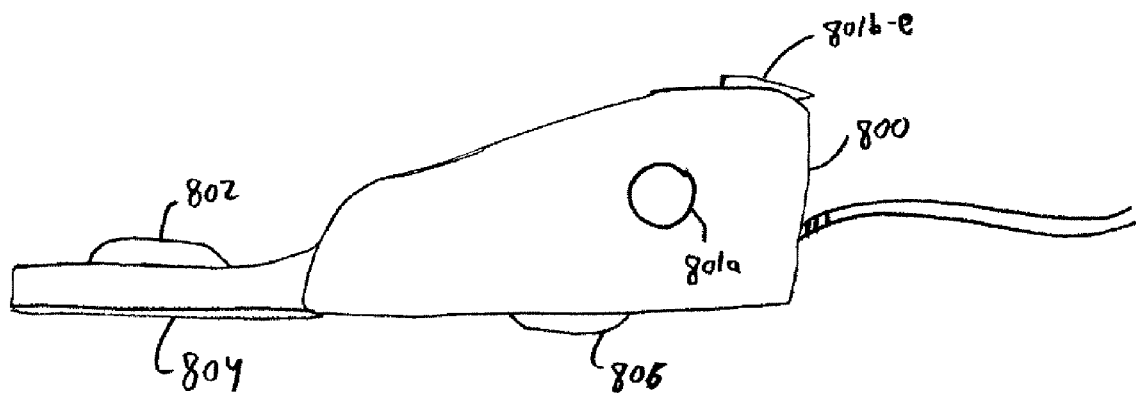
FIG. 36 depicts a universal input device according to another embodiment of the disclosure.

FIG. 36 depicts a further embodiment. FIG. 36 depicts a side view of a UID mouse 800 designed for a left-handed user. As shown in FIG. 36, a hand input mechanism 802 may be a raised surface on the UID mouse 800 and positioned such that the heel of the user's hand may fit comfortably over the hand input mechanism 802 while the user's fingers may rest on top of five input mechanisms 801a-c. In various exemplary embodiments, the hand input mechanism 802 may be customized in its size, shape, weight, and/or density to fit the features of a particular user's hand. The user's arm, wrist, and hand may also rest on top of a support mechanism 804. The UID mouse 800 may also include a track ball 806 or other input mechanism on the bottom of the UID mouse 800 to communicate movement of the UID mouse 800 as described herein.

Figure 37:
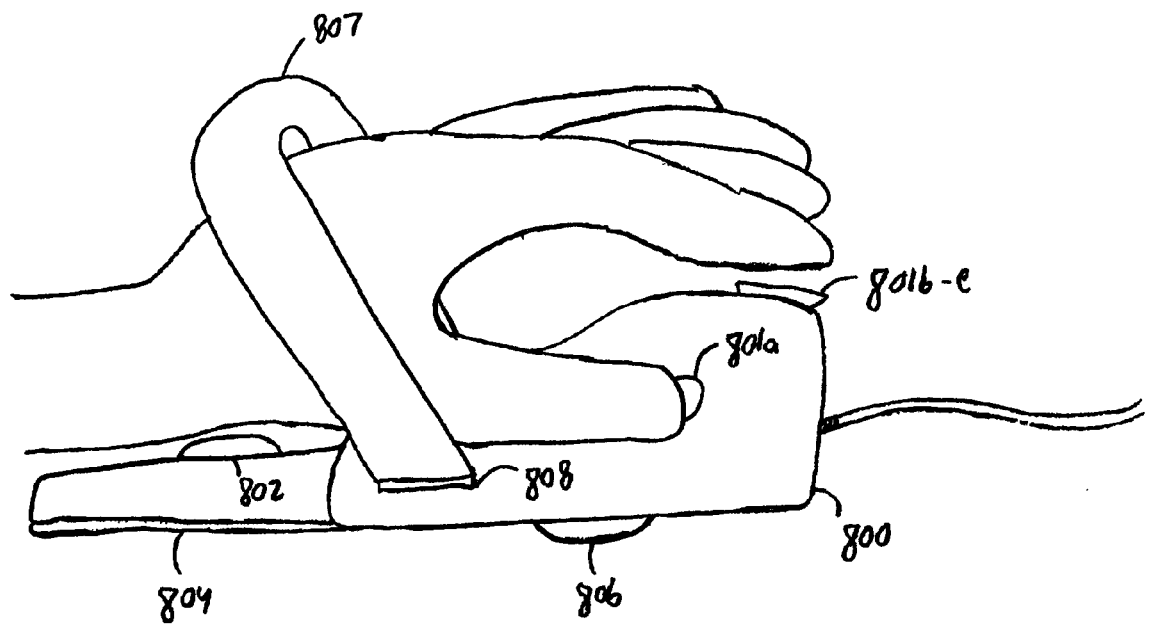
FIG. 37 depicts a universal input device according to another embodiment of the disclosure.

FIG. 37 depicts a further embodiment. FIG. 37 depicts a side view of the UID mouse 800 also showing a user's hand. As shown in FIG. 37, the user's hand may fit comfortably in its natural resting position over the UID mouse 800, the hand input mechanism 802, and the support mechanism 804 so that the user may press the input mechanisms 801a-e without substantially moving his or her arm, wrist, or hand. A securing mechanism 807 may also be attached to the UID mouse 800 to keep the user's hand in place during operation. The securing mechanism 807 may, for example, fit over the heel of the user's hand to permit free movement of the user's fingers while forcing the user's hand to remain substantially in place. The securing mechanism 807 may be comprised of a comfortable material, such as felt, fabric, or the like. In various exemplary embodiments, the securing mechanism 807 may be attached to the UID mouse 800 on either side. For example, the attachment on the left side (not shown in FIG. 37) of the UID mouse 800 may be a permanent attachment, while an attachment 808 on the right side may be a detachable connection, such as a Velcro® connection, button, hook fastener, snap fastener, or the like. The user may detach the securing mechanism 807 at the attachment 808, place his or her hand over the input mechanisms 801a-e and hand input mechanism 802 in the correct position, place the securing mechanism 807 over his or her hand, and reattach the securing mechanism 807 at the attachment 808 to ensure that the user's hand remains in place during subsequent operation. The securing mechanism 807 may also be adjustable and resizable to fit the shape of the user's hand, arm, or wrist.

Figure 38:
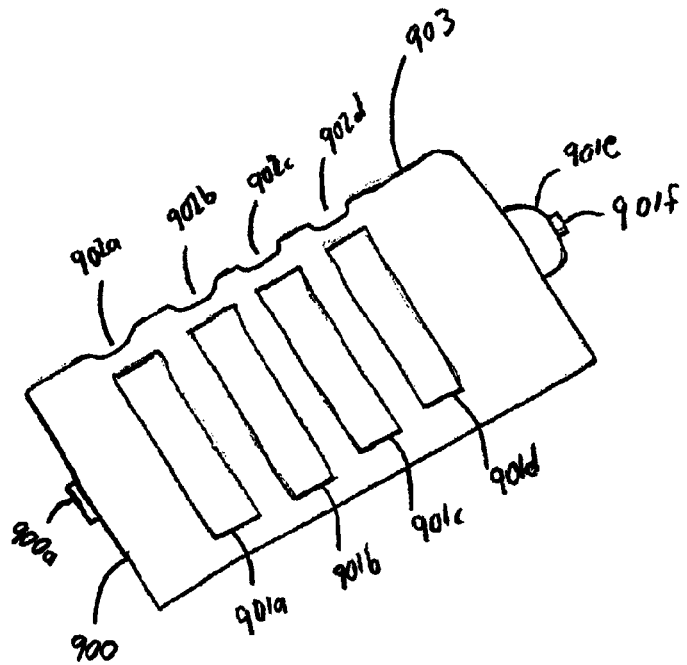
FIG. 38 depicts a universal input device according to another embodiment of the disclosure.

FIG. 38 depicts a further embodiment. FIG. 38 depicts a UID 900 which allows navigation and selection in three dimensions. In this embodiment, the user may substantially close his or her hand to hold the UID 900 rather than keeping it substantially open in a resting position, as shown in FIG. 37, for example. In that way, the user may be free to move the device up, down, left, right, forward, and backward in three dimensions while operating the device. Such freedom of movement may prevent muscle fatigue associated with keeping a user's hand in the same position for a long period of time.

As shown in FIG. 38, the user may hold the UID 900 with the user's right hand. A side surface 903 of the UID 900 may be shaped to include four indentations 902a-d such that four of the user's fingers may be comfortably placed around the indentations 902a-d and the tips and/or upper portions of the user's fingers may be placed over four primary input mechanisms 901a-d located on the underside of the UID 900, which may be long keyboard keys or any other input mechanism described herein. For example, the user's pinky finger may be placed over primary input mechanism 901a, the user's ring finger may be placed over primary input mechanism 901b, the user's middle finger may be placed over primary input mechanism 901c, and the user's index finger may be placed over primary input mechanism 901d. A thumb input mechanism 901e and a thumb key 901f may also be located at the top of the UID 900 such that the user may operate the thumb input mechanism 901e and thumb key 901f using his or her right-hand thumb while keeping his or her other fingers in place around the indentations 902a-d and over the four primary input mechanisms 901a-d. The thumb input mechanism 901e and thumb key 901f may be located on the underside of the UID 900 along with the primary input mechanisms 901a-d.

As described herein, the means for a user to select characters and other information may comprise the primary input mechanisms 901a-d, thumb input mechanism 901e, and thumb key 901f. The input mechanisms or input keys may comprise a track ball, rocker switch, roller switch, toggle switch, push button switch, touch sensitive key, multi-position switch, key, or the like, or a combination thereof. In various exemplary embodiments, the primary input mechanisms 901a-d may be ergonomic long keyboard keys as described in reference to FIGS. 3, 9, 11, 17, and/or 19 and shaped such that the user's fingers fit comfortably on the surface of the primary input mechanisms 901a-d. UID 900 may also include any other input mechanisms accessible by any of the user's fingers.

The UID 900 may further comprise means for navigating to input characters and information, as described herein. In reference to FIG. 38, the UID 900 may have one or more internal motion/movement sensors (not shown) capable of detecting movement and/or rotation of the UID 900 in various directions in three dimensions, including up, down, left, right, forward, and backward. The motion/movement sensors may comprise UID triggers 34. Upon moving the UID 900 in a particular direction, the motion/movement sensors may generate a signal indicative of the movement performed by the user for UID signal generators 36 within the UID 900. UID signal generators 36 may then generate a signal indicative of the movement, which may be sent to a computer using a wireless communication mechanism 900a. UID 900 may also send the signal to the computer via a wired connection. The UID 900 may be used in combination with a two-dimensional layout such as presented in FIGS. 21, 24, and/or 25A-D or a three-dimensional layout such as presented in FIG. 22, which may be displayed on a graphical display as described herein. For example, the user may move up one row in a layout by raising the UID 900 up or by rotating the UID 900 in the forward direction. The user may also move down one row in the layout by lowering the UID 900 down or by rotating the UID 900 in the downward direction. The user may also move left or right in the layout, or move to different layouts, for example, by moving the UID 900 left or right or rotating the UID 900 left or right, respectively. After positioning the UID 900 such that the user's desired layout and row are active, the user may select a cell within the particular layout and row by pressing any of the primary input mechanisms 901a-d, thumb input mechanism 901e, or thumb key 901f, upon which UID signal generators 36 may send a signal to the computer 12 via a communication mechanism as described herein.

The UID 900 may be shaped in any way and may have a covering or other support or covering mechanism for keeping the user's hand in place at the correct location. For example, the UID 900 may have a securing mechanism 807 as described in reference to FIG. 37. The UID 900 may also be a love shape that holds the user's fingers in place against the primary input mechanisms 901a-d and thumb in place against the thumb input mechanism 901e and thumb key 901f. The user may also use two UIDs 900 in combination (i.e., one in each hand) as described herein.

Figure 39:
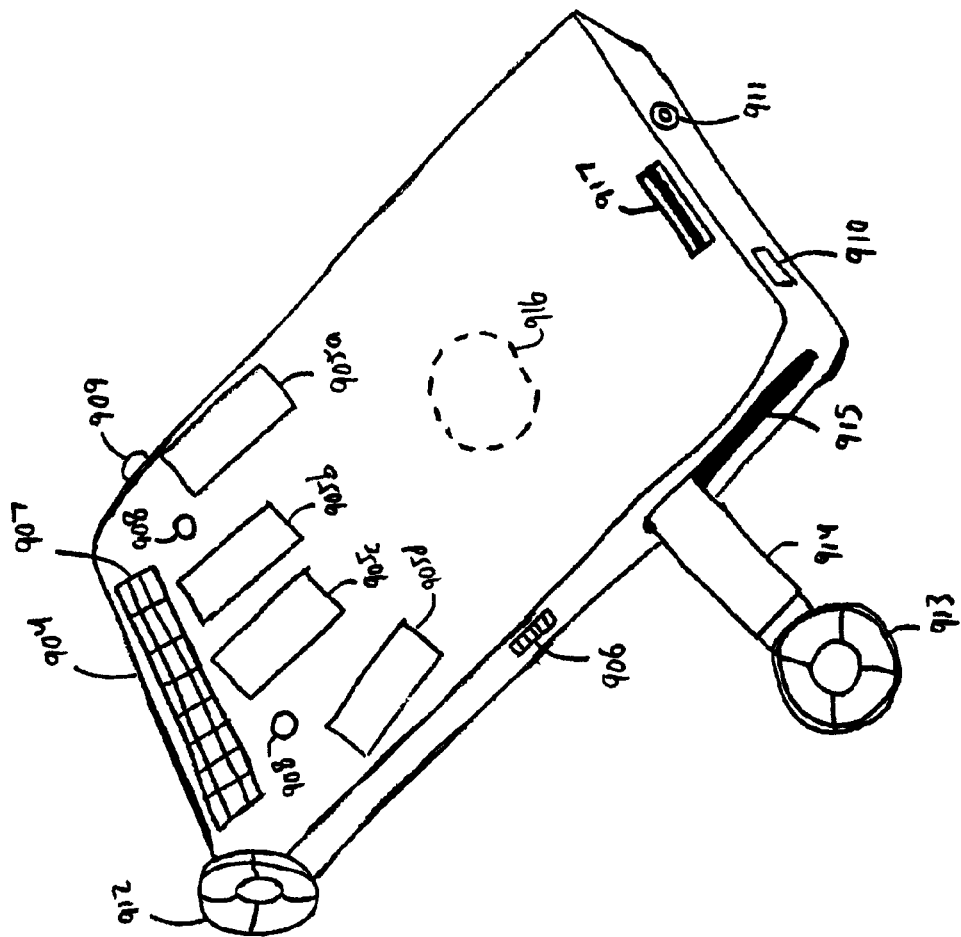
FIG. 39 depicts a universal input device according to another embodiment of the disclosure.

FIG. 39 depicts a further embodiment. In this embodiment, a right-handed user may utilize a UID 904 to enter information into a display or device associated with the UID 904. The UID 904 may comprise a graphical display 907 for providing information and feedback to the user and may display characters and other information as they are selected by the user. The graphical display 907 may be an LED display, an LCD display, or the like. In various exemplary embodiments, the graphical display 907 may comprise a visual display of a telephone number dialed by a user wherein the UID 904 is integrated with and/or coupled with a cellular telephone as described herein. Although shown in portrait orientation in FIG. 39, the UID 904 may also be in landscape orientation with a larger graphical display 907.

The UID 904 may further comprise means for a user selecting characters and other information and means for navigating to input these characters and information. The means for a user selecting may comprise a first side-input mechanism 912, a second side-input mechanism 913, primary input keys 905a-d, a right secondary input key 909, a left input key 906, a bottom secondary input key 910, and a optical mouse 916. As described herein, any of the input mechanisms may be, for example, a rocker switch, roller switch, toggle switch, push button switch, touch sensitive key, multi-position switch, key, mouse, track ball, or the like, or a combination thereof.

In the embodiment depicted in FIG. 39, the graphical display 907 may also comprise a layout as described in reference to FIGS. 7, 21, 24, and 25A-25D. The user may select a layout, navigate through the layout, and select a cell corresponding to the layout using any of the various input mechanisms described herein. For example, first side-input mechanism 912 and second side-input mechanism 913 may each comprise a multi-position navigation switch with one or more UID triggers 16 to sense pressure from a user's thumb. For example, first side-input mechanism 912 and second side-input mechanism 913 may each have four push button switches positioned in a circle surrounding a fifth button that can each be pressed by a user's thumb, or each may have nine buttons positioned in three rows and three columns. First side-input mechanism 912 may be positioned near the top corner of the UID 904 such that the user may comfortably operate the first side-input mechanism 912 with his or her left thumb while holding the UID 904 in place with his or her right hand. Second-side input mechanism 913 may be positioned on the side of the UID 904 such that the user may comfortably operate the second side-input mechanism 913 with the thumb of his or her right hand while holding the UID 904 in place with his or her right hand. The second side-input mechanism 913 may be connected to a extension piece 914, which may be connected to the inside of the UID 904 and extend outward from an opening 915 in the UID 904. The extension piece 914 may be rotated about a pivot point within the UID 904 (not shown) and/or extended so that it is in the most comfortable and ergonomic position for the particular user. In various exemplary embodiments wherein two UIDs 904 are used, the functions and locations of the first side-input mechanism 912 and second side-input mechanism 913 may be reversed, such that the function of first-side input mechanism 912 in a right-handed UID 904 is the function of second side-input mechanism 913 in a left-handed UID 904. In that way, the user may be able to optimally use both devices at the same time.

The user may, for example, navigate through a graphical layout using the first side-input mechanism 912 or second side-input mechanism 913 and select a cell within that layout using primary input keys 905*a-d*, while keeping his or her fingers in place over the primary input keys 905*a-d*, as described herein. The UID 904 may then send electrical signals indicative of these actions to a computer via a communication mechanism, such as a wired or wireless connection.

In various exemplary embodiments, right secondary input key 909 may operate as an on/off switch for the UID 904 and left input key 906 may be used to select a particular mode of operation as described herein. Bottom secondary input key 910 may also operate as a "thumb lock" switch. For example, if the bottom secondary input key 910 is in a first position, the UID 904 may recognize input from any input mechanism, including second side-input mechanism 913, and send signals corresponding to that input to a computer. If the bottom secondary input key 910 is moved to a second position, however, the UID 904 may ignore any particular input, such as input from the second side-input mechanism 913. In that way, the user may avoid inadvertently selecting a layout or character when he or she does not want to input anything. Right secondary input key 909, left input key 906, and bottom secondary input key 910 may be used for any other input described herein as well.

The UID 904 may also be integrated with and/or coupled with an optical mouse 916, track ball, or other input mechanism on the bottom of the UID 904 to communicate movement of the UID 904 as described herein. The UID 904 may comprise a battery, solar cell, or other powering mechanism (not shown). The UID 904 may also be charged directly via a charger plug 911 connected to a wall outlet via a power cord. Also, the UID 904 may comprise indicators 908 for indicating to the user the presence of a particular condition or status. Indicators 908, for example, may be light bulbs that shine in different colors depending on what mode the user is operating, whether the UID 904 is turned on or off, and/or whether the UID 904 has established a wireless connection with a computer. The UID 904 may also comprise a speaker 917 for speakerphone usage when the UID 904 is integrated and/or coupled with a cellular telephone or other voice-related device, as described herein.

In the embodiment depicted in FIG. 39, the UID 904 may provide up to five types of input to a computer: (1) primary input from primary input keys 905*a-d*, (2) navigational input from first side-input mechanism 912, (3) secondary input from second side-input mechanism 913, (4) mode switch input from left input key 906, and (5) cursor input from optical mouse 916. These mechanisms may provide any type of input or selection as described herein and may be operated individually or in combination to perform any input or selection.

Figure 40:
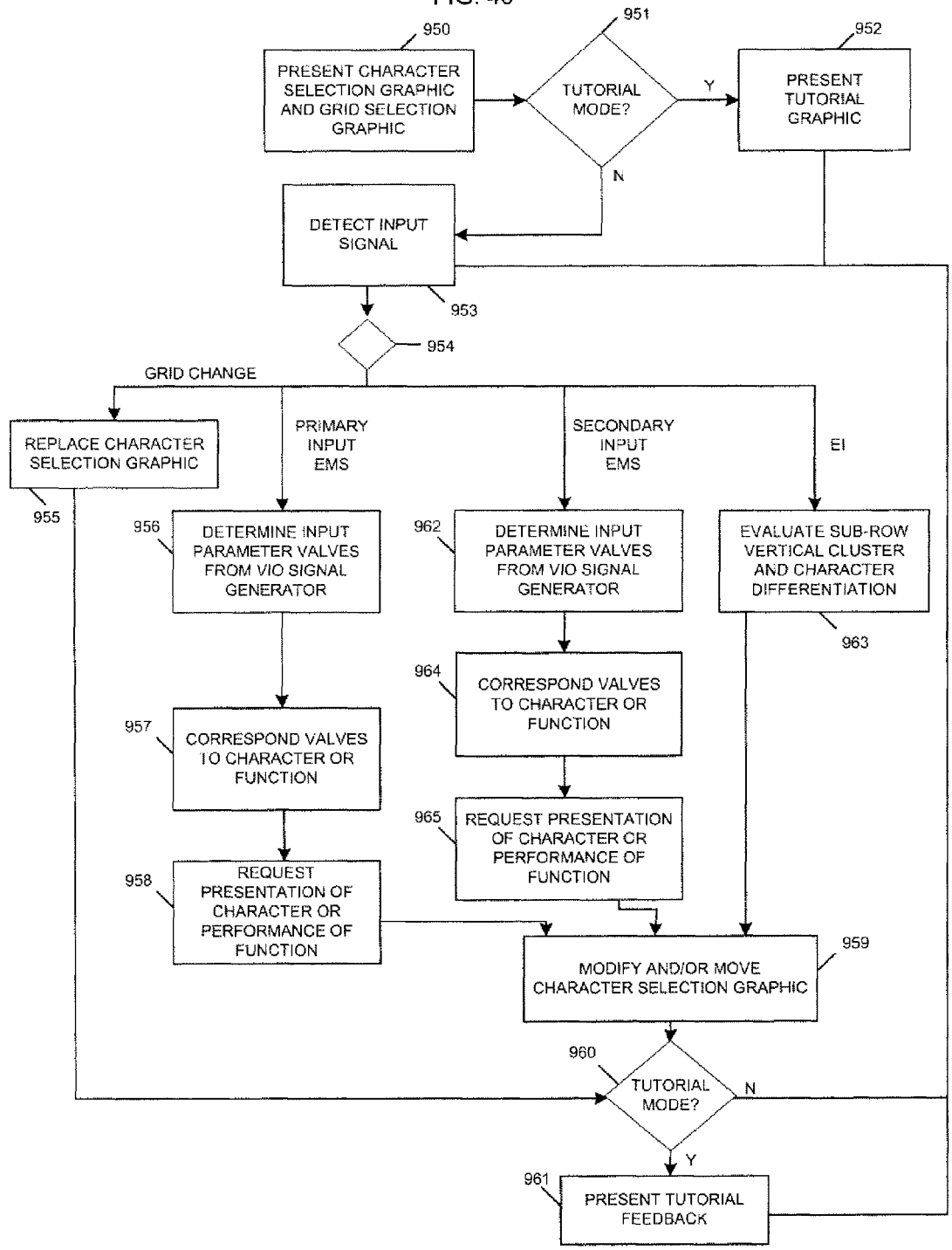
FIG. 40 depicts a flow of operation of a computer system according to various embodiments of the disclosure.
Figure 41:
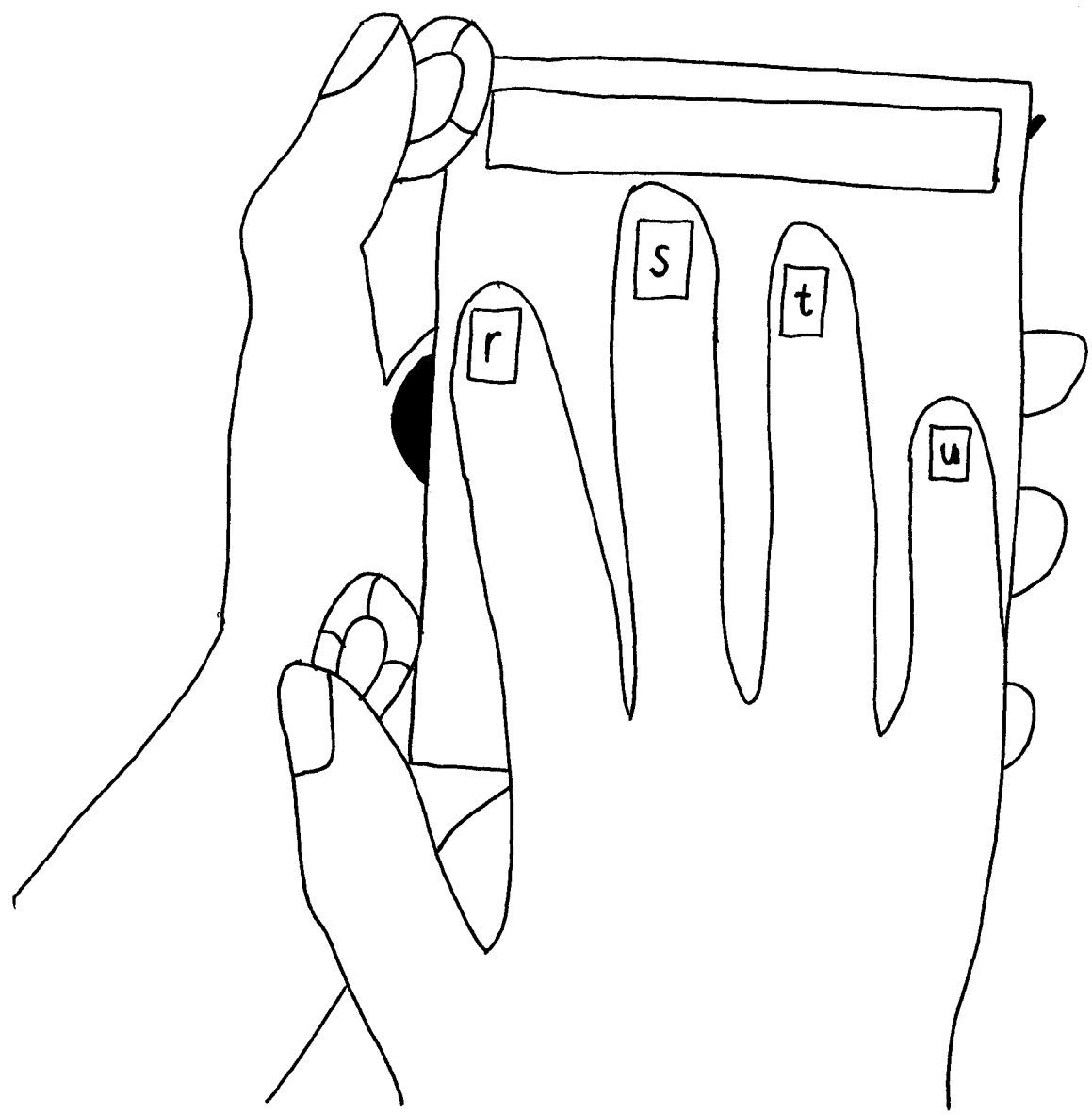
FIG. 41 depicts another embodiment of the universal input device according to the disclosure, showing it in use with the hand of the user.
Figure 42:
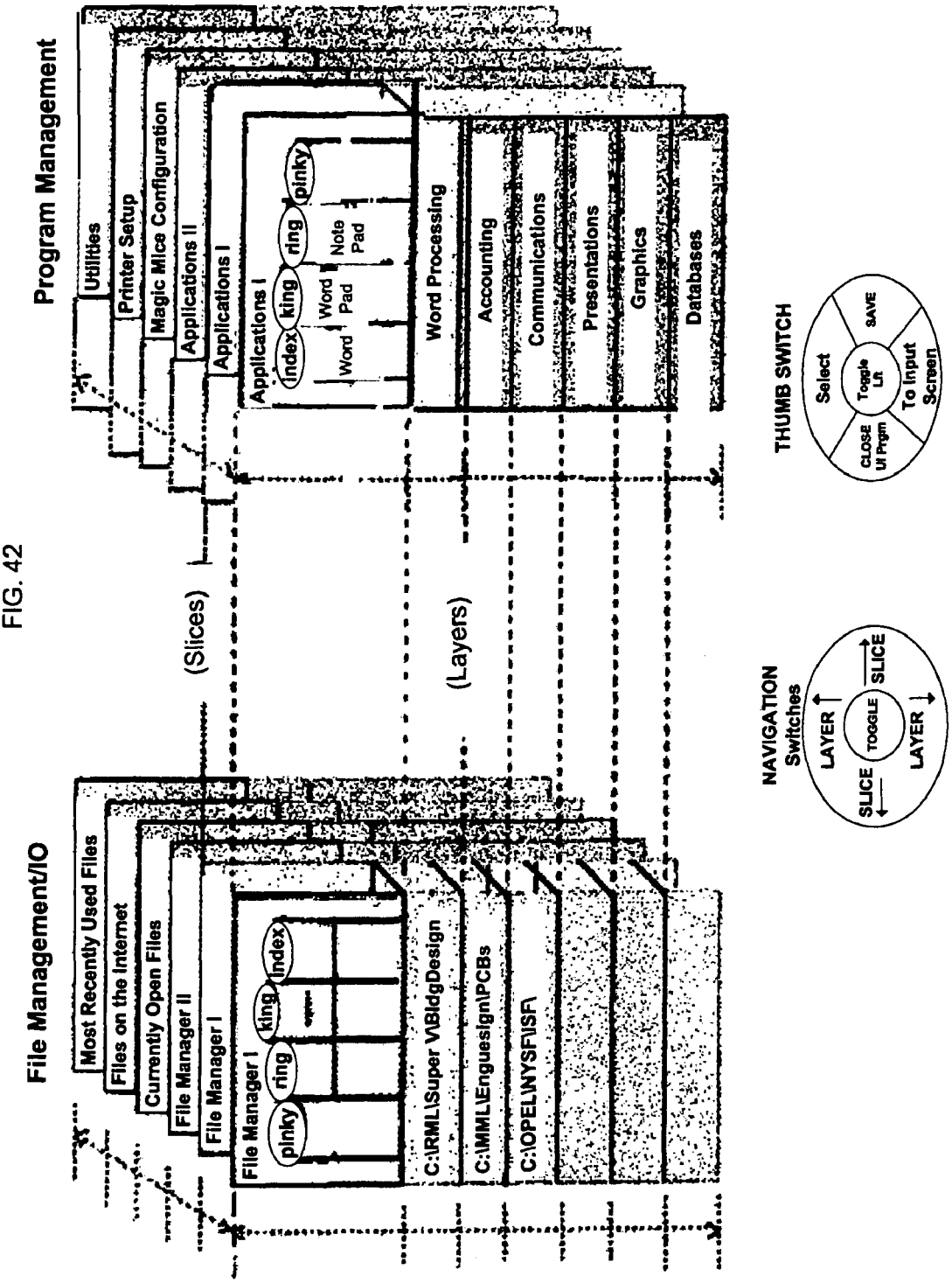
FIG. 42 is another embodiment of the three-dimensional menu and command layout for use in an embodiment of the present invention.

FIG. 40 depicts a flow of operation of a computer system with a UID according to various embodiments of the disclosure. At step 950, a character presentation unit presents a character selection graphic (e.g., a "block") on a display, as well as a grid selection graphic (e.g., a "block of blocks") for selecting from a set of available character selection graphics. For example, one character selection graphic may comprise English alphanumeric characters, while another may comprise Chinese symbols, while yet another may comprise only numbers. As described herein, the character selection graphic and grid selection graphic may be comprised of rows and columns and may be customized to meet a particular user's needs. In various exemplary embodiments, the character selection graphic and grid selection graphic may be overset over a document or window on the display, positioned in a location on the display other than the active document or window, or translucent such that the user can see the character selection graphic, grid selection graphic, and active document or window all at the same time.

At step 951, the system determines whether it is operating in a "tutorial mode." In various exemplary embodiments, the system may present a tutorial to teach a new user how to input information using the various UID input mechanisms described herein. If the system is operating in tutorial mode, the system may at step 952 present a tutorial graphic to the user to aid in operation, and then proceed to step 953. For example, the tutorial graphic may be an animated image of a hand and the character that may be inputted with each primary input key above each finger. In that way, the user may recognize that he or she may input the character "a" by pressing the key below his or left pinky finger, or input the character "m" by pressing the key below his or her right index finger, or input any other character as described herein. The tutorial may also present a set of sample words to be entered by the user using the UID. For example, the tutorial graphic may display the user's name and highlight the sequence of finger movements necessary to input each of the characters in the name. If the user inputs an incorrect character, the tutorial may inform the user of the incorrect input and display the correct fingers to use to input the desired character. After a number of successful attempts, the tutorial may be removed from the display, allowing the user to operate the UID freely.

If the system is not operating in tutorial mode, it may proceed to step 953 wherein the character presentation unit waits for detection of an input signal from the UID signal generator. As described herein, the UID signal generator generates signals indicative of depression of finger portions (as indicated by electromechanical switches) and movement into various positions by a control portion by electrical indicators. When an input signal is detected, the character presentation unit at step 954 determines whether the signal is from an electromechanical switch depression indicating a grid change, a primary input electromechanical switch depression, a secondary input electromechanical switch depression, or an electrical indicator input.

If the input was from an electromechanical switch indicating a grid change, the system may at step 955 replace the character selection graphic with a new character selection graphic selected by the user and then proceed to step 960. In various exemplary embodiments, a two dimensional character selection graphic may be used to select characters, while a three dimensional character selection graphic may be used to select functions or applications.

If the input was from a primary input electromechanical switch, one of the buttons on a UID may have been depressed indicating a desire by the user to input a character or perform a function. At step 956, the character presentation unit determines the input parameter values from the UID signal generator to derive a value for which finger portion was depressed and the three coordinate position of the control portion. At step 957, the character presentation unit then uses these values to determine the character or function which corresponds to those values as depicted in the character selection graphic.

At step 958, the character presentation unit cooperates with the operating system and task based components to request input of the character or performance of the function requested by the user. The system may then proceed to step 959.

If the input was from a secondary input electromechanical switch, one of the buttons on a UID may have been depressed indicating a desire by the user to input a different character or function. For example, the user may have inputted a capital "A" character, or inputted a semicolon, or indicated a desire to press the "Escape" key, or indicated a desire to open a web browser application. The secondary input may also have been preprogrammed by the user as described herein. At step 962, the character presentation unit determines the input parameter values from the UID signal generator to derive a value for what input mechanism was pressed. At step 964, the character presentation unit then uses this value to determine the character or function which corresponds to the value associated with the input. At step 965, the character presentation unit cooperates with the operating system and task based components to request input of the character or performance of the function requested by the user. The system may then proceed to step 959.

If the input was from an electrical indicator, then the user may desire to switch either the sub-row, vertical cluster, or character. At step 963, the character presentation unit may determine the new sub-row, vertical cluster, or character to be presented or differentiated in the character selection graphic. The system may then proceed to step 959.

At step 959, the character presentation graphic may be modified and/or moved on the display based on the input from the user. For example, if the user indicated a desire to switch rows, the character selection graphic may show a new set of rows with the current active row in the middle. Also, if the user indicated a desire to perform the "Enter" function, the character selection graphic may be moved downward on the display to avoid concealing the active portion of an open word processing application. At step 960, the system again determines if it is operating in tutorial mode. If not, the system proceeds to step 953 to await a new input signal. If the system is operating in tutorial mode, it may at step 961 present feedback to the user based on the user's input. For example, if the user correctly inputted a lower case "t" character, the system may display an approval message. If the user pressed the wrong button and inputted an incorrect character, however, the system may display a message accordingly. In either case, the system may return to step 954 to await the next input from the user.

While several embodiments have been presented, this invention should not be limited to the embodiments specifically described. Various modifications and enhancements may be made without departing from the scope of the present invention. The present invention should be defined by the claims set forth below.

What is claimed is:

1. A computer-implemented method comprising: displaying on a computer device a selection graphic comprising a plurality of input choices, wherein the computer device also displays an image associated with an open application and the selection graphic does not conceal an interactive portion of the image; receiving from a user input device a first signal associated with a selected location within the selection graphic; providing an indication of the selected location on the selection graphic; receiving from the user input device a second signal indicating a selected input choice within the selected location; processing the first and second signals; providing a third signal for performing a function associated with the selected input choice; and displaying on the computer device a grid selection graphic comprising a plurality of selection graphic choices, wherein the grid selection graphic does not conceal an interactive portion of the image; receiving from the user input device a fourth signal associated with a selected graphic choice within the grid selection graphic; processing the fourth signal; and replacing the selection graphic with a selection graphic associated with the selected grid selection choice.

2. The method of claim 1, wherein the plurality of input choices are displayed within rows and columns in the selection graphic.

3. The method of claim 2, wherein the rows and columns of input choices comprise a three dimensional matrix of rows and columns of input choices.

4. The method of claim 1, further comprising:
receiving a fourth signal indicating that the function associated with the selected input choice was performed; and
displaying the selection graphic in a different location in relation to the image, wherein the selection graphic in the different location does not conceal an interactive portion of the image.

5. The method of claim 1, wherein the input choices comprise characters and performing the function associated with the selected input choice comprises displaying the selected character.

6. The method of claim 1, wherein the input choices comprise applications and performing the function associated with the selected input choice comprises executing the selected application.

7. The method of claim 1, wherein the input choices are displayed as icons.

8. The method of claim 1, wherein the selection graphic is displayed as translucent over the image.

9. The method of claim 1, wherein the selection graphic may be moved or removed in response to a user input.

10. The method of claim 1, wherein the input choices are customizable in response to a user input.

11. The method of claim 1, further comprising:
displaying a teaching graphic comprising a hand image and at least one input choice.

12. The method of claim 11, wherein the teaching graphic is removed after receiving a predetermined number of signals from the user input device.

13. The method of claim 1, wherein the image appears on a first display and the selection graphic is displayed on a second display.

14. A computer readable media comprising code to perform the acts of the method of claim 1.

15. A system comprising one or more computer processors collectively programmed to: display on a computer device a selection graphic comprising a plurality of input choices, wherein the computer device also displays an image associated with an open application and the selection graphic does not conceal an interactive portion of the image; receive from a user input device a first signal associated with a selected location within the selection graphic; provide an indication of the selected location on the selection graphic; receive from the user input device a second signal indicating a selected input choice within the selected location; process the first and second signals; provide a third signal for performing a function associated with the selected input choice; and wherein the one or more computer processors are further programmed to: display on the computer device a grid selection graphic comprising a plurality of selection graphic choices, wherein the grid selection graphic does not conceal an interactive portion of the image; receive from the user input device a fourth signal associated with a selected graphic choice within the grid selection graphic; process the fourth signal; and replace the selection graphic with a selection graphic associated with the selected grid selection choice.

16. The system of claim 15, wherein the plurality of input choices are displayed within rows and columns in the selection graphic.

17. The system of claim 16, wherein the rows and columns of input choices comprise a three dimensional matrix of rows and columns of input choices.

18. The system of claim 15, wherein the one or more computer processors are further programmed to:
receive a fourth signal indicating that the function associated with the selected input choice was performed; and
display the selection graphic in a different location in relation to the image, wherein the selection graphic in the different location does not conceal an interactive portion of the image.

19. The system of claim 15, wherein the input choices comprise characters and performing the function associated with the selected input choice comprises displaying the selected character.

20. The system of claim 15, wherein the input choices comprise applications and performing the function associated with the selected input choice comprises executing the selected application.

21. The system of claim 15, wherein the input choices are displayed as icons.

22. The system of claim 15, wherein the selection graphic is displayed as translucent over the image.

23. The system of claim 15, wherein the input choices are customizable in response to a user input.

* * * * *

UNITED STATES PATENT AND TRADEMARK OFFICE
CERTIFICATE OF CORRECTION

| | |
|---|---|
| PATENT NO. | : 8,279,169 B2 |
| APPLICATION NO. | : 11/931965 |
| DATED | : October 2, 2012 |
| INVENTOR(S) | : Vayda |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 641 days.

Signed and Sealed this
Nineteenth Day of May, 2015

Michelle K. Lee
*Director of the United States Patent and Trademark Office*